United States Patent
Aridomi

(10) Patent No.: US 12,379,628 B2
(45) Date of Patent: Aug. 5, 2025

(54) COLOR CONVERSION FILM, METHOD FOR MANUFACTURING COLOR CONVERSION FILM, BACKLIGHT UNIT, AND LIQUID CRYSTAL DISPLAY DEVICE

(71) Applicant: FUJIFILM CORPORATION, Tokyo (JP)

(72) Inventor: Takashi Aridomi, Shizuoka (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/335,142

(22) Filed: Jun. 15, 2023

(65) Prior Publication Data

US 2023/0341728 A1 Oct. 26, 2023

Related U.S. Application Data

(63) Continuation of application No. PCT/JP2021/039170, filed on Oct. 22, 2021.

(30) Foreign Application Priority Data

Dec. 18, 2020 (JP) ................. 2020-210835

(51) Int. Cl.
*G02F 1/1335* (2006.01)
*C09K 11/06* (2006.01)
*G02F 1/1333* (2006.01)

(52) U.S. Cl.
CPC ........ *G02F 1/133614* (2021.01); *C09K 11/06* (2013.01); *G02F 1/133311* (2021.01);
(Continued)

(58) Field of Classification Search
CPC .............................................. G20F 1/133614
See application file for complete search history.

(56) References Cited

U.S. PATENT DOCUMENTS

2004/0086663 A1* 5/2004 Takeda ................ G02F 1/13394
428/1.1
2013/0052573 A1* 2/2013 Sasaki .................... G03G 5/071
560/48
(Continued)

FOREIGN PATENT DOCUMENTS

EP 3418781 A1 12/2018
JP 2006-047592 A 2/2006
(Continued)

OTHER PUBLICATIONS

International Search Report issued in International Application No. PCT/JP2021/039170 on Nov. 30, 2021.
(Continued)

*Primary Examiner* — Sean P Gramling
(74) *Attorney, Agent, or Firm* — SOLARIS Intellectual Property Group, PLLC

(57) ABSTRACT

Provided are a color conversion film including, in the following order, a support, a first color conversion layer containing an organic light-emitting material which emits, by an excitation light having a wavelength of 400 nm or more and less than 500 nm, light observed in a region having a peak wavelength of 500 nm or more and less than 580 nm, an interlayer, and a second color conversion layer containing an organic light-emitting material which emits, by at least one of the excitation light having a wavelength of 400 nm or more and less than 500 nm or the light emitted from the organic light-emitting material, light observed in a region having a peak wavelength of 580 nm or more and less than 750 nm; a method for manufacturing a color conversion film, a backlight unit, and a liquid crystal display device.

12 Claims, 2 Drawing Sheets

(52) U.S. Cl.
CPC .. *G02F 1/133317* (2021.01); *G02F 1/133524* (2013.01); *C09K 2211/1007* (2013.01); *C09K 2211/1018* (2013.01); *G02F 2201/50* (2013.01)

(56) References Cited

U.S. PATENT DOCUMENTS

| | | |
|---|---|---|
| 2018/0134952 A1 | 5/2018 | Ichihashi et al. |
| 2018/0208838 A1 | 7/2018 | Sakaino et al. |
| 2018/0274753 A1 | 9/2018 | Sakaino et al. |
| 2018/0305611 A1 | 10/2018 | Umehara et al. |
| 2019/0048255 A1* | 2/2019 | Sakaino ................. C09K 11/06 |
| 2019/0348578 A1* | 11/2019 | Kuniyasu .............. H01L 33/502 |
| 2020/0088920 A1 | 3/2020 | Sakaino et al. |
| 2020/0347292 A1 | 11/2020 | Ichihashi et al. |
| 2021/0317363 A1 | 10/2021 | Jin et al. |

FOREIGN PATENT DOCUMENTS

| | | |
|---|---|---|
| JP | 2009-086241 A | 4/2009 |
| JP | 2015-132648 A | 7/2015 |
| JP | 2020-144299 A | 9/2020 |
| KR | 10-2018-0119852 A | 11/2018 |
| KR | 10-2038228 B1 | 10/2019 |
| WO | 2017/057287 A | 4/2017 |
| WO | 2018/221216 A1 | 12/2018 |

OTHER PUBLICATIONS

Written Opinion of the ISA issued in International Application No. PCT/JP2021/039170 on Nov. 30, 2021.
Third Party Observation issued in International Application No. PCT/JP2021/039170 on Feb. 6, 2023.

\* cited by examiner

COLOR CONVERSION FILM, METHOD FOR MANUFACTURING COLOR CONVERSION FILM, BACKLIGHT UNIT, AND LIQUID CRYSTAL DISPLAY DEVICE

CROSS-REFERENCE TO RELATED APPLICATIONS

This application is a continuation application of International Application No. PCT/JP2021/039170, filed Oct. 22, 2021, the disclosure of which is incorporated herein by reference in its entirety. Further, this application claims priority from Japanese Patent Application No. 2020-210835, filed Dec. 18, 2020, the disclosure of which is incorporated herein by reference in its entirety.

BACKGROUND OF THE INVENTION

1. Field of the Invention

The present disclosure relates to a color conversion film, a method for manufacturing a color conversion film, a backlight unit, and a liquid crystal display device.

2. Description of the Related Art

A flat panel display such as a liquid crystal display device (LCD) has low power consumption, and its use has been expanded year by year as a space-saving display device.

Since a color conversion film of a backlight unit included in the LCD contains a light-emitting material which emits green light and red light by blue light, white light in which the blue light, the green light, and the red light are mixed can be extracted from the color conversion film.

As the color conversion film, for example, a color conversion film including a support, a layer (A) that contains an organic light-emitting material which emits green light having a peak wavelength of 500 nm or more and less than 580 nm by blue light having a wavelength of 400 nm or more and less than 500 nm, and a layer (B) that contains an organic light-emitting material which emits red light having a peak wavelength of 580 nm or more and 750 nm or less by the blue light or the green light, in which SP values of binder resins contained in the layer (A) the layer (B) have a specific relationship, has been known (for example, see WO2018/221216A and the like).

SUMMARY OF THE INVENTION

The color conversion film is required to have excellent color reproducibility, and an object to be achieved in the present disclosure is to provide a color conversion film having excellent color reproducibility, a method for manufacturing a color conversion film, a backlight unit, and a liquid crystal display device.

<1> A color conversion film comprising, in the following order:
a support;
a first color conversion layer containing an organic light-emitting material which emits, by an excitation light having a wavelength of 400 nm or more and less than 500 nm, light observed in a region having a peak wavelength of 500 nm or more and less than 580 nm;
an interlayer; and
a second color conversion layer containing an organic light-emitting material which emits, by at least one of the excitation light having a wavelength of 400 nm or more and less than 500 nm or the light emitted from the organic light-emitting material, light observed in a region having a peak wavelength of 580 nm or more and less than 750 nm.

<2> A color conversion film comprising, in the following order:
a support;
a first color conversion layer containing an organic light-emitting material which emits, by at least one of an excitation light having a wavelength of 400 nm or more and less than 500 nm or light emitted from an organic light-emitting material contained in a second color conversion layer, light observed in a region having a peak wavelength of 580 nm or more and less than 750 nm;
an interlayer; and
a second color conversion layer containing the organic light-emitting material which emits, by the excitation light having a wavelength of 400 nm or more and less than 500 nm, light observed in a region having a peak wavelength of 500 nm or more and less than 580 nm.

<3> The color conversion film according to <1> or <2>, in which at least one of the organic light-emitting material contained in the first color conversion layer or the organic light-emitting material contained in the second color conversion layer is represented by General Formula (1),

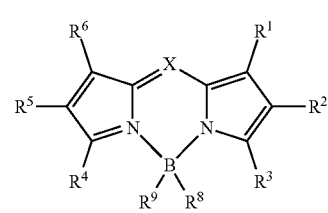

(1)

in General Formula (1), X represents C—$R^7$ or N, and $R^1$ to $R^9$ are each independently selected from a hydrogen atom, an alkyl group, a cycloalkyl group, a heterocyclic group, an alkenyl group, a cycloalkenyl group, an alkynyl group, a hydroxyl group, a thiol group, an alkoxy group, an alkylthio group, an arylether group, an arylthioether group, an aryl group, a heteroaryl group, halogen, a cyano group, an aldehyde group, a carbonyl group, a carboxyl group, an oxycarbonyl group, a carbamoyl group, an amino group, a nitro group, a silyl group, a siloxanyl group, a boryl group, or a phosphine oxide group, where adjacent groups of $R^1$ to $R^9$ may form a fused ring.

<4> The color conversion film according to any one of <1> to <3>,
in which the first color conversion layer and the interlayer are in direct contact with each other.

<5> The color conversion film according to any one of <1> to <4>,
in which the second color conversion layer and the interlayer are in direct contact with each other.

<6> The color conversion film according to any one of <1> to <5>,
in which the interlayer contains a water-soluble resin.

<7> The color conversion film according to <6>,
in which the water-soluble resin contains one or more resins selected from a polyvinyl alcohol resin, a polyvinylpyrrolidone resin, a cellulose resin, polymerized substances of these resins, or copolymerized substances of these resins.

<8> The color conversion film according to <6> or <7>, in which the water-soluble resin contains a polymerized substance of a polyvinyl alcohol resin and a crosslinking agent.

<9> The color conversion film according to <6> or <7>, in which the water-soluble resin contains at least one of a polymerized substance of a modified polyvinyl alcohol resin having a crosslinkable group or an unmodified polyvinyl alcohol resin.

<10> The color conversion film according to <9>, in which the water-soluble resin contains the polymerized substance of a modified polyvinyl alcohol resin having a crosslinkable group and the unmodified polyvinyl alcohol resin, and
a ratio of a content of the polymerized substance of a modified polyvinyl alcohol resin having a crosslinkable group to a content of the unmodified polyvinyl alcohol resin in the water-soluble resin is 1/99 to 30/70 on a mass basis.

<11> The color conversion film according to <6> or <7>, in which the water-soluble resin contains a polyvinyl alcohol resin and a polyvinylpyrrolidone resin, and
a ratio of a content of the polyvinylpyrrolidone resin to a content of the polyvinyl alcohol resin in the water-soluble resin is 1/99 to 75/25 on a mass basis.

<12> The color conversion film according to any one of <1> to <11>,
in which a thickness of the interlayer is 0.1 μm to 20 μm.

<13> The color conversion film according to any one of <1> to <12>, further comprising:
a protective layer on a side of the second color conversion layer opposite to the first color conversion layer.

<14> A method for manufacturing a color conversion film, comprising:
forming, on a support, a first color conversion layer containing an organic light-emitting material which emits, by an excitation light having a wavelength of 400 nm or more and less than 500 nm, light observed in a region having a peak wavelength of 500 nm or more and less than 580 nm;
forming an interlayer on the first color conversion layer; and
forming, on the interlayer, a second color conversion layer containing an organic light-emitting material which emits, by at least one of the excitation light having a wavelength of 400 nm or more and less than 500 nm or the light emitted from the organic light-emitting material, light observed in a region having a peak wavelength of 580 nm or more and less than 750 nm.

<15> A method for manufacturing a color conversion film, comprising:
forming, on a support, a first color conversion layer containing an organic light-emitting material which emits, by at least one of an excitation light having a wavelength of 400 nm or more and less than 500 nm or light emitted from an organic light-emitting material contained in a second color conversion layer, light observed in a region having a peak wavelength of 580 nm or more and less than 750 nm;
forming an interlayer on the first color conversion layer; and
forming, on the interlayer, a second color conversion layer containing an organic light-emitting material which emits, by the excitation light having a wavelength of 400 nm or more and less than 500 nm, light observed in a region having a peak wavelength of 500 nm or more and less than 580 nm.

<16> The method for manufacturing a color conversion film according to <14> or <15>,
in which the forming of the first color conversion layer is performed by applying and drying a coating liquid for forming the first color conversion layer on the support.

<17> The method for manufacturing a color conversion film according to any one of <14> to <16>,
in which the forming of the interlayer is performed by applying and drying a coating liquid for forming the interlayer on the first color conversion layer.

<18> The method for manufacturing a color conversion film according to any one of <14> to <17>,
in which the forming of the second color conversion layer is performed by applying and drying a coating liquid for forming the second color conversion layer on the interlayer.

<19> A backlight unit comprising:
a light source; and
the color conversion film according to any one of <1> to <13>.

<20> A liquid crystal display device comprising:
the backlight unit according to <19>; and
a liquid crystal cell unit.

According to the present disclosure, it is possible to provide a color conversion film having excellent color reproducibility, a method for manufacturing a color conversion film, a backlight unit including the color conversion film, and a liquid crystal display device including the backlight unit.

DESCRIPTION OF THE PREFERRED EMBODIMENTS

Figure 1:
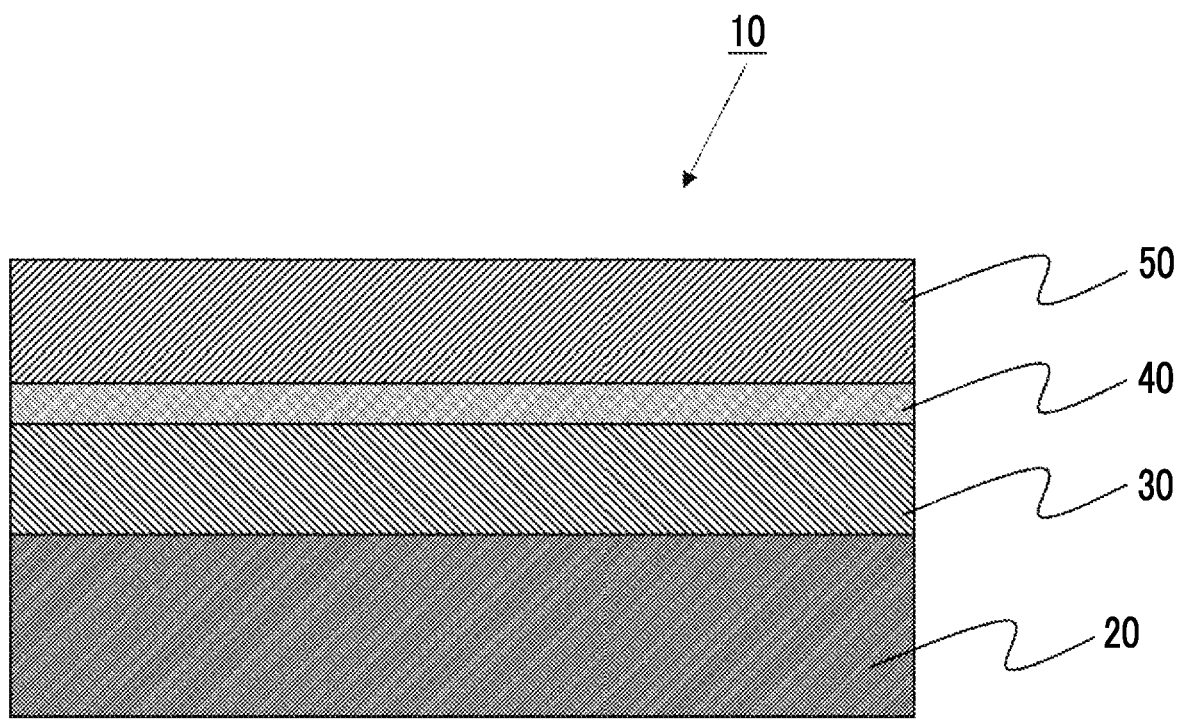
FIG. 1 is a schematic cross-sectional diagram showing one embodiment of a color conversion film according to a first aspect.

Hereinafter, the contents of the present disclosure will be described in detail. The description of configuration requirements below is made based on representative embodiments of the present disclosure in some cases, but the present disclosure is not limited to such embodiments.

In the present disclosure, the numerical ranges shown using "to" include the numerical values described before and after "to" as the minimum value and the maximum value.

In a numerical range described in a stepwise manner in the present disclosure, an upper limit or a lower limit described in one numerical range may be replaced with an upper limit or a lower limit in another numerical range described in a stepwise manner. Further, in a numerical range described in the present disclosure, an upper limit or a lower limit described in the numerical range may be replaced with a value described in an example.

In the present disclosure, each component may contain a plurality of types of corresponding substances. In a case where a plurality of types of substances corresponding to each component are present in the composition, a content rate or a content of each component is the total content rate or the total content of the plurality of types of substances present in the composition, unless otherwise specified.

In the present disclosure, "(meth)acrylic" is a term used in a concept which includes both acrylic and methacrylic.

In the present disclosure, a term "layer" includes not only a case where the layer is formed over the entire region but also a case where the layer is formed only in part of the region.

In the present disclosure, "light-emitting material" refers to a material which, when irradiated with light, emits light having a wavelength different from that of the light.

In the present disclosure, "excitation light" refers to light which can excite the organic light-emitting material to emit light.

In the present disclosure, "water-soluble resin" is a compound having a solubility in water at pH 7 at 20° C. of 0.1 g/L or more.

In the present disclosure, "A layer and B layer are in direct contact with each other" means a state in which another layer does not exist between the A layer and the B layer and a part or the whole of the layers is in contact with each other.

In the present disclosure, a peak wavelength of light emitted from an organic light-emitting material contained in a first color conversion layer included in the color conversion film and a peak wavelength of light emitted from an organic light-emitting material contained in a second color conversion layer included in the color conversion film are measured as follows.

First, the color conversion film is disposed on a planar light-emitting device capable of emitting excitation light having a wavelength of 400 nm or more and less than 500 nm, and a prism sheet is placed on the color conversion film.

Since white light including blue light, green light, and red light is observed in a case where a current is passed through the planar light-emitting device and the above-described color conversion film is irradiated with the above-described excitation light, emission spectrum of the white light is obtained using a spectral emission brightness meter (for example, CS-1000 manufactured by Konica Minolta Inc.), and from the emission spectrum, light emission observed in a region with a peak wavelength of 500 nm or more and less than 580 nm and light emission observed in a region with a peak wavelength of 580 nm or more and 750 nm or less are confirmed.

In the present disclosure, a thickness of each layer can be controlled by adjusting a coating amount of a coating liquid and a concentration (% by mass) of solid contents of a liquid so as to obtain a desired thickness. In addition, the thickness can be determined from a cross-sectional image of the color conversion film, which is obtained by a scanning electron microscopy (SEM) or a transmission electron microscopy (TEM).

In the present disclosure, a weight-average molecular weight (Mw) and a number-average molecular weight (Mn) refer to values measured by gel permeation chromatography (GPC).

For the measurement by gel permeation chromatography (GPC), HLC (registered trademark)-8020GPC (manufactured by Tosoh Corporation) is used as a measuring device, three columns of TSKgel (registered trademark) Super Multipore HZ-H (4.6 mmID×15 cm, manufactured by Tosoh Corporation) are used as a column, and tetrahydrofuran (THF) is used as an eluent.

In addition, as the measurement conditions, a sample concentration of 0.45% by mass, a flow rate of 0.35 ml/min, a sample injection amount of 10 μl, and a measurement temperature of 40° C. are set, and a RI detector is used.

A calibration curve is created using 8 samples of "F-40", "F-20", "F-4", "F-1", "A-5000", "A-2500", "A-1000", and "n-propylbenzene" which are "Standard Samples TSK standard, polystyrene" (manufactured by TOSOH Corporation).

However, for a compound in which accurate Mw or Mn cannot be measured by GPC due to a small molecular weight, a molecular weight obtained from a chemical structure of the compound is adopted as Mw or Mn of the compound.

In the drawings, constituent components substantially the same are designated by the same reference numerals, and the description thereof will be omitted.

Hereinafter, the present disclosure will be described in detail.

(Color Conversion Film According to First Aspect)

In a first aspect, as shown in FIG. 1, a color conversion film 10 includes, in the following order, a support 20; a first color conversion layer 30 containing an organic light-emitting material which emits, by excitation light having a wavelength of 400 nm or more and less than 500 nm, light observed in a region having a peak wavelength of 500 nm or more and less than 580 nm; an interlayer 40 which suppresses mixing of the first color conversion layer 30 and a second color conversion layer 50; and a second color conversion layer 50 containing an organic light-emitting material which emits, by at least one of the excitation light having a wavelength of 400 nm or more and less than 500 nm or the light emitted from the organic light-emitting material, light observed in a region having a peak wavelength of 580 nm or more and less than 750 nm.

With the above-described color conversion film, it is possible to provide a color conversion film having excellent color reproducibility.

The reason why the above-described effect is obtained is presumed as follows, but is not limited thereto.

The color conversion film includes, between the first color conversion layer and the second color conversion layer, the interlayer which suppresses mixing of these layers. It is presumed that the color reproducibility of each layer is maintained because the interlayer suppresses the mixing of the first color conversion layer and the second color conversion layer.

(Support)

The support is not particularly limited, and a known support in the related art can be used. Examples of the support include a resin film, glass, ceramic, paper, a metal plate, and a foil.

Examples of a resin material contained in the above-described resin film include polyester such as polyethylene terephthalate (PET), a cellulose resin such as cellulose acetate, a polyolefin resin such as polyethylene and polypropylene, a polyamide resin, a polyimide resin, a polystyrene resin, a polycarbonate resin, a vinyl resin, a silicone resin, a fluororesin, a thermocurable resin, and a photocurable resin.

The above-described resin film may be surface-treated, and for example, a resin film subjected to chemical matting treatment may be used as the support. By using the resin film which is subjected to the chemical matting treatment, it is possible to impart a function of light diffusion layer to the support.

From the viewpoint that it has flexibility, does not undergo significant deformation, shrinkage, or elongation under pressure or under pressure and heat, has excellent transparency, and has excellent smoothness, the above-described resin film is preferably a polyester film and particularly preferably a polyethylene terephthalate film.

The polyester film is preferably a biaxially stretching film.

In addition, a thickness of the polyester film is preferably 20 μm to 250 μm.

Examples of a commercially available product of the polyester film include LUMIRROR (registered trademark) #38-U48, LUMIRROR (registered trademark) #50-U48, LUMIRROR (registered trademark) #75-U48, LUMIRROR (registered trademark) #50-U40, and LUMIRROR (registered trademark) #75-U40 (all of which are manufactured by Toray Industries, Inc.); and COSMOSHINE (registered trademark) A4100 (film thickness: 50 μm, 75 μm, 100 μm, 125 μm, and 188 μm), COSMOSHINE (registered trademark) A4300 (film thickness: 38 μm, 50 μm, 75 μm, 100 μm, 125 μm, 188 μm, and 250 μm), and COSMOSHINE (registered trademark) A8300 (film thickness: 100 μm) (all of which are manufactured by TOYOBO Co., Ltd.).

The support may be manufactured by a known method in the related art, or a commercially available support may be used. Examples of the above-described resin film subjected to the chemical matting treatment include Chemical Matte 125PW manufactured by KIMOTO. Examples of the chemical matting treatment include treating a surface of the film with a chemical agent to form an uneven structure.

A thickness of the support is not particularly limited, but from the viewpoint of strength of the color conversion film and retention of the color conversion layer, it is preferably 20 μm or more, and more preferably 30 μm or more.

In addition, from the viewpoint of downsizing of a backlight unit or the like, the thickness of the support is preferably 1000 μm or less.

(First Color Conversion Layer)

In the first aspect, the first color conversion layer contains an organic light-emitting material (hereinafter, also referred to as a specific organic light-emitting material A) which emits, by excitation light having a wavelength of 400 nm or more and less than 500 nm, light observed in a region having a peak wavelength of 500 nm or more and less than 580 nm.

Examples of the specific organic light-emitting material A include a compound having a fused aryl ring and a derivative thereof. Examples of the fused aryl ring include naphthalene, anthracene, phenanthrene, pyrene, chrycene, naphthacene, triphenylene, perylene, fluorantene, fluorene, and indene.

In addition, examples of the specific organic light-emitting material A include a compound having a heteroaryl ring, a derivative thereof, and a borane compound. Examples of the heteroaryl ring include furan, pyrrole, thiophene, silole, 9-silafluorene, 9,9'-spirobisilafluorene, benzothiophene, benzofuran, indole, dibenzothiophene, dibenzofuran, imidazopyridine, phenanthroline, pyridine, pyrazine, naphthyridine, quinoxaline, and pyrrolopyridine.

In addition, examples of the specific organic light-emitting material A include a stillbene compound, an aromatic acetylene compound, a tetraphenylbutadiene compound, an aldazine compound, a pyrromethene compound, and a diketopyrrolo[3,4-c]pyrrole compound. Examples of the stillbene compound include 1,4-distyrylbenzene, 4,4'-bis(2-(4-diphenylaminophenyl)ethenyl)biphenyl, and 4,4'-bis(N-(stillben-4-yl)-N-phenylamino) stillbene.

In addition, examples of the specific organic light-emitting material A include coumarin compounds such as coumarin 6, coumarin 7, and coumarin 153; azole compounds such as imidazole, thiazole, thiadiazole, carbazole, oxazole, oxadiazole, and triazole and metal complexes thereof; cyanine-based compounds such as indocyanine green; xanthene-based compounds such as fluorescein, eosin, and rhodamine; and thioxanthene-based compounds.

In addition, examples of the specific organic light-emitting material A include polyphenylene-based compounds, naphthalimide compounds, phthalocyanine compounds and metal complexes thereof, porphyrin compounds and metal complexes thereof, oxazine-based compounds such as Nile red and Nile blue, helicene-based compounds, and aromatic amine compounds such as N,N'-diphenyl-N,N'-di(3-methylphenyl)-4,4'-diphenyl-1,1'-diamine.

In addition, examples of the specific organic light-emitting material A include organic metal complex compounds of iridium (Jr), ruthenium (Ru), rhodium (Rh), palladium (Pd), platinum (Pt), osmium (Os), renium (Re), and the like.

However, in the present disclosure, the specific organic light-emitting material A is not limited to those described above.

The specific organic light-emitting material A may be a fluorescent light-emitting material or a phosphorus light-emitting material, but in order to achieve excellent color purity, a fluorescent light-emitting material is preferable.

Among the above, from the viewpoint of excellent thermal stability and photostability, a compound having a fused aryl ring or a derivative thereof is preferable.

In addition, from the viewpoint of solubility and diversity of a molecular structure, the specific organic light-emitting material A is preferably a compound having a coordinate bond. From the viewpoint that a half-width is small and highly efficient light emission is possible, a boron-containing compound such as a boron fluoride complex is also preferable.

For example, as the specific organic light-emitting material A, coumarin compounds such as coumarin 6, coumarin 7, and coumarin 153; cyanine compounds such as indocyanine green; fluorescein compounds such as fluorescein, fluorescein isothiocyanate, and carboxyfluorescein diacetate; phthalocyanine compounds such as phthalocyanine green; perylene compounds such as diisobutyl-4,10-dicyanoperylene-3,9-dicarboxylate; pyrromethene compounds; stillbene compounds; oxazine compounds; naphthalimide compounds; pyrazine compounds; benzoimidazole compounds; benzoxazole compounds; benzothiazole compounds; imidazole pyridine compounds; azole compounds; compounds having a fused aryl ring, such as anthracene; derivatives thereof; aromatic amine compounds; organic metal complex compounds; or the like is preferable. However, the specific organic light-emitting material A is not particularly limited thereto.

Among the above-described compounds, a pyrromethene compound is a particularly suitable compound because it provides an excellent emission quantum yield and has good durability. As the pyrromethene compound, for example, a compound represented by General Formula (1) described below is preferable because it exhibits light emission with excellent color purity.

(Compound Represented by General Formula (1))

The specific organic light-emitting material A is preferably a compound represented by General Formula (1).

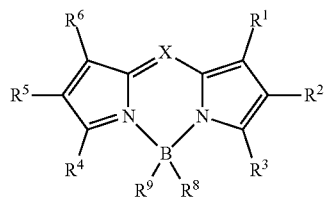

(1)

In General Formula (1), X represents C—$R^7$ or N. $R^1$ to $R^9$ are independently selected from a hydrogen atom, an alkyl group, a cycloalkyl group, a heterocyclic group, an alkenyl group, a cycloalkenyl group, an alkynyl group, a hydroxyl group, a thiol group, an alkoxy group, an alkylthio group, an arylether group, an arylthioether group, an aryl group, a heteroaryl group, halogen, a cyano group, an aldehyde group, a carbonyl group, a carboxyl group, an oxycarbonyl group, a carbamoyl group, an amino group, a nitro group, a silyl group, a siloxanyl group, a boryl group, or a phosphine oxide group, where adjacent groups of $R^1$ to $R^9$ may form a fused ring.

In all the above-described groups, the hydrogen atom may be a deuterium atom.

This also applies to the compound described below or a partial structure thereof. In addition, in the following description, for example, a substituted or unsubstituted aryl group having 6 to 40 carbon atoms is an aryl group in which the number of carbon atoms including the substituent substituted on the aryl group is 6 to 40 carbon atoms. The same applies to other substituents which specify the number of carbon atoms.

In addition, in all the above-described groups, as a substituent in a case of being substituted, an alkyl group, a cycloalkyl group, a heterocyclic group, an alkenyl group, a cycloalkenyl group, an alkynyl group, a hydroxyl group, a thiol group, an alkoxy group, an alkylthio group, an arylether group, an arylthioether group, an aryl group, a heteroaryl group, halogen, a cyano group, an aldehyde group, a carbonyl group, a carboxyl group, an oxycarbonyl group, a carbamoyl group, an amino group, a nitro group, a silyl group, a siloxanyl group, a boryl group, or a phosphine oxide group is preferable, and furthermore, a specific substituent that is preferred in the description of each substituent is preferable. In addition, these substituents may be further substituted with the above-described substituent.

The term "unsubstituted" in the case of "substituted or unsubstituted" means that a hydrogen atom or a deuterium atom has been substituted. The same applies to a case where the compound described below or a partial structure thereof is "substituted or unsubstituted".

In all the above-described groups, the alkyl group represents, for example, a saturated aliphatic hydrocarbon group such as a methyl group, an ethyl group, an n-propyl group, an isopropyl group, an n-butyl group, a sec-butyl group, and a tert-butyl group, and the alkyl group may or may not have a substituent. The additional substituent in a case of being substituted is not particularly limited, and examples thereof an alkyl group, halogen, an aryl group, and a heteroaryl group. This point is also common to the following description. In addition, the number of carbon atoms in the alkyl group is not particularly limited, but from the viewpoint of availability and cost, it is preferably in a range of 1 or more and 20 or less, and more preferably in a range of 1 or more and 8 or less.

The cycloalkyl group represents, for example, a saturated alicyclic hydrocarbon group such as a cyclopropyl group, a cyclohexyl group, a norbornyl group, and an adamantyl group, and the cycloalkyl group may or may not have a substituent. The number of carbon atoms in an alkyl group moiety is not particularly limited, but is preferably in a range of 3 or more and 20 or less.

The heterocyclic group represents, for example, an aliphatic ring having a non-carbon atom in the ring, such as a pyran ring, a piperidine ring, and a cyclic amide, and the heterocyclic group may or may not have a substituent.

The number of carbon atoms in the heterocyclic group is not particularly limited, but is preferably in a range of 2 or more and 20 or less.

The alkenyl group represents, for example, an unsaturated aliphatic hydrocarbon group containing a double bond, such as a vinyl group, an allyl group, and a butadienyl group, and the alkenyl group may or may not have a substituent. The number of carbon atoms in the alkenyl group is not particularly limited, but is preferably in a range of 2 or more and 20 or less.

The cycloalkenyl group represents, for example, an unsaturated alicyclic hydrocarbon group containing a double bond, such as a cyclopentenyl group, a cyclopentadienyl group, and a cyclohexenyl group, and the cycloalkenyl group may or may not have a substituent.

The alkynyl group represents, for example, an unsaturated aliphatic hydrocarbon group containing a triple bond, such as an ethynyl group, and the alkynyl group may or may not have a substituent. The number of carbon atoms in the alkynyl group is not particularly limited, but is preferably in a range of 2 or more and 20 or less.

The alkoxy group represents, for example, a functional group in which an aliphatic hydrocarbon group is bonded through an ether bond, such as a methoxy group, an ethoxy group, and a propoxy group, and the aliphatic hydrocarbon group may or may not have a substituent. The number of carbon atoms in the alkoxy group is not particularly limited, but is preferably in a range of 1 or more and 20 or less.

The alkylthio group is a group in which an oxygen atom of the ether bond of the alkoxy group is replaced with a sulfur atom. A hydrocarbon group of the alkylthio group may or may not have a substituent. The number of carbon atoms in the alkylthio group is not particularly limited, but is preferably in a range of 1 or more and 20 or less.

The arylether group represents, for example, a functional group in which an aromatic hydrocarbon group is bonded through an ether bond, such as a phenoxy group, and the aromatic hydrocarbon group may or may not have a substituent. The number of carbon atoms in the arylether group is not particularly limited, but is preferably in a range of 6 or more and 40 or less.

The arylthioether group is a group in which an oxygen atom of the ether bond of the arylether group is replaced with a sulfur atom. The aromatic hydrocarbon group in the arylthioether group may or may not have a substituent. The number of carbon atoms in the arylthioether group is not particularly limited, but is preferably in a range of 6 or more and 40 or less.

The aryl group represents, for example, an aromatic hydrocarbon group such as a phenyl group, a biphenyl group, a terphenyl group, a naphthyl group, a fluorenyl group, a benzofluorenyl group, a dibenzofluorenyl group, a phenanthryl group, an anthracenyl group, a benzophenanthryl group, a benzoanthracenyl group, a chrysenyl group, a pyrenyl group, a fluoranthenyl group, a triphenylenyl group, a benzofluoranthenyl group, a dibenzoanthracenyl group, a perylenyl group, and a helicenyl group. Among the above, a phenyl group, a biphenyl group, a terphenyl group, a naphthyl group, a fluorenyl group, a phenanthryl group, an anthracenyl group, a pyrenyl group, a fluoranthenyl group, or a triphenylenyl group is preferable. The aryl group may or may not have a substituent. The number of carbon atoms in the aryl group is not particularly limited, but is preferably in a range of 6 or more and 40 or less and more preferably in a range of 6 or more and 30 or less.

In a case where $R^1$ to $R^9$ represent a substituted or unsubstituted aryl group, as the aryl group, a phenyl group, a biphenyl group, a terphenyl group, a naphthyl group, a fluorenyl group, a phenanthryl group, or an anthracenyl group is preferable, a phenyl group, a biphenyl group, a terphenyl group, or a naphthyl group is more preferable. A phenyl group, a biphenyl group, or a terphenyl group is still more preferable, and a phenyl group is particularly preferable.

In a case where each substituent is further substituted with an aryl group, as the aryl group, a phenyl group, a biphenyl group, a terphenyl group, a naphthyl group, a fluorenyl group, a phenanthryl group, or an anthracenyl group is preferable, a phenyl group, a biphenyl group, a terphenyl group, or a naphthyl group is more preferable. A phenyl group is particularly preferable.

The heteroaryl group represents, for example, a cyclic aromatic group having one or more atoms other than carbon in the ring, such as a pyridyl group, a furanyl group, a thienyl group, a quinolinyl group, an isoquinolinyl group, a pyrazinyl group, a pyrimidyl group, a pyridazinyl group, a triazinyl group, a naphthyridinyl group, a cinnolinyl group, a phthalazinyl group, a quinoxalinyl group, a quinazolinyl group, a benzofuranyl group, a benzothienyl group, an indolyl group, a dibenzofuranyl group, a dibenzothienyl group, a carbazolyl group, a benzocarbazolyl group, a carbolinyl group, an indolocarbazolyl group, a benzofurocarbazolyl group, a benzothienocarbazolyl group, a dihydroindenocarbazolyl group, a benzoquinolinyl group, acridinyl group, a dibenzoacridinyl group, a benzimidazolyl group, an imidazopyridyl group, a benzoxazolyl group, a benzothiazolyl group, and a phenanthrolinyl group.

The naphthyridinyl group represents any of a 1,5-naphthyridinyl group, a 1,6-naphthyridinyl group, a 1,7-naphthyridinyl group, a 1,8-naphthyridinyl group, a 2,6-naphthyridinyl group, or a 2,7-naphthyridinyl group. The heteroaryl group may or may not have a substituent. The number of carbon atoms in the heteroaryl group is not particularly limited, but is preferably in a range of 2 or more and 40 or less and more preferably in a range of 2 or more and 30 or less.

In a case where $R^1$ to $R^9$ represent a substituted or unsubstituted heteroaryl group, as the heteroaryl group, a pyridyl group, a furanyl group, a thienyl group, a quinolinyl group, a pyrimidyl group, a triazinyl group, a benzofuranyl group, a benzothienyl group, an indolyl group, a dibenzofuranyl group, a dibenzothienyl group, a carbazolyl group, a benzimidazolyl group, an imidazopyridyl group, a benzoxazolyl group, a benzothiazolyl group, or a phenanthrolinyl group is preferable, and a pyridyl group, a furanyl group, a thienyl group, or a quinolinyl group is more preferable. A pyridyl group is particularly preferable.

In a case where each substituent is further substituted with a heteroaryl group, as the heteroaryl group, a pyridyl group, a furanyl group, a thienyl group, a quinolinyl group, a pyrimidyl group, a triazinyl group, a benzofuranyl group, a benzothienyl group, an indolyl group, a dibenzofuranyl group, a dibenzothienyl group, a carbazolyl group, a benzimidazolyl group, an imidazopyridyl group, a benzoxazolyl group, a benzothiazolyl group, or a phenanthrolinyl group is preferable, and a pyridyl group, a furanyl group, a thienyl group, or a quinolinyl group is more preferable. A pyridyl group is particularly preferable.

The halogen represents an atom selected from fluorine, chlorine, bromine, or iodine. In addition, the carbonyl group, the carboxyl group, the oxycarbonyl group, and the carbamoyl group may or may not have a substituent. Here, examples of the substituent include an alkyl group, a cycloalkyl group, an aryl group, and a heteroaryl group, and these substituents may be further substituted.

The amino group is a substituted or unsubstituted amino group. Examples of the substituent in a case of being substituted include an aryl group, a heteroaryl group, a linear alkyl group, and a branched alkyl group. As the aryl group and the heteroaryl group, a phenyl group, a naphthyl group, a pyridyl group, or a quinolinyl group is preferable. These substituents may be further substituted. The number of carbon atoms is not particularly limited, but is preferably in a range of 2 or more and 50 or less, more preferably in a range of 6 or more and 40 or less, and particularly preferably in a range of 6 or more and 30 or less.

The silyl group represents, for example, an alkylsilyl group such as a trimethylsilyl group, a triethylsilyl group, a tert-butyldimethylsilyl group, a propyldimethylsilyl group, and a vinyldimethylsilyl group; or an arylsilyl group such as a phenyldimethylsilyl group, a tert-butyldiphenylsilyl group, a triphenylsilyl group, and a trinaphthylsilyl group. A substituent on silicon may be further substituted. The number of carbon atoms in the silyl group is not particularly limited, but is preferably in a range of 1 or more and 30 or less.

The siloxanyl group represents, for example, a silicon compound group through an ether bond, such as a trimethylsiloxanyl group. A substituent on silicon may be further substituted.

In addition, the boryl group is a substituted or unsubstituted boryl group. Examples of the substituent in a case of being substituted include an aryl group, a heteroaryl group, a linear alkyl group, a branched alkyl group, an arylether group, an alkoxy group, and a hydroxyl group. Among the above, an aryl group or an arylether group is preferable. In addition, the phosphine oxide group is a group represented by —P(=O)$R^{10}R^{11}$. $R^{10}$ and $R^{11}$ are selected from the same groups as $R^1$ to $R^9$.

The fused ring and the aliphatic ring formed between the adjacent substituents means that any two adjacent substituents (for example, $R^1$ and $R^2$ in General Formula (1)) are bonded to each other to form a conjugated or non-conjugated cyclic skeleton. Examples of a constituent element of such a fused ring and an aliphatic ring include carbon, nitrogen, oxygen, sulfur, phosphorus, and silicon. In addition, the fused ring and the aliphatic ring may be fused with another ring.

Since the compound represented by General Formula (1) exhibits excellent emission quantum yield and has a small half-width of the emission spectrum, it is possible to achieve both efficient color conversion and excellent color purity. Furthermore, in the compound represented by General Formula (1), by introducing an appropriate substituent at an appropriate position, various characteristics and physical properties such as light emission efficiency, color purity, thermal stability, photostability, and dispersibility can be adjusted.

For example, as compared with a case where $R^1$, $R^3$, $R^4$, and $R^6$ all represent hydrogen atoms, a case where at least one of $R^1$, $R^3$, $R^4$, or $R^6$ represents a group selected from the group including a substituted or unsubstituted alkyl group, a substituted or unsubstituted aryl group, and a substituted or unsubstituted heteroaryl group exhibits more excellent thermal stability and photostability.

In a case where at least one of $R^1$, $R^3$, $R^4$, or $R^6$ represents a substituted or unsubstituted alkyl group, as the alkyl group, an alkyl group having 1 to 6 carbon atoms, such as a methyl group, an ethyl group, an n-propyl group, an isopropyl group, an n-butyl group, a sec-butyl group, a tert-butyl group, a pentyl group, and a hexyl group, is preferable.

Further, from the viewpoint of excellent thermal stability, the above-described alkyl group is preferably a methyl group, an ethyl group, an n-propyl group, an isopropyl group, an n-butyl group, an sec-butyl group, or a tert-butyl group. In addition, from the viewpoint of preventing concentration quenching and improving the emission quantum yield, the above-described alkyl group is more preferably a sterically bulky tert-butyl group. In addition, from the viewpoint of ease of synthesis and availability of raw materials, a methyl group is also preferably used as the above-described alkyl group.

In a case where at least one of $R^1$, $R^3$, $R^4$, or $R^6$ represents a substituted or unsubstituted aryl group, as the aryl group, a phenyl group, a biphenyl group, a terphenyl group, or a naphthyl group is preferable, a phenyl group or a biphenyl group is more preferable. A phenyl group is particularly preferable.

In a case where at least one of $R^1$, $R^3$, $R^4$, or $R^6$ represents a substituted or unsubstituted heteroaryl group, as the heteroaryl group, a pyridyl group, a quinolinyl group, or a thienyl group is preferable, and a pyridyl group or a quinolinyl group is more preferable. A pyridyl group is particularly preferable.

A case where all of $R^1$, $R^3$, $R^4$, and $R^6$ each independently represent a substituted or unsubstituted alkyl group is preferable because of its good solubility in a binder resin or a solvent. In this case, from the viewpoint of ease of synthesis and availability of raw materials, the alkyl group is preferably a methyl group.

A case where all of $R^1$, $R^3$, $R^4$, and $R^6$ are each independently a substituted or unsubstituted aryl group or a substituted or unsubstituted heteroaryl group is preferable because it exhibits better thermal stability and photostability. In this case, it is more preferable that all of $R^1$, $R^3$, $R^4$, and $R^6$ each independently represent a substituted or unsubstituted aryl group.

Although there are a plurality of substituents which improve properties, the substituents which exhibit sufficient performance in all of them are limited. In particular, it is difficult to achieve both high light emission efficiency and high color purity. Therefore, by introducing a plurality of types of substituents into the compound represented by General Formula (1), it is possible to obtain a compound having balanced emission characteristics, color purity, and the like.

In particular, in a case where all of $R^1$, $R^3$, $R^4$, and $R^6$ each independently represent a substituted or unsubstituted aryl group, for example, it is preferable to introduce a plurality of types of substituents, such as $R^1 \neq R^4$, $R^3 \neq R^6$, $R^1 \neq R^3$, or $R^4 \neq R^6$.

Here, "$\neq$" indicates that the groups have different structures. For example, $R^1 \neq R^4$ indicates that $R^1$ and $R^4$ are groups having different structures. By introducing a plurality of types of substituents as described above, an aryl group which affects the color purity and an aryl group which affects the light emission efficiency can be simultaneously introduced, so that fine adjustment is possible.

A case where $R^1 \neq R^3$ or $R^4 \neq R^6$ is preferable because the light emission efficiency and the color purity can be improved in a balanced manner. In this case, with respect to the compound represented by General Formula (1), since one or more aryl groups which affect the color purity are introduced to each of pyrrole rings on both side and aryl groups which affect the light emission efficiency are introduced at other positions, both of these properties can be improved. In addition, in the case where $R^1 \neq R^3$ or $R^4 \neq R^6$, from the viewpoint of improving both the heat resistance and the color purity, it is more preferable that $R^1 = R^4$ and $R^3 = R^6$.

As the aryl group which affects the color purity, an aryl group substituted with an electron-donating group is preferable. The electron-donating group is an atomic group which donates an electron to the substituted atomic group by an inductive effect or a resonance effect in organic electron theory. Examples of the electron-donating group include groups having a negative value as the substituent constant ($\sigma p$ (para)) of Hammett's law. The substituent constant ($\sigma p$ (para)) of Hammett's law can be quoted from the 5th edition of the Basics of Chemistry Handbook (page 380 of II).

Specific examples of the electron-donating group include an alkyl group ($\sigma p$ of methyl group: −0.17), an alkoxy group ($\sigma p$ of methoxy group: −0.27), and an amino group ($\sigma p$ of $-NH_2$: −0.66).

In particular, an alkyl group having 1 to 8 carbon atoms or an alkoxy group having 1 to 8 carbon atoms is preferable, and a methyl group, an ethyl group, a tert-butyl group, or a methoxy group is more preferable. From the viewpoint of dispersibility, a tert-butyl group or a methoxy group is particularly preferable, and in a case where these are used as the above-described electron-donating group, in the compound represented by General Formula (1), quenching due to aggregation of molecules can be prevented.

The substitution position of the substituent is not particularly limited, but since it is necessary to suppress torsion of a bond in order to increase the photostability of the compound represented by General Formula (1), it is preferable that the substituent is bonded at a meta-position or para-position with respect to the bonding position with the pyrromethene skeleton. On the other hand, as the aryl group which mainly affects the light emission efficiency, an aryl group having a bulky substituent such as a tert-butyl group, an adamantyl group, or a methoxy group is preferable.

In a case where $R^1$, $R^3$, $R^4$, and $R^6$ each independently represent a substituted or unsubstituted aryl group, it is preferable that $R^1$, $R^3$, $R^4$, and $R^6$ each independently represent a substituted or unsubstituted phenyl group. In this case, it is more preferable that $R^1$, $R^3$, $R^4$, and $R^6$ are each selected from the following Ar-1 to Ar-6. In this case, examples of a preferred combination of $R^1$, $R^3$, $R^4$, and $R^6$ include combinations shown in Tables 1 to 22, but the preferred combination thereof is not limited thereto.

The black circle means a bonding portion with the main skeleton.

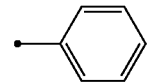

Ar-1

-continued

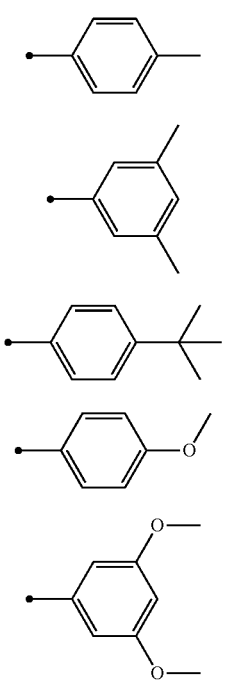

Ar-2

Ar-3

Ar-4

Ar-5

Ar-6

TABLE 1

| R1 | R3 | R4 | R6 |
|---|---|---|---|
| Ar-1 | Ar-1 | Ar-1 | Ar-1 |
| Ar-1 | Ar-1 | Ar-1 | Ar-2 |
| Ar-1 | Ar-1 | Ar-1 | Ar-3 |
| Ar-1 | Ar-1 | Ar-1 | Ar-4 |
| Ar-1 | Ar-1 | Ar-1 | Ar-5 |
| Ar-1 | Ar-1 | Ar-1 | Ar-6 |
| Ar-1 | Ar-1 | Ar-2 | Ar-1 |
| Ar-1 | Ar-1 | Ar-2 | Ar-2 |
| Ar-1 | Ar-1 | Ar-2 | Ar-3 |
| Ar-1 | Ar-1 | Ar-2 | Ar-4 |
| Ar-1 | Ar-1 | Ar-2 | Ar-5 |
| Ar-1 | Ar-1 | Ar-2 | Ar-6 |
| Ar-1 | Ar-1 | Ar-3 | Ar-1 |
| Ar-1 | Ar-1 | Ar-3 | Ar-2 |
| Ar-1 | Ar-1 | Ar-3 | Ar-3 |
| Ar-1 | Ar-1 | Ar-3 | Ar-4 |
| Ar-1 | Ar-1 | Ar-3 | Ar-5 |
| Ar-1 | Ar-1 | Ar-3 | Ar-6 |
| Ar-1 | Ar-1 | Ar-4 | Ar-1 |
| Ar-1 | Ar-1 | Ar-4 | Ar-2 |
| Ar-1 | Ar-1 | Ar-4 | Ar-3 |
| Ar-1 | Ar-1 | Ar-4 | Ar-4 |
| Ar-1 | Ar-1 | Ar-4 | Ar-5 |
| Ar-1 | Ar-1 | Ar-4 | Ar-6 |
| Ar-1 | Ar-1 | Ar-5 | Ar-1 |
| Ar-1 | Ar-1 | Ar-5 | Ar-2 |
| Ar-1 | Ar-1 | Ar-5 | Ar-3 |
| Ar-1 | Ar-1 | Ar-5 | Ar-4 |
| Ar-1 | Ar-1 | Ar-5 | Ar-5 |
| Ar-1 | Ar-1 | Ar-5 | Ar-6 |

TABLE 2

| R1 | R3 | R4 | R6 |
|---|---|---|---|
| Ar-1 | Ar-1 | Ar-6 | Ar-1 |
| Ar-1 | Ar-1 | Ar-6 | Ar-2 |
| Ar-1 | Ar-1 | Ar-6 | Ar-3 |
| Ar-1 | Ar-1 | Ar-6 | Ar-4 |
| Ar-1 | Ar-1 | Ar-6 | Ar-5 |
| Ar-1 | Ar-1 | Ar-6 | Ar-6 |
| Ar-1 | Ar-2 | Ar-1 | Ar-2 |
| Ar-1 | Ar-2 | Ar-1 | Ar-3 |
| Ar-1 | Ar-2 | Ar-1 | Ar-4 |
| Ar-1 | Ar-2 | Ar-1 | Ar-5 |
| Ar-1 | Ar-2 | Ar-1 | Ar-6 |
| Ar-1 | Ar-2 | Ar-2 | Ar-1 |
| Ar-1 | Ar-2 | Ar-2 | Ar-2 |
| Ar-1 | Ar-2 | Ar-2 | Ar-3 |
| Ar-1 | Ar-2 | Ar-2 | Ar-4 |
| Ar-1 | Ar-2 | Ar-2 | Ar-5 |
| Ar-1 | Ar-2 | Ar-2 | Ar-6 |
| Ar-1 | Ar-2 | Ar-3 | Ar-1 |
| Ar-1 | Ar-2 | Ar-3 | Ar-2 |
| Ar-1 | Ar-2 | Ar-3 | Ar-3 |
| Ar-1 | Ar-2 | Ar-3 | Ar-4 |
| Ar-1 | Ar-2 | Ar-3 | Ar-5 |
| Ar-1 | Ar-2 | Ar-3 | Ar-6 |
| Ar-1 | Ar-2 | Ar-4 | Ar-1 |
| Ar-1 | Ar-2 | Ar-4 | Ar-2 |
| Ar-1 | Ar-2 | Ar-4 | Ar-3 |
| Ar-1 | Ar-2 | Ar-4 | Ar-4 |
| Ar-1 | Ar-2 | Ar-4 | Ar-5 |
| Ar-1 | Ar-2 | Ar-4 | Ar-6 |

TABLE 3

| R1 | R3 | R4 | R6 |
|---|---|---|---|
| Ar-1 | Ar-2 | Ar-5 | Ar-1 |
| Ar-1 | Ar-2 | Ar-5 | Ar-2 |
| Ar-1 | Ar-2 | Ar-5 | Ar-3 |
| Ar-1 | Ar-2 | Ar-5 | Ar-4 |
| Ar-1 | Ar-2 | Ar-5 | Ar-5 |
| Ar-1 | Ar-2 | Ar-5 | Ar-6 |
| Ar-1 | Ar-2 | Ar-6 | Ar-1 |
| Ar-1 | Ar-2 | Ar-6 | Ar-2 |
| Ar-1 | Ar-2 | Ar-6 | Ar-3 |
| Ar-1 | Ar-2 | Ar-6 | Ar-4 |
| Ar-1 | Ar-2 | Ar-6 | Ar-5 |
| Ar-1 | Ar-2 | Ar-6 | Ar-6 |
| Ar-1 | Ar-3 | Ar-1 | Ar-2 |
| Ar-1 | Ar-3 | Ar-1 | Ar-3 |
| Ar-1 | Ar-3 | Ar-1 | Ar-4 |
| Ar-1 | Ar-3 | Ar-1 | Ar-5 |
| Ar-1 | Ar-3 | Ar-1 | Ar-6 |
| Ar-1 | Ar-3 | Ar-2 | Ar-2 |
| Ar-1 | Ar-3 | Ar-2 | Ar-3 |
| Ar-1 | Ar-3 | Ar-2 | Ar-4 |
| Ar-1 | Ar-3 | Ar-2 | Ar-5 |
| Ar-1 | Ar-3 | Ar-2 | Ar-6 |
| Ar-1 | Ar-3 | Ar-3 | Ar-1 |
| Ar-1 | Ar-3 | Ar-3 | Ar-2 |
| Ar-1 | Ar-3 | Ar-3 | Ar-3 |
| Ar-1 | Ar-3 | Ar-3 | Ar-4 |
| Ar-1 | Ar-3 | Ar-3 | Ar-5 |
| Ar-1 | Ar-3 | Ar-3 | Ar-6 |
| Ar-1 | Ar-3 | Ar-4 | Ar-1 |
| Ar-1 | Ar-3 | Ar-4 | Ar-2 |
| Ar-1 | Ar-3 | Ar-4 | Ar-3 |

TABLE 4

| R1 | R3 | R4 | R6 |
|---|---|---|---|
| Ar-1 | Ar-3 | Ar-4 | Ar-4 |
| Ar-1 | Ar-3 | Ar-4 | Ar-5 |
| Ar-1 | Ar-3 | Ar-4 | Ar-6 |
| Ar-1 | Ar-3 | Ar-5 | Ar-1 |
| Ar-1 | Ar-3 | Ar-5 | Ar-2 |
| Ar-1 | Ar-3 | Ar-5 | Ar-3 |
| Ar-1 | Ar-3 | Ar-5 | Ar-4 |

TABLE 4-continued

| R1 | R3 | R4 | R6 |
|---|---|---|---|
| Ar-1 | Ar-3 | Ar-5 | Ar-5 |
| Ar-1 | Ar-3 | Ar-5 | Ar-6 |
| Ar-1 | Ar-3 | Ar-6 | Ar-1 |
| Ar-1 | Ar-3 | Ar-6 | Ar-2 |
| Ar-1 | Ar-3 | Ar-6 | Ar-3 |
| Ar-1 | Ar-3 | Ar-6 | Ar-4 |
| Ar-1 | Ar-3 | Ar-6 | Ar-5 |
| Ar-1 | Ar-3 | Ar-6 | Ar-6 |
| Ar-1 | Ar-4 | Ar-1 | Ar-2 |
| Ar-1 | Ar-4 | Ar-1 | Ar-3 |
| Ar-1 | Ar-4 | Ar-1 | Ar-4 |
| Ar-1 | Ar-4 | Ar-1 | Ar-5 |
| Ar-1 | Ar-4 | Ar-1 | Ar-6 |
| Ar-1 | Ar-4 | Ar-2 | Ar-2 |
| Ar-1 | Ar-4 | Ar-2 | Ar-3 |
| Ar-1 | Ar-4 | Ar-2 | Ar-4 |
| Ar-1 | Ar-4 | Ar-2 | Ar-5 |
| Ar-1 | Ar-4 | Ar-2 | Ar-6 |
| Ar-1 | Ar-4 | Ar-3 | Ar-2 |
| Ar-1 | Ar-4 | Ar-3 | Ar-3 |
| Ar-1 | Ar-4 | Ar-3 | Ar-4 |
| Ar-1 | Ar-4 | Ar-3 | Ar-5 |
| Ar-1 | Ar-4 | Ar-3 | Ar-6 |

TABLE 5

| R1 | R3 | R4 | R6 |
|---|---|---|---|
| Ar-1 | Ar-4 | Ar-4 | Ar-1 |
| Ar-1 | Ar-4 | Ar-4 | Ar-2 |
| Ar-1 | Ar-4 | Ar-4 | Ar-3 |
| Ar-1 | Ar-4 | Ar-4 | Ar-4 |
| Ar-1 | Ar-4 | Ar-4 | Ar-5 |
| Ar-1 | Ar-4 | Ar-4 | Ar-6 |
| Ar-1 | Ar-4 | Ar-5 | Ar-1 |
| Ar-1 | Ar-4 | Ar-5 | Ar-2 |
| Ar-1 | Ar-4 | Ar-5 | Ar-3 |
| Ar-1 | Ar-4 | Ar-5 | Ar-4 |
| Ar-1 | Ar-4 | Ar-5 | Ar-5 |
| Ar-1 | Ar-4 | Ar-5 | Ar-6 |
| Ar-1 | Ar-4 | Ar-6 | Ar-1 |
| Ar-1 | Ar-4 | Ar-6 | Ar-2 |
| Ar-1 | Ar-4 | Ar-6 | Ar-3 |
| Ar-1 | Ar-4 | Ar-6 | Ar-4 |
| Ar-1 | Ar-4 | Ar-6 | Ar-5 |
| Ar-1 | Ar-4 | Ar-6 | Ar-6 |
| Ar-1 | Ar-5 | Ar-1 | Ar-2 |
| Ar-1 | Ar-5 | Ar-1 | Ar-3 |
| Ar-1 | Ar-5 | Ar-1 | Ar-4 |
| Ar-1 | Ar-5 | Ar-1 | Ar-5 |
| Ar-1 | Ar-5 | Ar-1 | Ar-6 |
| Ar-1 | Ar-5 | Ar-2 | Ar-2 |
| Ar-1 | Ar-5 | Ar-2 | Ar-3 |
| Ar-1 | Ar-5 | Ar-2 | Ar-4 |
| Ar-1 | Ar-5 | Ar-2 | Ar-5 |
| Ar-1 | Ar-5 | Ar-2 | Ar-6 |
| Ar-1 | Ar-5 | Ar-3 | Ar-2 |
| Ar-1 | Ar-5 | Ar-3 | Ar-3 |

TABLE 6

| R1 | R3 | R4 | R6 |
|---|---|---|---|
| Ar-1 | Ar-5 | Ar-3 | Ar-4 |
| Ar-1 | Ar-5 | Ar-3 | Ar-5 |
| Ar-1 | Ar-5 | Ar-3 | Ar-6 |
| Ar-1 | Ar-5 | Ar-4 | Ar-2 |
| Ar-1 | Ar-5 | Ar-4 | Ar-3 |
| Ar-1 | Ar-5 | Ar-4 | Ar-4 |
| Ar-1 | Ar-5 | Ar-4 | Ar-5 |
| Ar-1 | Ar-5 | Ar-4 | Ar-6 |
| Ar-1 | Ar-5 | Ar-5 | Ar-1 |
| Ar-1 | Ar-5 | Ar-5 | Ar-2 |
| Ar-1 | Ar-5 | Ar-5 | Ar-3 |
| Ar-1 | Ar-5 | Ar-5 | Ar-4 |
| Ar-1 | Ar-5 | Ar-5 | Ar-5 |
| Ar-1 | Ar-5 | Ar-5 | Ar-6 |
| Ar-1 | Ar-5 | Ar-6 | Ar-1 |
| Ar-1 | Ar-5 | Ar-6 | Ar-2 |
| Ar-1 | Ar-5 | Ar-6 | Ar-3 |
| Ar-1 | Ar-5 | Ar-6 | Ar-4 |
| Ar-1 | Ar-5 | Ar-6 | Ar-5 |
| Ar-1 | Ar-5 | Ar-6 | Ar-6 |
| Ar-1 | Ar-6 | Ar-1 | Ar-2 |
| Ar-1 | Ar-6 | Ar-1 | Ar-3 |
| Ar-1 | Ar-6 | Ar-1 | Ar-4 |
| Ar-1 | Ar-6 | Ar-1 | Ar-5 |
| Ar-1 | Ar-6 | Ar-1 | Ar-6 |
| Ar-1 | Ar-6 | Ar-2 | Ar-2 |
| Ar-1 | Ar-6 | Ar-2 | Ar-3 |
| Ar-1 | Ar-6 | Ar-2 | Ar-4 |
| Ar-1 | Ar-6 | Ar-2 | Ar-5 |
| Ar-1 | Ar-6 | Ar-2 | Ar-6 |

TABLE 7

| R1 | R3 | R4 | R6 |
|---|---|---|---|
| Ar-1 | Ar-6 | Ar-3 | Ar-2 |
| Ar-1 | Ar-6 | Ar-3 | Ar-3 |
| Ar-1 | Ar-6 | Ar-3 | Ar-4 |
| Ar-1 | Ar-6 | Ar-3 | Ar-5 |
| Ar-1 | Ar-6 | Ar-3 | Ar-6 |
| Ar-1 | Ar-6 | Ar-4 | Ar-2 |
| Ar-1 | Ar-6 | Ar-4 | Ar-3 |
| Ar-1 | Ar-6 | Ar-4 | Ar-4 |
| Ar-1 | Ar-6 | Ar-4 | Ar-5 |
| Ar-1 | Ar-6 | Ar-4 | Ar-6 |
| Ar-1 | Ar-6 | Ar-5 | Ar-2 |
| Ar-1 | Ar-6 | Ar-5 | Ar-3 |
| Ar-1 | Ar-6 | Ar-5 | Ar-4 |
| Ar-1 | Ar-6 | Ar-5 | Ar-5 |
| Ar-1 | Ar-6 | Ar-5 | Ar-6 |
| Ar-1 | Ar-6 | Ar-6 | Ar-1 |
| Ar-1 | Ar-6 | Ar-6 | Ar-2 |
| Ar-1 | Ar-6 | Ar-6 | Ar-3 |
| Ar-1 | Ar-6 | Ar-6 | Ar-4 |
| Ar-1 | Ar-6 | Ar-6 | Ar-5 |
| Ar-1 | Ar-6 | Ar-6 | Ar-6 |
| Ar-2 | Ar-1 | Ar-1 | Ar-2 |
| Ar-2 | Ar-1 | Ar-1 | Ar-3 |
| Ar-2 | Ar-1 | Ar-1 | Ar-4 |
| Ar-2 | Ar-1 | Ar-1 | Ar-5 |
| Ar-2 | Ar-1 | Ar-1 | Ar-6 |
| Ar-2 | Ar-1 | Ar-2 | Ar-2 |
| Ar-2 | Ar-1 | Ar-2 | Ar-3 |
| Ar-2 | Ar-1 | Ar-2 | Ar-4 |
| Ar-2 | Ar-1 | Ar-2 | Ar-5 |

TABLE 8

| R1 | R3 | R4 | R6 |
|---|---|---|---|
| Ar-2 | Ar-1 | Ar-2 | Ar-6 |
| Ar-2 | Ar-1 | Ar-3 | Ar-2 |
| Ar-2 | Ar-1 | Ar-3 | Ar-3 |
| Ar-2 | Ar-1 | Ar-3 | Ar-4 |
| Ar-2 | Ar-1 | Ar-3 | Ar-5 |
| Ar-2 | Ar-1 | Ar-3 | Ar-6 |
| Ar-2 | Ar-1 | Ar-4 | Ar-2 |
| Ar-2 | Ar-1 | Ar-4 | Ar-3 |
| Ar-2 | Ar-1 | Ar-4 | Ar-4 |
| Ar-2 | Ar-1 | Ar-4 | Ar-5 |
| Ar-2 | Ar-1 | Ar-4 | Ar-6 |
| Ar-2 | Ar-1 | Ar-5 | Ar-2 |
| Ar-2 | Ar-1 | Ar-5 | Ar-3 |

TABLE 8-continued

| R1 | R3 | R4 | R6 |
|---|---|---|---|
| Ar-2 | Ar-1 | Ar-5 | Ar-4 |
| Ar-2 | Ar-1 | Ar-5 | Ar-5 |
| Ar-2 | Ar-1 | Ar-5 | Ar-6 |
| Ar-2 | Ar-1 | Ar-6 | Ar-2 |
| Ar-2 | Ar-1 | Ar-6 | Ar-3 |
| Ar-2 | Ar-1 | Ar-6 | Ar-4 |
| Ar-2 | Ar-1 | Ar-6 | Ar-5 |
| Ar-2 | Ar-1 | Ar-6 | Ar-6 |
| Ar-2 | Ar-2 | Ar-1 | Ar-3 |
| Ar-2 | Ar-2 | Ar-1 | Ar-4 |
| Ar-2 | Ar-2 | Ar-1 | Ar-5 |
| Ar-2 | Ar-2 | Ar-1 | Ar-6 |
| Ar-2 | Ar-2 | Ar-2 | Ar-2 |
| Ar-2 | Ar-2 | Ar-2 | Ar-3 |
| Ar-2 | Ar-2 | Ar-2 | Ar-4 |
| Ar-2 | Ar-2 | Ar-2 | Ar-5 |
| Ar-2 | Ar-2 | Ar-2 | Ar-6 |

TABLE 9

| R1 | R3 | R4 | R6 |
|---|---|---|---|
| Ar-2 | Ar-2 | Ar-3 | Ar-2 |
| Ar-2 | Ar-2 | Ar-3 | Ar-3 |
| Ar-2 | Ar-2 | Ar-3 | Ar-4 |
| Ar-2 | Ar-2 | Ar-3 | Ar-5 |
| Ar-2 | Ar-2 | Ar-3 | Ar-6 |
| Ar-2 | Ar-2 | Ar-4 | Ar-2 |
| Ar-2 | Ar-2 | Ar-4 | Ar-3 |
| Ar-2 | Ar-2 | Ar-4 | Ar-4 |
| Ar-2 | Ar-2 | Ar-4 | Ar-5 |
| Ar-2 | Ar-2 | Ar-4 | Ar-6 |
| Ar-2 | Ar-2 | Ar-5 | Ar-2 |
| Ar-2 | Ar-2 | Ar-5 | Ar-3 |
| Ar-2 | Ar-2 | Ar-5 | Ar-4 |
| Ar-2 | Ar-2 | Ar-5 | Ar-5 |
| Ar-2 | Ar-2 | Ar-5 | Ar-6 |
| Ar-2 | Ar-2 | Ar-6 | Ar-2 |
| Ar-2 | Ar-2 | Ar-6 | Ar-3 |
| Ar-2 | Ar-2 | Ar-6 | Ar-4 |
| Ar-2 | Ar-2 | Ar-6 | Ar-5 |
| Ar-2 | Ar-2 | Ar-6 | Ar-6 |
| Ar-2 | Ar-3 | Ar-1 | Ar-3 |
| Ar-2 | Ar-3 | Ar-1 | Ar-4 |
| Ar-2 | Ar-3 | Ar-1 | Ar-5 |
| Ar-2 | Ar-3 | Ar-1 | Ar-6 |
| Ar-2 | Ar-3 | Ar-2 | Ar-3 |
| Ar-2 | Ar-3 | Ar-2 | Ar-4 |
| Ar-2 | Ar-3 | Ar-2 | Ar-5 |
| Ar-2 | Ar-3 | Ar-2 | Ar-6 |
| Ar-2 | Ar-3 | Ar-3 | Ar-2 |
| Ar-2 | Ar-3 | Ar-3 | Ar-3 |

TABLE 10

| R1 | R3 | R4 | R6 |
|---|---|---|---|
| Ar-2 | Ar-3 | Ar-3 | Ar-4 |
| Ar-2 | Ar-3 | Ar-3 | Ar-5 |
| Ar-2 | Ar-3 | Ar-3 | Ar-6 |
| Ar-2 | Ar-3 | Ar-4 | Ar-2 |
| Ar-2 | Ar-3 | Ar-4 | Ar-3 |
| Ar-2 | Ar-3 | Ar-4 | Ar-4 |
| Ar-2 | Ar-3 | Ar-4 | Ar-5 |
| Ar-2 | Ar-3 | Ar-4 | Ar-6 |
| Ar-2 | Ar-3 | Ar-5 | Ar-2 |
| Ar-2 | Ar-3 | Ar-5 | Ar-3 |
| Ar-2 | Ar-3 | Ar-5 | Ar-4 |
| Ar-2 | Ar-3 | Ar-5 | Ar-5 |
| Ar-2 | Ar-3 | Ar-5 | Ar-6 |
| Ar-2 | Ar-3 | Ar-6 | Ar-2 |
| Ar-2 | Ar-3 | Ar-6 | Ar-3 |
| Ar-2 | Ar-3 | Ar-6 | Ar-4 |

TABLE 10-continued

| R1 | R3 | R4 | R6 |
|---|---|---|---|
| Ar-2 | Ar-3 | Ar-6 | Ar-5 |
| Ar-2 | Ar-3 | Ar-6 | Ar-6 |
| Ar-2 | Ar-4 | Ar-1 | Ar-3 |
| Ar-2 | Ar-4 | Ar-1 | Ar-4 |
| Ar-2 | Ar-4 | Ar-1 | Ar-5 |
| Ar-2 | Ar-4 | Ar-1 | Ar-6 |
| Ar-2 | Ar-4 | Ar-2 | Ar-3 |
| Ar-2 | Ar-4 | Ar-2 | Ar-4 |
| Ar-2 | Ar-4 | Ar-2 | Ar-5 |
| Ar-2 | Ar-4 | Ar-2 | Ar-6 |
| Ar-2 | Ar-4 | Ar-3 | Ar-3 |
| Ar-2 | Ar-4 | Ar-3 | Ar-4 |
| Ar-2 | Ar-4 | Ar-3 | Ar-5 |
| Ar-2 | Ar-4 | Ar-3 | Ar-6 |

TABLE 11

| R1 | R3 | R4 | R6 |
|---|---|---|---|
| Ar-2 | Ar-4 | Ar-4 | Ar-2 |
| Ar-2 | Ar-4 | Ar-4 | Ar-3 |
| Ar-2 | Ar-4 | Ar-4 | Ar-4 |
| Ar-2 | Ar-4 | Ar-4 | Ar-5 |
| Ar-2 | Ar-4 | Ar-4 | Ar-6 |
| Ar-2 | Ar-4 | Ar-5 | Ar-2 |
| Ar-2 | Ar-4 | Ar-5 | Ar-3 |
| Ar-2 | Ar-4 | Ar-5 | Ar-4 |
| Ar-2 | Ar-4 | Ar-5 | Ar-5 |
| Ar-2 | Ar-4 | Ar-5 | Ar-6 |
| Ar-2 | Ar-4 | Ar-6 | Ar-2 |
| Ar-2 | Ar-4 | Ar-6 | Ar-3 |
| Ar-2 | Ar-4 | Ar-6 | Ar-4 |
| Ar-2 | Ar-4 | Ar-6 | Ar-5 |
| Ar-2 | Ar-5 | Ar-6 | Ar-6 |
| Ar-2 | Ar-5 | Ar-1 | Ar-3 |
| Ar-2 | Ar-5 | Ar-1 | Ar-4 |
| Ar-2 | Ar-5 | Ar-1 | Ar-5 |
| Ar-2 | Ar-5 | Ar-1 | Ar-6 |
| Ar-2 | Ar-5 | Ar-2 | Ar-3 |
| Ar-2 | Ar-5 | Ar-2 | Ar-4 |
| Ar-2 | Ar-5 | Ar-2 | Ar-5 |
| Ar-2 | Ar-5 | Ar-2 | Ar-6 |
| Ar-2 | Ar-5 | Ar-3 | Ar-3 |
| Ar-2 | Ar-5 | Ar-3 | Ar-4 |
| Ar-2 | Ar-5 | Ar-3 | Ar-5 |
| Ar-2 | Ar-5 | Ar-3 | Ar-6 |
| Ar-2 | Ar-5 | Ar-4 | Ar-3 |
| Ar-2 | Ar-5 | Ar-4 | Ar-4 |
| Ar-2 | Ar-5 | Ar-4 | Ar-5 |
| Ar-2 | Ar-5 | Ar-4 | Ar-6 |

TABLE 12

| R1 | R3 | R4 | R6 |
|---|---|---|---|
| Ar-2 | Ar-5 | Ar-5 | Ar-2 |
| Ar-2 | Ar-5 | Ar-5 | Ar-3 |
| Ar-2 | Ar-5 | Ar-5 | Ar-4 |
| Ar-2 | Ar-5 | Ar-5 | Ar-5 |
| Ar-2 | Ar-5 | Ar-5 | Ar-6 |
| Ar-2 | Ar-5 | Ar-6 | Ar-2 |
| Ar-2 | Ar-5 | Ar-6 | Ar-3 |
| Ar-2 | Ar-5 | Ar-6 | Ar-4 |
| Ar-2 | Ar-5 | Ar-6 | Ar-5 |
| Ar-2 | Ar-5 | Ar-6 | Ar-6 |
| Ar-2 | Ar-6 | Ar-1 | Ar-3 |
| Ar-2 | Ar-6 | Ar-1 | Ar-4 |
| Ar-2 | Ar-6 | Ar-1 | Ar-5 |
| Ar-2 | Ar-6 | Ar-1 | Ar-6 |
| Ar-2 | Ar-6 | Ar-2 | Ar-3 |
| Ar-2 | Ar-6 | Ar-2 | Ar-4 |
| Ar-2 | Ar-6 | Ar-2 | Ar-5 |
| Ar-2 | Ar-6 | Ar-2 | Ar-6 |

TABLE 12-continued

| R1 | R3 | R4 | R6 |
|---|---|---|---|
| Ar-2 | Ar-6 | Ar-3 | Ar-3 |
| Ar-2 | Ar-6 | Ar-3 | Ar-4 |
| Ar-2 | Ar-6 | Ar-3 | Ar-5 |
| Ar-2 | Ar-6 | Ar-3 | Ar-6 |
| Ar-2 | Ar-6 | Ar-4 | Ar-3 |
| Ar-2 | Ar-6 | Ar-4 | Ar-4 |
| Ar-2 | Ar-6 | Ar-4 | Ar-5 |
| Ar-2 | Ar-6 | Ar-4 | Ar-6 |
| Ar-2 | Ar-6 | Ar-5 | Ar-3 |
| Ar-2 | Ar-6 | Ar-5 | Ar-4 |
| Ar-2 | Ar-6 | Ar-5 | Ar-5 |
| Ar-2 | Ar-6 | Ar-5 | Ar-6 |

TABLE 13

| R1 | R3 | R4 | R6 |
|---|---|---|---|
| Ar-2 | Ar-6 | Ar-6 | Ar-2 |
| Ar-2 | Ar-6 | Ar-6 | Ar-3 |
| Ar-2 | Ar-6 | Ar-6 | Ar-4 |
| Ar-2 | Ar-6 | Ar-6 | Ar-5 |
| Ar-2 | Ar-6 | Ar-6 | Ar-6 |
| Ar-3 | Ar-1 | Ar-1 | Ar-3 |
| Ar-3 | Ar-1 | Ar-1 | Ar-4 |
| Ar-3 | Ar-1 | Ar-1 | Ar-5 |
| Ar-3 | Ar-1 | Ar-1 | Ar-6 |
| Ar-3 | Ar-1 | Ar-2 | Ar-3 |
| Ar-3 | Ar-1 | Ar-2 | Ar-4 |
| Ar-3 | Ar-1 | Ar-2 | Ar-5 |
| Ar-3 | Ar-1 | Ar-2 | Ar-6 |
| Ar-3 | Ar-1 | Ar-3 | Ar-3 |
| Ar-3 | Ar-1 | Ar-3 | Ar-4 |
| Ar-3 | Ar-1 | Ar-3 | Ar-5 |
| Ar-3 | Ar-1 | Ar-3 | Ar-6 |
| Ar-3 | Ar-1 | Ar-4 | Ar-3 |
| Ar-3 | Ar-1 | Ar-4 | Ar-4 |
| Ar-3 | Ar-1 | Ar-4 | Ar-5 |
| Ar-3 | Ar-1 | Ar-4 | Ar-6 |
| Ar-3 | Ar-1 | Ar-5 | Ar-3 |
| Ar-3 | Ar-1 | Ar-5 | Ar-4 |
| Ar-3 | Ar-1 | Ar-5 | Ar-5 |
| Ar-3 | Ar-1 | Ar-5 | Ar-6 |
| Ar-3 | Ar-1 | Ar-6 | Ar-3 |
| Ar-3 | Ar-1 | Ar-6 | Ar-4 |
| Ar-3 | Ar-1 | Ar-6 | Ar-5 |
| Ar-3 | Ar-1 | Ar-6 | Ar-6 |
| Ar-3 | Ar-2 | Ar-1 | Ar-4 |
| Ar-3 | Ar-2 | Ar-1 | Ar-5 |

TABLE 14

| R1 | R3 | R4 | R6 |
|---|---|---|---|
| Ar-3 | Ar-2 | Ar-1 | Ar-6 |
| Ar-3 | Ar-2 | Ar-2 | Ar-3 |
| Ar-3 | Ar-2 | Ar-2 | Ar-4 |
| Ar-3 | Ar-2 | Ar-2 | Ar-5 |
| Ar-3 | Ar-2 | Ar-2 | Ar-6 |
| Ar-3 | Ar-2 | Ar-3 | Ar-3 |
| Ar-3 | Ar-2 | Ar-3 | Ar-4 |
| Ar-3 | Ar-2 | Ar-3 | Ar-5 |
| Ar-3 | Ar-2 | Ar-3 | Ar-6 |
| Ar-3 | Ar-2 | Ar-4 | Ar-3 |
| Ar-3 | Ar-2 | Ar-4 | Ar-4 |
| Ar-3 | Ar-2 | Ar-4 | Ar-5 |
| Ar-3 | Ar-2 | Ar-4 | Ar-6 |
| Ar-3 | Ar-2 | Ar-5 | Ar-3 |
| Ar-3 | Ar-2 | Ar-5 | Ar-4 |
| Ar-3 | Ar-2 | Ar-5 | Ar-5 |
| Ar-3 | Ar-2 | Ar-5 | Ar-6 |
| Ar-3 | Ar-2 | Ar-6 | Ar-3 |
| Ar-3 | Ar-2 | Ar-6 | Ar-4 |
| Ar-3 | Ar-2 | Ar-6 | Ar-5 |

TABLE 14-continued

| R1 | R3 | R4 | R6 |
|---|---|---|---|
| Ar-3 | Ar-2 | Ar-6 | Ar-6 |
| Ar-3 | Ar-3 | Ar-1 | Ar-4 |
| Ar-3 | Ar-3 | Ar-1 | Ar-5 |
| Ar-3 | Ar-3 | Ar-1 | Ar-6 |
| Ar-3 | Ar-3 | Ar-2 | Ar-4 |
| Ar-3 | Ar-3 | Ar-2 | Ar-5 |
| Ar-3 | Ar-3 | Ar-2 | Ar-6 |
| Ar-3 | Ar-3 | Ar-3 | Ar-3 |
| Ar-3 | Ar-3 | Ar-3 | Ar-4 |
| Ar-3 | Ar-3 | Ar-3 | Ar-5 |

TABLE 15

| R1 | R3 | R4 | R6 |
|---|---|---|---|
| Ar-3 | Ar-3 | Ar-3 | Ar-6 |
| Ar-3 | Ar-3 | Ar-4 | Ar-3 |
| Ar-3 | Ar-3 | Ar-4 | Ar-4 |
| Ar-3 | Ar-3 | Ar-4 | Ar-5 |
| Ar-3 | Ar-3 | Ar-4 | Ar-6 |
| Ar-3 | Ar-3 | Ar-5 | Ar-3 |
| Ar-3 | Ar-3 | Ar-5 | Ar-4 |
| Ar-3 | Ar-3 | Ar-5 | Ar-5 |
| Ar-3 | Ar-3 | Ar-5 | Ar-6 |
| Ar-3 | Ar-3 | Ar-6 | Ar-3 |
| Ar-3 | Ar-3 | Ar-6 | Ar-4 |
| Ar-3 | Ar-3 | Ar-6 | Ar-5 |
| Ar-3 | Ar-3 | Ar-6 | Ar-6 |
| Ar-3 | Ar-4 | Ar-1 | Ar-4 |
| Ar-3 | Ar-4 | Ar-1 | Ar-5 |
| Ar-3 | Ar-4 | Ar-1 | Ar-6 |
| Ar-3 | Ar-4 | Ar-2 | Ar-4 |
| Ar-3 | Ar-4 | Ar-2 | Ar-5 |
| Ar-3 | Ar-4 | Ar-2 | Ar-6 |
| Ar-3 | Ar-4 | Ar-3 | Ar-4 |
| Ar-3 | Ar-4 | Ar-3 | Ar-5 |
| Ar-3 | Ar-4 | Ar-3 | Ar-6 |
| Ar-3 | Ar-4 | Ar-4 | Ar-3 |
| Ar-3 | Ar-4 | Ar-4 | Ar-4 |
| Ar-3 | Ar-4 | Ar-4 | Ar-5 |
| Ar-3 | Ar-4 | Ar-4 | Ar-6 |
| Ar-3 | Ar-4 | Ar-5 | Ar-3 |
| Ar-3 | Ar-4 | Ar-5 | Ar-4 |
| Ar-3 | Ar-4 | Ar-5 | Ar-5 |
| Ar-3 | Ar-4 | Ar-5 | Ar-6 |

TABLE 16

| R1 | R3 | R4 | R6 |
|---|---|---|---|
| Ar-3 | Ar-4 | Ar-6 | Ar-3 |
| Ar-3 | Ar-4 | Ar-6 | Ar-4 |
| Ar-3 | Ar-4 | Ar-6 | Ar-5 |
| Ar-3 | Ar-4 | Ar-6 | Ar-6 |
| Ar-3 | Ar-5 | Ar-1 | Ar-4 |
| Ar-3 | Ar-5 | Ar-1 | Ar-5 |
| Ar-3 | Ar-5 | Ar-1 | Ar-6 |
| Ar-3 | Ar-5 | Ar-2 | Ar-4 |
| Ar-3 | Ar-5 | Ar-2 | Ar-5 |
| Ar-3 | Ar-5 | Ar-2 | Ar-6 |
| Ar-3 | Ar-5 | Ar-3 | Ar-4 |
| Ar-3 | Ar-5 | Ar-3 | Ar-5 |
| Ar-3 | Ar-5 | Ar-3 | Ar-6 |
| Ar-3 | Ar-5 | Ar-4 | Ar-4 |
| Ar-3 | Ar-5 | Ar-4 | Ar-5 |
| Ar-3 | Ar-5 | Ar-4 | Ar-6 |
| Ar-3 | Ar-5 | Ar-5 | Ar-3 |
| Ar-3 | Ar-5 | Ar-5 | Ar-4 |
| Ar-3 | Ar-5 | Ar-5 | Ar-5 |
| Ar-3 | Ar-5 | Ar-5 | Ar-6 |
| Ar-3 | Ar-5 | Ar-6 | Ar-3 |
| Ar-3 | Ar-5 | Ar-6 | Ar-4 |
| Ar-3 | Ar-5 | Ar-6 | Ar-5 |

TABLE 16-continued

| R1 | R3 | R4 | R6 |
|---|---|---|---|
| Ar-3 | Ar-5 | Ar-6 | Ar-6 |
| Ar-3 | Ar-6 | Ar-1 | Ar-4 |
| Ar-3 | Ar-6 | Ar-1 | Ar-5 |
| Ar-3 | Ar-6 | Ar-1 | Ar-6 |
| Ar-3 | Ar-6 | Ar-2 | Ar-4 |
| Ar-3 | Ar-6 | Ar-2 | Ar-5 |
| Ar-3 | Ar-6 | Ar-2 | Ar-6 |

TABLE 17

| R1 | R3 | R4 | R6 |
|---|---|---|---|
| Ar-3 | Ar-6 | Ar-3 | Ar-4 |
| Ar-3 | Ar-6 | Ar-3 | Ar-5 |
| Ar-3 | Ar-6 | Ar-3 | Ar-6 |
| Ar-3 | Ar-6 | Ar-4 | Ar-4 |
| Ar-3 | Ar-6 | Ar-4 | Ar-5 |
| Ar-3 | Ar-6 | Ar-4 | Ar-6 |
| Ar-3 | Ar-6 | Ar-5 | Ar-4 |
| Ar-3 | Ar-6 | Ar-5 | Ar-5 |
| Ar-3 | Ar-6 | Ar-5 | Ar-6 |
| Ar-3 | Ar-6 | Ar-6 | Ar-3 |
| Ar-3 | Ar-6 | Ar-6 | Ar-4 |
| Ar-3 | Ar-6 | Ar-6 | Ar-5 |
| Ar-3 | Ar-6 | Ar-6 | Ar-6 |
| Ar-4 | Ar-1 | Ar-1 | Ar-4 |
| Ar-4 | Ar-1 | Ar-1 | Ar-5 |
| Ar-4 | Ar-1 | Ar-1 | Ar-6 |
| Ar-4 | Ar-1 | Ar-2 | Ar-4 |
| Ar-4 | Ar-1 | Ar-2 | Ar-5 |
| Ar-4 | Ar-1 | Ar-2 | Ar-6 |
| Ar-4 | Ar-1 | Ar-3 | Ar-4 |
| Ar-4 | Ar-1 | Ar-3 | Ar-5 |
| Ar-4 | Ar-1 | Ar-3 | Ar-6 |
| Ar-4 | Ar-1 | Ar-4 | Ar-4 |
| Ar-4 | Ar-1 | Ar-4 | Ar-5 |
| Ar-4 | Ar-1 | Ar-4 | Ar-6 |
| Ar-4 | Ar-1 | Ar-5 | Ar-4 |
| Ar-4 | Ar-1 | Ar-5 | Ar-5 |
| Ar-4 | Ar-1 | Ar-5 | Ar-6 |
| Ar-4 | Ar-1 | Ar-6 | Ar-4 |
| Ar-4 | Ar-1 | Ar-6 | Ar-5 |
| Ar-4 | Ar-1 | Ar-6 | Ar-6 |

TABLE 18

| R1 | R3 | R4 | R6 |
|---|---|---|---|
| Ar-4 | Ar-2 | Ar-1 | Ar-5 |
| Ar-4 | Ar-2 | Ar-1 | Ar-6 |
| Ar-4 | Ar-2 | Ar-2 | Ar-4 |
| Ar-4 | Ar-2 | Ar-2 | Ar-5 |
| Ar-4 | Ar-2 | Ar-2 | Ar-6 |
| Ar-4 | Ar-2 | Ar-3 | Ar-4 |
| Ar-4 | Ar-2 | Ar-3 | Ar-5 |
| Ar-4 | Ar-2 | Ar-3 | Ar-6 |
| Ar-4 | Ar-2 | Ar-4 | Ar-4 |
| Ar-4 | Ar-2 | Ar-4 | Ar-5 |
| Ar-4 | Ar-2 | Ar-4 | Ar-6 |
| Ar-4 | Ar-2 | Ar-5 | Ar-4 |
| Ar-4 | Ar-2 | Ar-5 | Ar-5 |
| Ar-4 | Ar-2 | Ar-5 | Ar-6 |
| Ar-4 | Ar-2 | Ar-6 | Ar-4 |
| Ar-4 | Ar-2 | Ar-6 | Ar-5 |
| Ar-4 | Ar-2 | Ar-6 | Ar-6 |
| Ar-4 | Ar-3 | Ar-1 | Ar-5 |
| Ar-4 | Ar-3 | Ar-1 | Ar-6 |
| Ar-4 | Ar-3 | Ar-2 | Ar-5 |
| Ar-4 | Ar-3 | Ar-2 | Ar-6 |
| Ar-4 | Ar-3 | Ar-3 | Ar-4 |
| Ar-4 | Ar-3 | Ar-3 | Ar-5 |
| Ar-4 | Ar-3 | Ar-3 | Ar-6 |
| Ar-4 | Ar-3 | Ar-4 | Ar-4 |

TABLE 18-continued

| R1 | R3 | R4 | R6 |
|---|---|---|---|
| Ar-4 | Ar-3 | Ar-4 | Ar-5 |
| Ar-4 | Ar-3 | Ar-4 | Ar-6 |
| Ar-4 | Ar-3 | Ar-5 | Ar-4 |
| Ar-4 | Ar-3 | Ar-5 | Ar-5 |
| Ar-4 | Ar-3 | Ar-5 | Ar-6 |

TABLE 19

| R1 | R3 | R4 | R6 |
|---|---|---|---|
| Ar-4 | Ar-3 | Ar-6 | Ar-4 |
| Ar-4 | Ar-3 | Ar-6 | Ar-5 |
| Ar-4 | Ar-3 | Ar-6 | Ar-6 |
| Ar-4 | Ar-4 | Ar-1 | Ar-5 |
| Ar-4 | Ar-4 | Ar-1 | Ar-6 |
| Ar-4 | Ar-4 | Ar-2 | Ar-5 |
| Ar-4 | Ar-4 | Ar-2 | Ar-6 |
| Ar-4 | Ar-4 | Ar-3 | Ar-5 |
| Ar-4 | Ar-4 | Ar-3 | Ar-6 |
| Ar-4 | Ar-4 | Ar-4 | Ar-4 |
| Ar-4 | Ar-4 | Ar-4 | Ar-5 |
| Ar-4 | Ar-4 | Ar-4 | Ar-6 |
| Ar-4 | Ar-4 | Ar-5 | Ar-4 |
| Ar-4 | Ar-4 | Ar-5 | Ar-5 |
| Ar-4 | Ar-4 | Ar-5 | Ar-6 |
| Ar-4 | Ar-4 | Ar-6 | Ar-4 |
| Ar-4 | Ar-4 | Ar-6 | Ar-5 |
| Ar-4 | Ar-4 | Ar-6 | Ar-6 |
| Ar-4 | Ar-5 | Ar-1 | Ar-5 |
| Ar-4 | Ar-5 | Ar-1 | Ar-6 |
| Ar-4 | Ar-5 | Ar-2 | Ar-5 |
| Ar-4 | Ar-5 | Ar-2 | Ar-6 |
| Ar-4 | Ar-5 | Ar-3 | Ar-5 |
| Ar-4 | Ar-5 | Ar-3 | Ar-6 |
| Ar-4 | Ar-5 | Ar-4 | Ar-5 |
| Ar-4 | Ar-5 | Ar-4 | Ar-6 |
| Ar-4 | Ar-5 | Ar-5 | Ar-4 |
| Ar-4 | Ar-5 | Ar-5 | Ar-5 |
| Ar-4 | Ar-5 | Ar-5 | Ar-6 |
| Ar-4 | Ar-5 | Ar-6 | Ar-4 |
| Ar-4 | Ar-5 | Ar-6 | Ar-5 |

TABLE 20

| R1 | R3 | R4 | R6 |
|---|---|---|---|
| Ar-4 | Ar-5 | Ar-6 | Ar-6 |
| Ar-4 | Ar-6 | Ar-1 | Ar-5 |
| Ar-4 | Ar-6 | Ar-2 | Ar-5 |
| Ar-4 | Ar-6 | Ar-2 | Ar-6 |
| Ar-4 | Ar-6 | Ar-3 | Ar-5 |
| Ar-4 | Ar-6 | Ar-3 | Ar-6 |
| Ar-4 | Ar-6 | Ar-4 | Ar-5 |
| Ar-4 | Ar-6 | Ar-4 | Ar-6 |
| Ar-4 | Ar-6 | Ar-5 | Ar-5 |
| Ar-4 | Ar-6 | Ar-5 | Ar-6 |
| Ar-4 | Ar-6 | Ar-6 | Ar-4 |
| Ar-4 | Ar-6 | Ar-6 | Ar-5 |
| Ar-4 | Ar-6 | Ar-6 | Ar-6 |
| Ar-5 | Ar-1 | Ar-1 | Ar-5 |
| Ar-5 | Ar-1 | Ar-1 | Ar-6 |
| Ar-5 | Ar-1 | Ar-2 | Ar-5 |
| Ar-5 | Ar-1 | Ar-2 | Ar-6 |
| Ar-5 | Ar-1 | Ar-3 | Ar-5 |
| Ar-5 | Ar-1 | Ar-3 | Ar-6 |
| Ar-5 | Ar-1 | Ar-4 | Ar-5 |
| Ar-5 | Ar-1 | Ar-4 | Ar-6 |
| Ar-5 | Ar-1 | Ar-5 | Ar-5 |
| Ar-5 | Ar-1 | Ar-5 | Ar-6 |
| Ar-5 | Ar-1 | Ar-6 | Ar-5 |
| Ar-5 | Ar-1 | Ar-6 | Ar-6 |
| Ar-5 | Ar-2 | Ar-1 | Ar-6 |

TABLE 20-continued

| R1 | R3 | R4 | R6 |
|---|---|---|---|
| Ar-5 | Ar-2 | Ar-2 | Ar-5 |
| Ar-5 | Ar-2 | Ar-2 | Ar-6 |
| Ar-5 | Ar-2 | Ar-3 | Ar-5 |
| Ar-5 | Ar-2 | Ar-3 | Ar-6 |

TABLE 21

| R1 | R3 | R4 | R6 |
|---|---|---|---|
| Ar-5 | Ar-2 | Ar-4 | Ar-5 |
| Ar-5 | Ar-2 | Ar-4 | Ar-6 |
| Ar-5 | Ar-2 | Ar-5 | Ar-5 |
| Ar-5 | Ar-2 | Ar-5 | Ar-6 |
| Ar-5 | Ar-2 | Ar-6 | Ar-5 |
| Ar-5 | Ar-2 | Ar-6 | Ar-6 |
| Ar-5 | Ar-3 | Ar-1 | Ar-6 |
| Ar-5 | Ar-3 | Ar-2 | Ar-6 |
| Ar-5 | Ar-3 | Ar-3 | Ar-5 |
| Ar-5 | Ar-3 | Ar-3 | Ar-6 |
| Ar-5 | Ar-3 | Ar-4 | Ar-5 |
| Ar-5 | Ar-3 | Ar-4 | Ar-6 |
| Ar-5 | Ar-3 | Ar-5 | Ar-5 |
| Ar-5 | Ar-3 | Ar-5 | Ar-6 |
| Ar-5 | Ar-3 | Ar-6 | Ar-5 |
| Ar-5 | Ar-3 | Ar-6 | Ar-6 |
| Ar-5 | Ar-4 | Ar-1 | Ar-6 |
| Ar-5 | Ar-4 | Ar-2 | Ar-6 |
| Ar-5 | Ar-4 | Ar-3 | Ar-6 |
| Ar-5 | Ar-4 | Ar-4 | Ar-5 |
| Ar-5 | Ar-4 | Ar-4 | Ar-6 |
| Ar-5 | Ar-4 | Ar-5 | Ar-5 |
| Ar-5 | Ar-4 | Ar-5 | Ar-6 |
| Ar-5 | Ar-4 | Ar-6 | Ar-5 |
| Ar-5 | Ar-4 | Ar-6 | Ar-6 |
| Ar-5 | Ar-5 | Ar-1 | Ar-6 |
| Ar-5 | Ar-5 | Ar-2 | Ar-6 |
| Ar-5 | Ar-5 | Ar-3 | Ar-6 |
| Ar-5 | Ar-5 | Ar-4 | Ar-6 |
| Ar-5 | Ar-5 | Ar-5 | Ar-5 |
| Ar-5 | Ar-5 | Ar-5 | Ar-6 |

TABLE 22

| R1 | R3 | R4 | R6 |
|---|---|---|---|
| Ar-5 | Ar-5 | Ar-6 | Ar-5 |
| Ar-5 | Ar-5 | Ar-6 | Ar-6 |
| Ar-5 | Ar-6 | Ar-1 | Ar-6 |
| Ar-5 | Ar-6 | Ar-2 | Ar-6 |
| Ar-5 | Ar-6 | Ar-3 | Ar-6 |
| Ar-5 | Ar-6 | Ar-4 | Ar-6 |
| Ar-5 | Ar-6 | Ar-5 | Ar-6 |
| Ar-5 | Ar-6 | Ar-6 | Ar-5 |
| Ar-5 | Ar-6 | Ar-6 | Ar-6 |
| Ar-6 | Ar-1 | Ar-1 | Ar-6 |
| Ar-6 | Ar-1 | Ar-2 | Ar-6 |
| Ar-6 | Ar-1 | Ar-3 | Ar-6 |
| Ar-6 | Ar-1 | Ar-4 | Ar-6 |
| Ar-6 | Ar-1 | Ar-5 | Ar-6 |
| Ar-6 | Ar-1 | Ar-6 | Ar-6 |
| Ar-6 | Ar-2 | Ar-2 | Ar-6 |
| Ar-6 | Ar-2 | Ar-3 | Ar-6 |
| Ar-6 | Ar-2 | Ar-4 | Ar-6 |
| Ar-6 | Ar-2 | Ar-5 | Ar-6 |
| Ar-6 | Ar-2 | Ar-6 | Ar-6 |
| Ar-6 | Ar-3 | Ar-3 | Ar-6 |
| Ar-6 | Ar-3 | Ar-4 | Ar-6 |
| Ar-6 | Ar-3 | Ar-5 | Ar-6 |
| Ar-6 | Ar-3 | Ar-6 | Ar-6 |
| Ar-6 | Ar-4 | Ar-4 | Ar-6 |
| Ar-6 | Ar-4 | Ar-5 | Ar-6 |
| Ar-6 | Ar-4 | Ar-6 | Ar-6 |
| Ar-6 | Ar-5 | Ar-5 | Ar-6 |
| Ar-6 | Ar-5 | Ar-6 | Ar-6 |
| Ar-6 | Ar-6 | Ar-6 | Ar-6 |

It is preferable that $R^2$ and $R^5$ are any one of a hydrogen atom, an alkyl group, a carbonyl group, an oxycarbonyl group, or an aryl group. Among these, from the viewpoint of thermal stability, a hydrogen atom or an alkyl group is preferable, and from the viewpoint that it is easy to obtain a narrow half-width in the emission spectrum, a hydrogen atom is more preferable.

It is preferable that $R^8$ and $R^9$ represent an alkyl group, an aryl group, a heteroaryl group, fluorine, a fluorine-containing alkyl group, a fluorine-containing heteroaryl group, or a fluorine-containing aryl group. In particular, since it is stable to the excitation light and a more excellent emission quantum yield is obtained, it is more preferable that $R^8$ and $R^9$ represent fluorine or a fluorine-containing aryl group. Furthermore, from the viewpoint of ease of synthesis, it is still more preferable that $R^8$ and $R^9$ are fluorine.

The fluorine-containing aryl group is an aryl group containing fluorine, and examples thereof include a fluorophenyl group, a trifluoromethylphenyl group, and a pentafluorophenyl group. The fluorine-containing heteroaryl group is a heteroaryl group containing fluorine, and examples thereof include a fluoropyridyl group, a trifluoromethylpyridyl group, and a trifluoropyridyl group. The fluorine-containing alkyl group is an alkyl group containing fluorine, and examples thereof include a trifluoromethyl group and a pentafluoroethyl group.

In General Formula (1), from the viewpoint of photostability, it is preferable that X represents C—$R^7$. In a case where X represents C—$R^7$, the substituent $R^7$ has a great influence on durability of the compound represented by General Formula (1), that is, decrease in light emission intensity of the compound over time. Specifically, in a case where $R^7$ represents a hydrogen atom, since reactivity of this portion is high, moisture or oxygen in the air easily reacts with the portion. This may cause decomposition of the compound represented by General Formula (1). In addition, in a case where $R^7$ represents a substituent having a high degree of freedom of molecular chain movement, such as an alkyl group, the reactivity is lowered, but the compounds aggregate with each other in the color conversion film over time, and as a result, concentration quenching may cause a decrease in light emission intensity. Therefore, it is preferable that $R^7$ represents a group which is rigid, has a small degree of freedom of movement, and is unlikely to cause aggregation, and specifically, it is preferable either a substituted or unsubstituted aryl group or a substituted or unsubstituted heteroaryl group.

From the viewpoint of providing more excellent emission quantum yield, less thermal decomposition, and photostability, it is preferable that X represents C—$R^7$ and $R^7$ represents a substituted or unsubstituted aryl group. As the aryl group, from the viewpoint of not impairing a light emission wavelength, a phenyl group, a biphenyl group, a terphenyl group, a naphthyl group, a fluorenyl group, a phenanthryl group, or an anthracenyl group is preferable.

Further, in a case where the torsion is excessively large, in order to increase the photostability of the compound represented by General Formula (1), since the photostability decreases due to increased reactivity to the excitation light, it is preferable to moderately suppress torsion of the carbon-carbon bond between $R^7$ and the pyrromethene skeleton.

From the above-described viewpoint, $R^7$ preferably represents a substituted or unsubstituted phenyl group, a substituted or unsubstituted biphenyl group, a substituted or unsubstituted terphenyl group, or a substituted or unsubstituted naphthyl group, and more preferably represents a substituted or unsubstituted phenyl group, a substituted or unsubstituted biphenyl group, or a substituted or unsubstituted terphenyl group. $R^7$ particularly preferably represents a substituted or unsubstituted phenyl group.

In addition, $R^7$ preferably represents an appropriately bulky substituent. Since $R^7$ has a certain degree of bulkiness, the aggregation of molecules can be prevented, and as a result, the light emission efficiency and durability of the compound represented by General Formula (1) are further improved.

More preferred examples of the bulky substituent include a structure of $R^7$ represented by General Formula (2).

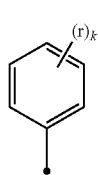

(2)

In General Formula (2), r is selected from the group consisting of a hydrogen atom, an alkyl group, a cycloalkyl group, a heterocyclic group, an alkenyl group, a cycloalkenyl group, an alkynyl group, a hydroxyl group, a thiol group, an alkoxy group, an alkylthio group, an arylether group, an arylthioether group, an aryl group, a heteroaryl group, halogen, a cyano group, an aldehyde group, a carbonyl group, a carboxyl group, an oxycarbonyl group, a carbamoyl group, an amino group, a nitro group, a silyl group, a siloxanyl group, a boryl group, and a phosphine oxide group. k is an integer of 1 to 3. In a case where k is 2 or more, r's may be the same or different from each other.

From the viewpoint of emission quantum yield, r preferably represents a substituted or unsubstituted aryl group. Among the above-described aryl groups, particularly preferred examples of the aryl group include a phenyl group or a naphthyl group. In a case where r represents an aryl group, k in General Formula (2) is preferably 1 or 2, and from the viewpoint of further preventing aggregation of molecules, more preferably 2. Further, in a case where k is 2 or more, it is preferable that at least one of r is substituted with an alkyl group. From the viewpoint of thermal stability, particularly preferred examples of the alkyl group include a methyl group, an ethyl group, and a tert-butyl group.

From the viewpoint of control of fluorescence wavelength and absorption wavelength, and compatibility with the solvent, r preferably represents a substituted or unsubstituted alkyl group, a substituted or unsubstituted alkoxy group, or halogen, and more preferably represents a methyl group, an ethyl group, a tert-butyl group, or a methoxy group. From the viewpoint of dispersibility, r particularly preferably represents a tert-butyl group or a methoxy group. The fact that r represents a tert-butyl group or a methoxy group is also effective from the viewpoint of preventing quenching due to the aggregation of molecules.

In addition, as another aspect of the compound represented by General Formula (1), it is preferable that at least one of $R^1$ to $R^7$ represents an electron-attracting group.

In particular, it is preferable that (1) at least one of $R^1$ to $R^6$ represents an electron-attracting group, (2) $R^7$ represents an electron-attracting group, or (3) at least one of $R^1$ to $R^6$ represents an electron-attracting group and $R^7$ represents an electron-attracting group.

By introducing the electron-attracting group into the pyrromethene skeleton of the above-described compound, an electron density of the pyrromethene skeleton can be significantly reduced. Accordingly, the stability of the above-described compound with respect to oxygen is further improved, and as a result, the durability of the above-described compound can be further improved.

The electron-attracting group is also called as an electron-accepting group, and is an atomic group which attracts an electron from the substituted atomic group by an inductive effect or a resonance effect in organic electron theory. Examples of the electron-attracting group include groups having a positive value as the substituent constant (σp (para)) of Hammett's law. The substituent constant (σp (para)) of Hammett's law can be quoted from the 5th edition of the Basics of Chemistry Handbook (page 380 of II). In some cases, the phenyl group also takes a positive value as described above, but in the present disclosure, the electron-attracting group does not include the phenyl group.

Examples of the electron-attracting group include —F (σp: +0.06), —Cl (σp: +0.23), —Br (σp: +0.23), —I (σp: +0.18), —$CO_2R^{12}$ (σp: +0.45 in a case where $R^{12}$ is an ethyl group), —$CONH_2$ (σp: +0.38), —$COR^{12}$ (σp: +0.49 in a case where $R^{12}$ is a methyl group), —$CF_3$ (σp: +0.50), —$SO_2R^{12}$ (σp: +0.69 in a case where $R^{12}$ is a methyl group), and —$NO_2$ (σp: +0.81).

$R^{12}$'s each independently represent a hydrogen atom, a substituted or unsubstituted aromatic hydrocarbon group having 6 to 30 ring-forming carbon atoms, a substituted or unsubstituted heterocyclic group having 5 to 30 ring-forming carbon atoms, a substituted or unsubstituted alkyl group having 1 to 30 carbon atoms, or a substituted or unsubstituted cycloalkyl group having 1 to 30 carbon atoms. Specific examples of each of these groups include the same examples as described above.

From the viewpoint of decomposability, preferred examples of the electron-attracting group include fluorine, a fluorine-containing aryl group, a fluorine-containing heteroaryl group, a fluorine-containing alkyl group, a substituted or unsubstituted acyl group, a substituted or unsubstituted ester group, a substituted or unsubstituted amide group, a substituted or unsubstituted sulfonyl group, and a cyano group.

More preferred examples of the electron-attracting group include a fluorine-containing alkyl group, a fluorine-containing aryl group, a substituted or unsubstituted acyl group, a substituted or unsubstituted ester group, and a cyano group.

According to the electron-attracting group described above, the concentration quenching can be prevented and the emission quantum yield can be improved. The electron-attracting group is particularly preferably a substituted or unsubstituted ester group.

Preferred examples of the compound represented by General Formula (1), which can be suitably used as the specific organic light-emitting material A, include a case where all of $R^1$, $R^3$, $R^4$, and $R^6$ each independently represent a substituted or unsubstituted alkyl group, X represents C—$R^7$, and $R^7$ represents the group represented by General Formula (2). In this case, it is particularly preferable that $R^7$ represents the group represented by General Formula (2), in which r is a substituted or unsubstituted phenyl group.

Examples of the compound represented by General Formula (1) are shown below, but the compound is not limited thereto.
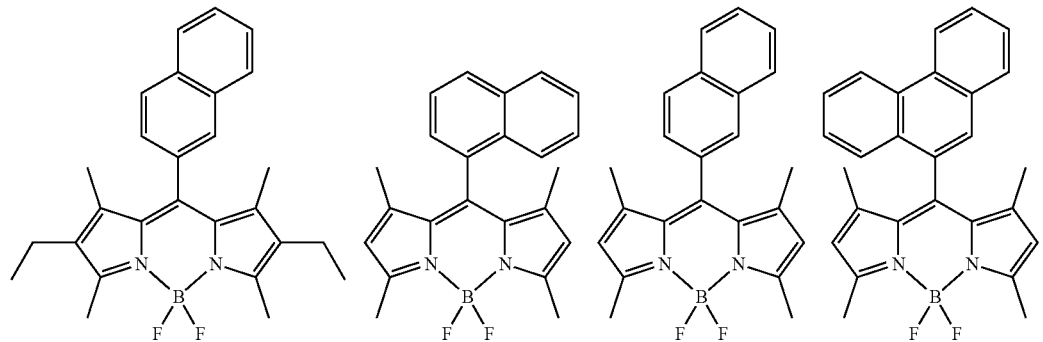
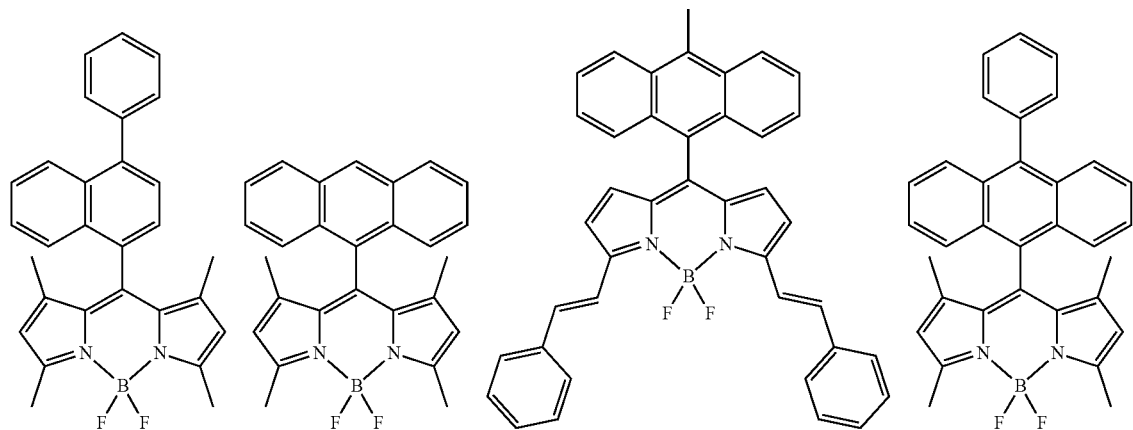
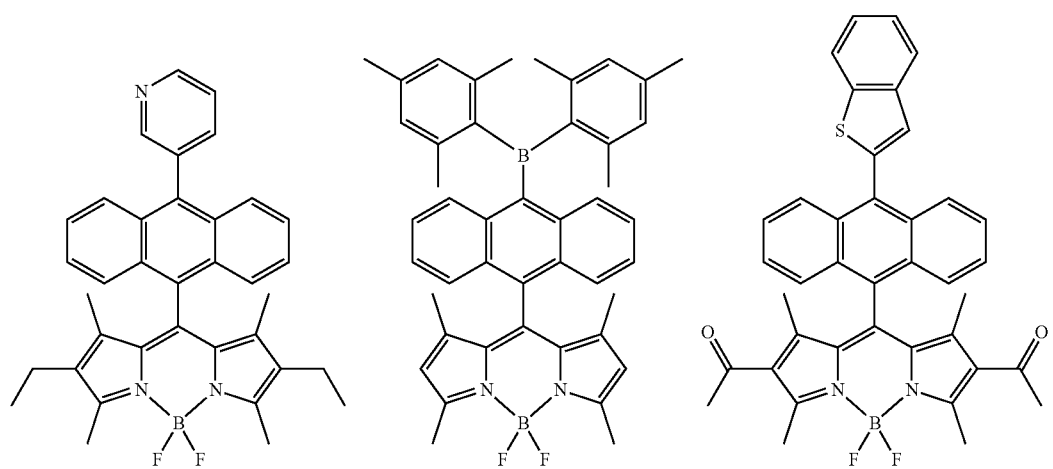

-continued
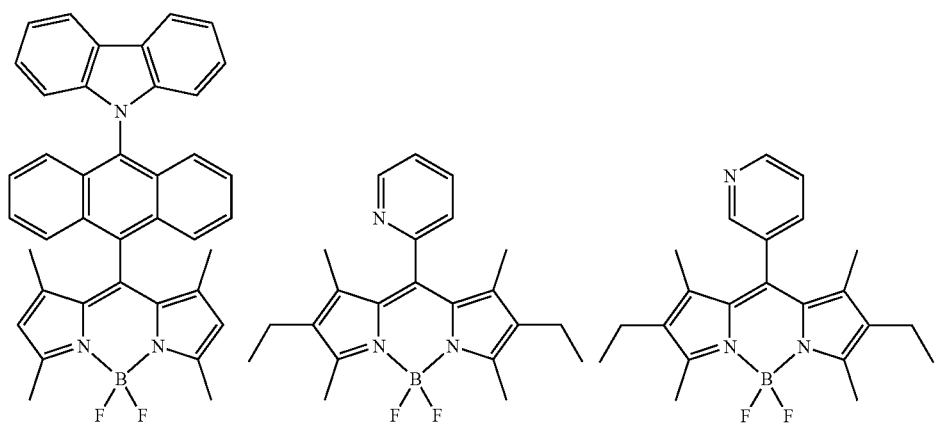
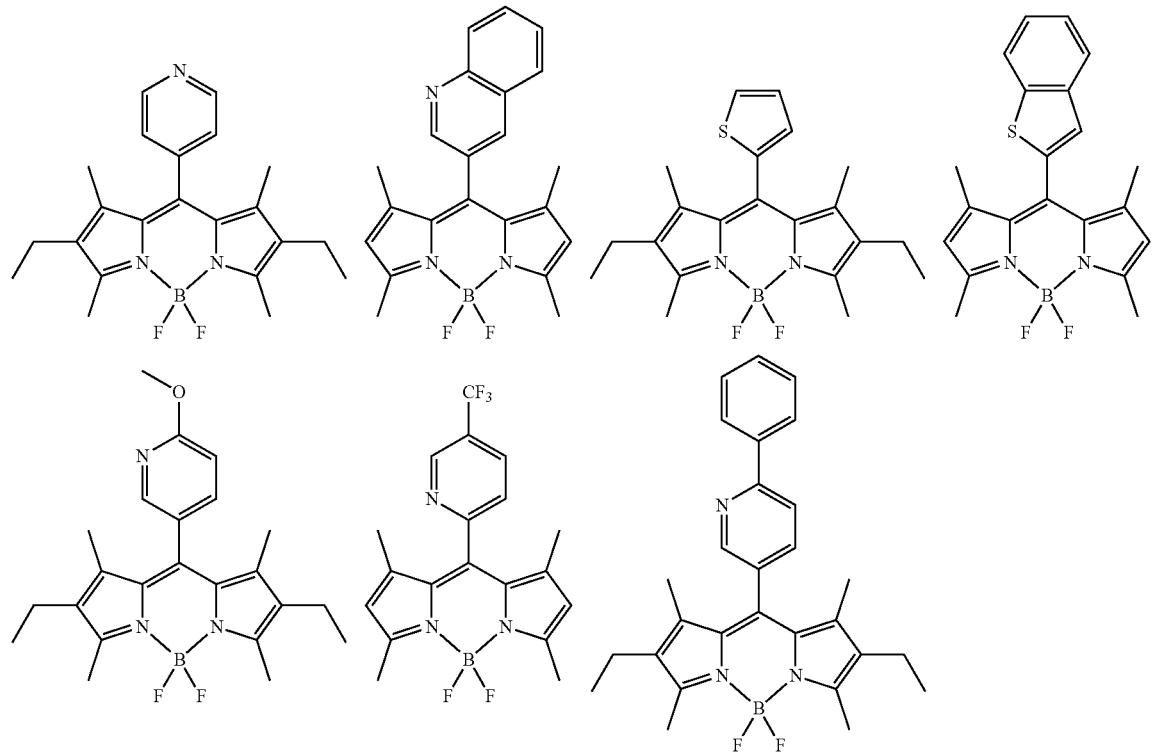
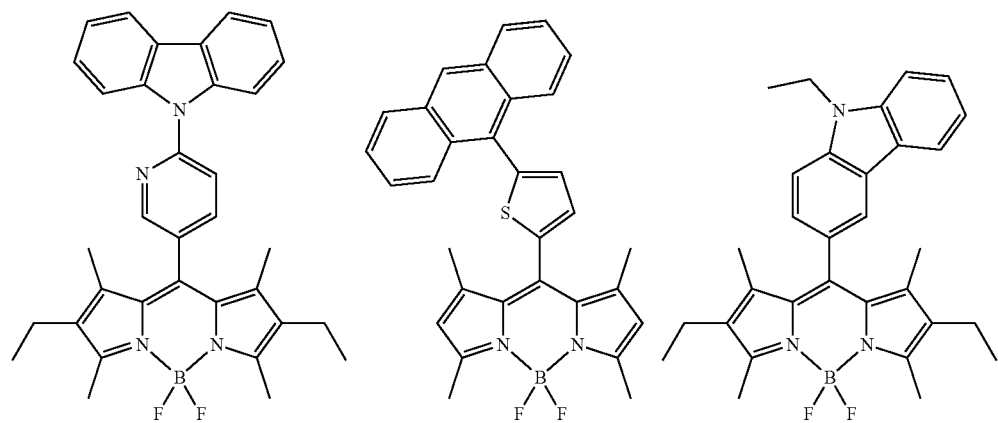

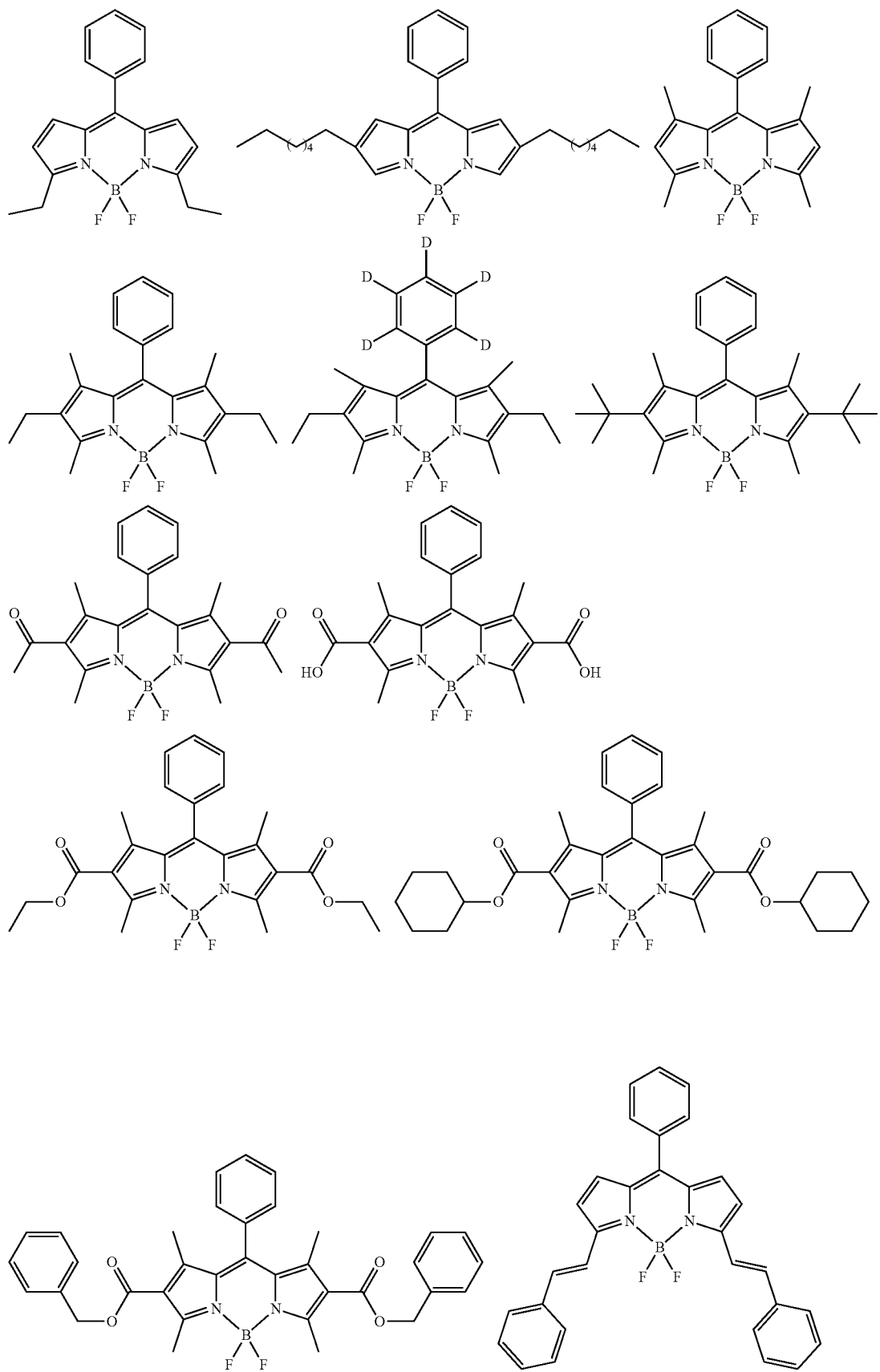

-continued
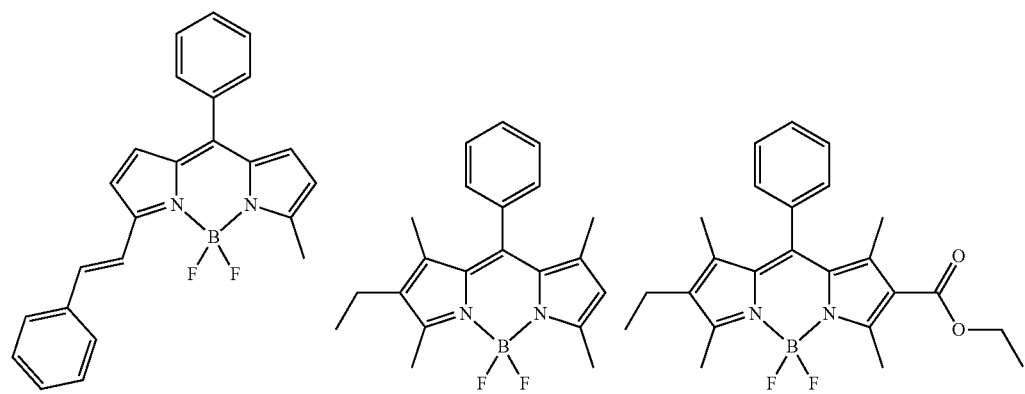
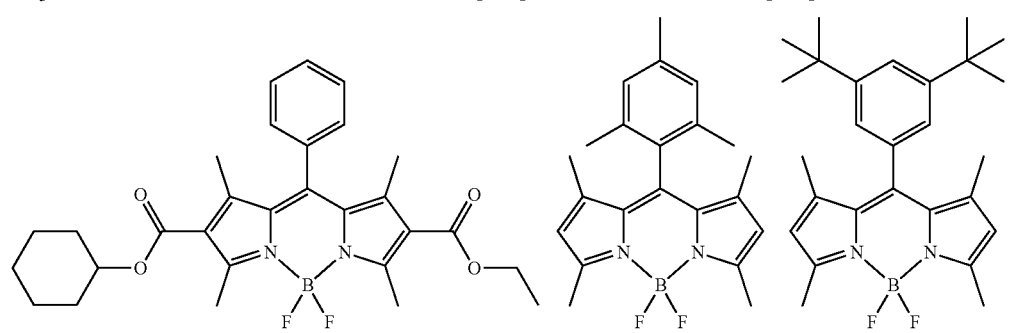
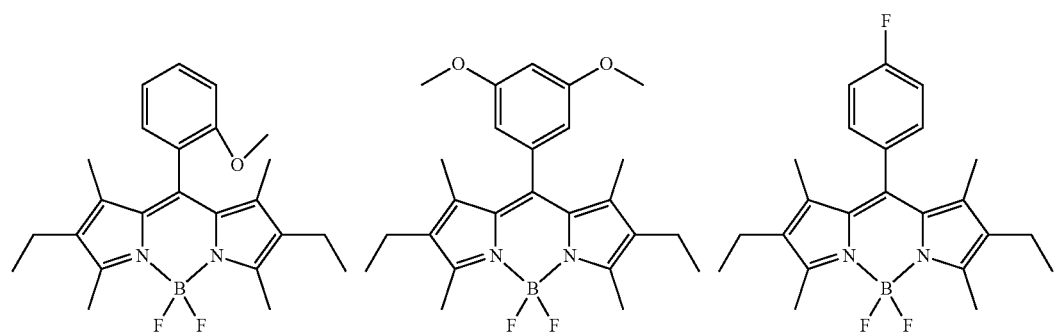
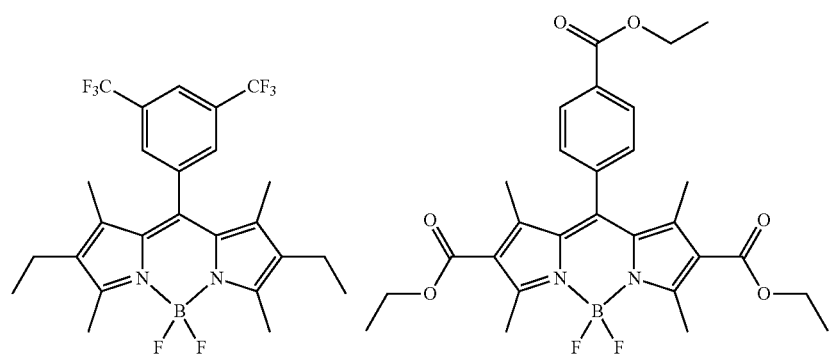

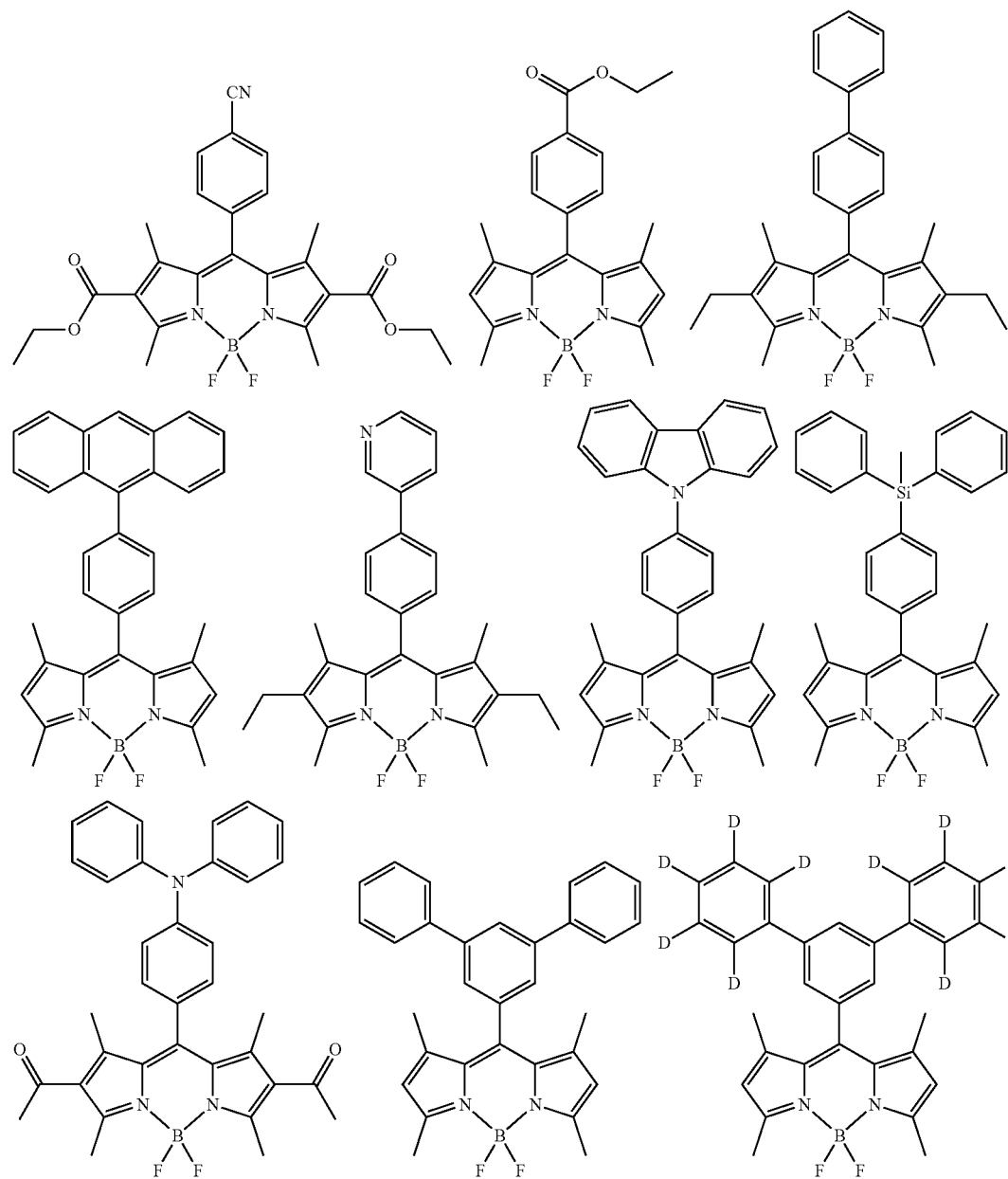
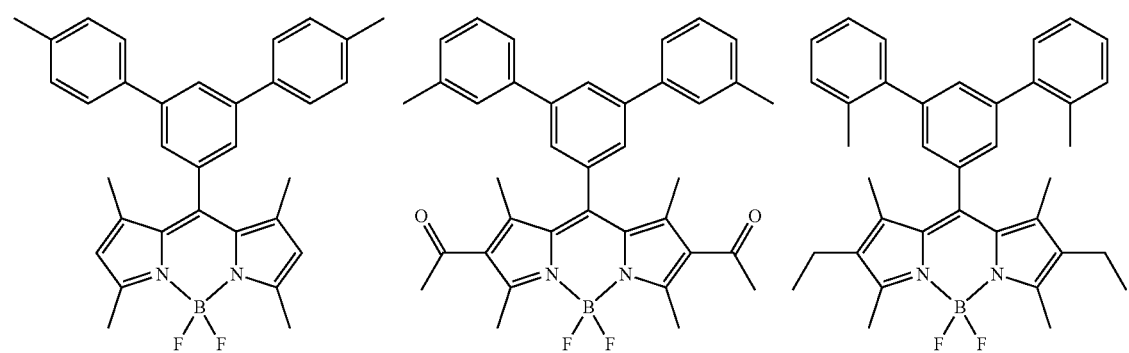

-continued
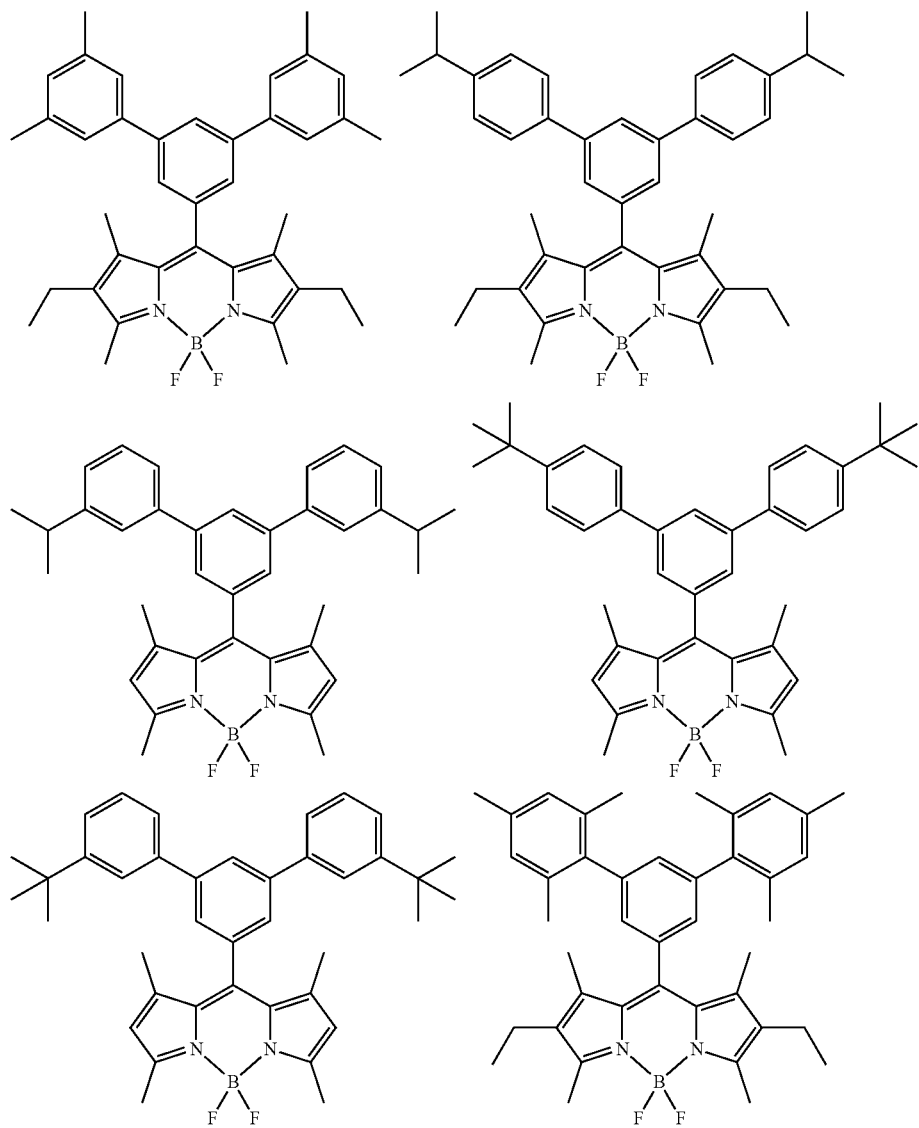
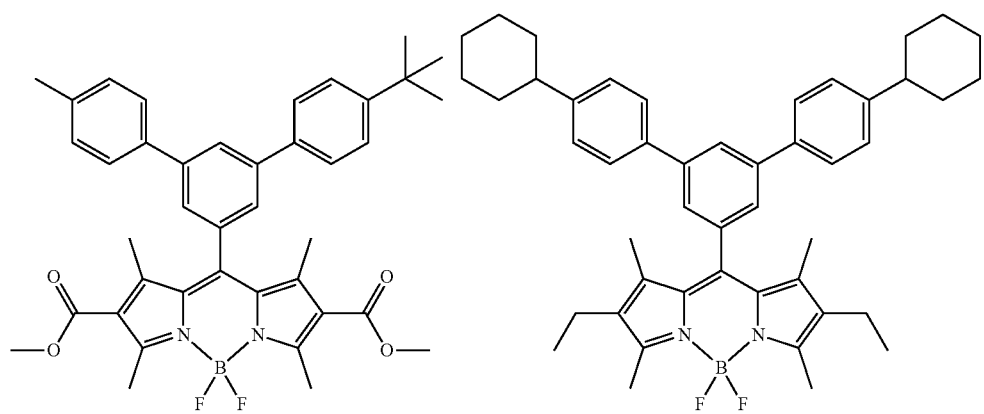

41
42
-continued
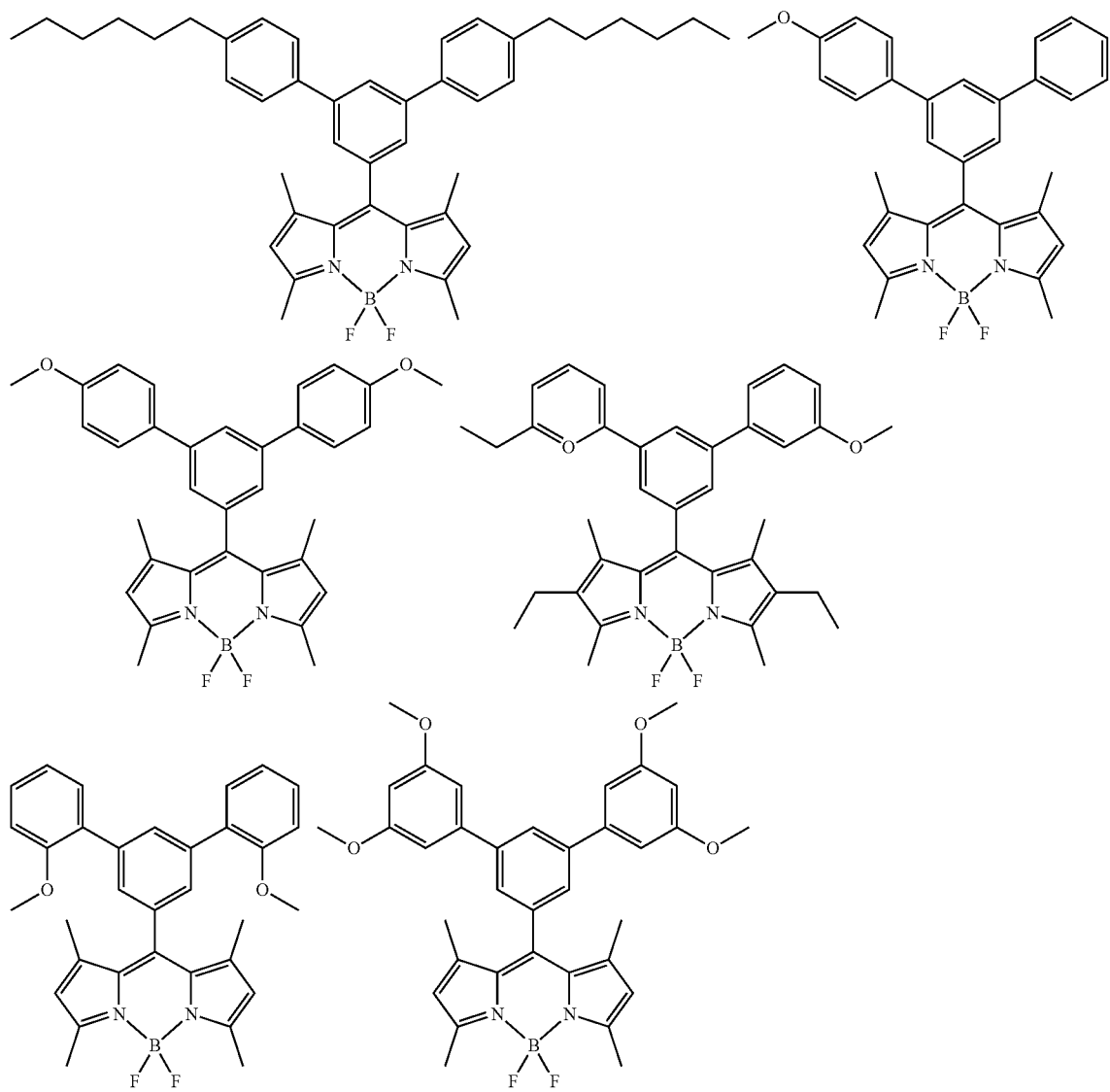
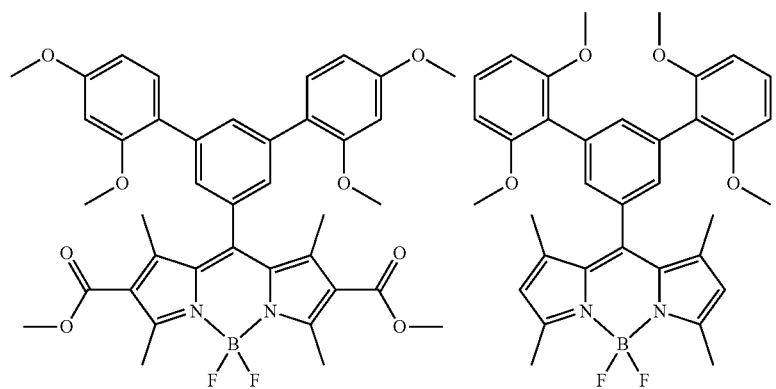

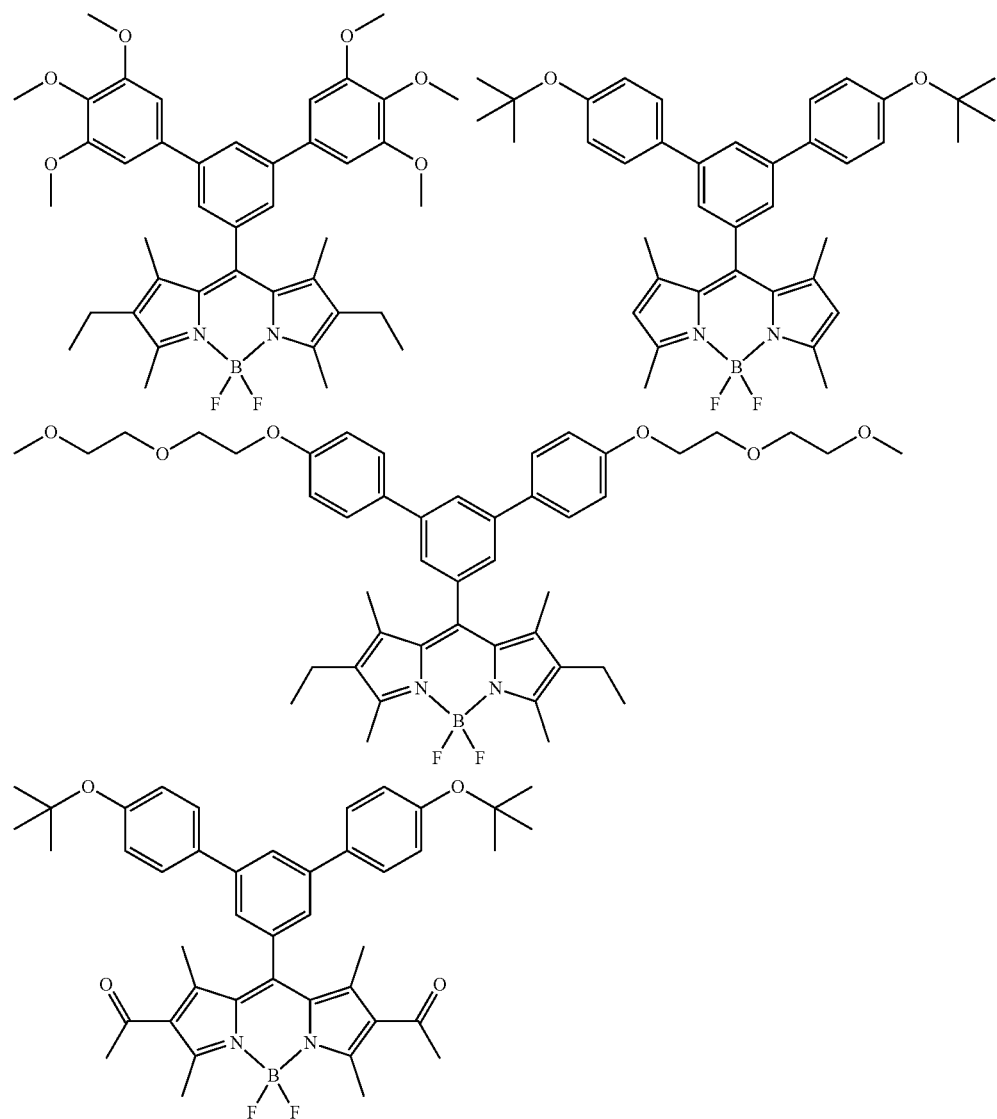
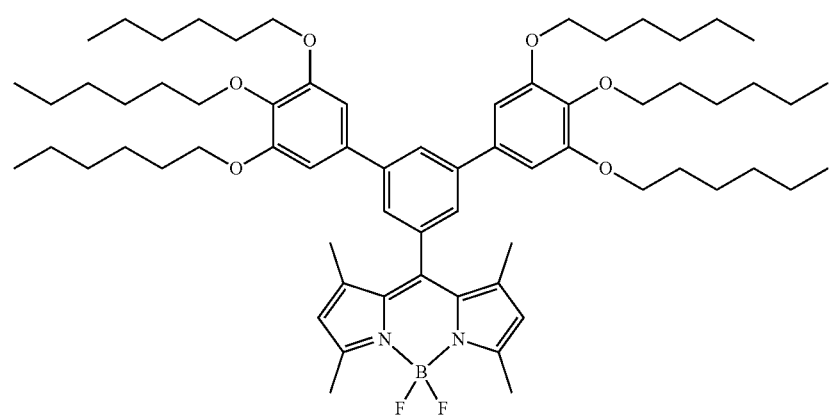

-continued
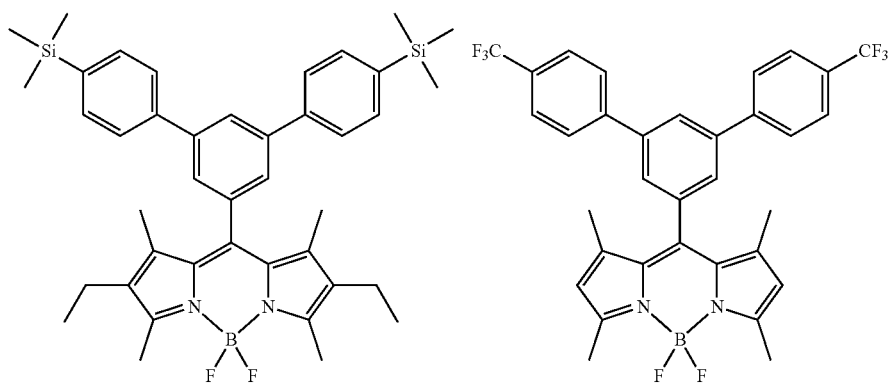
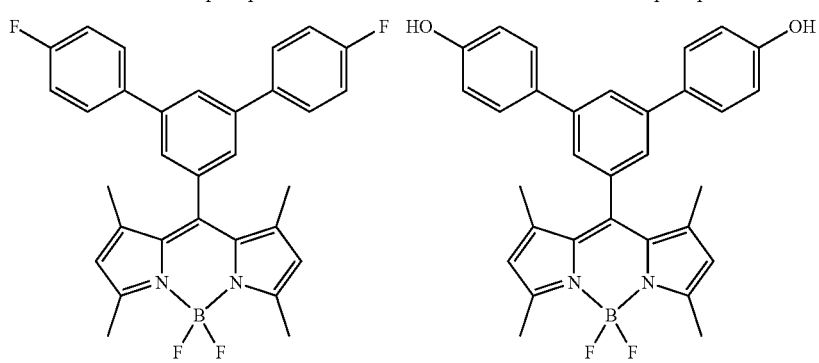
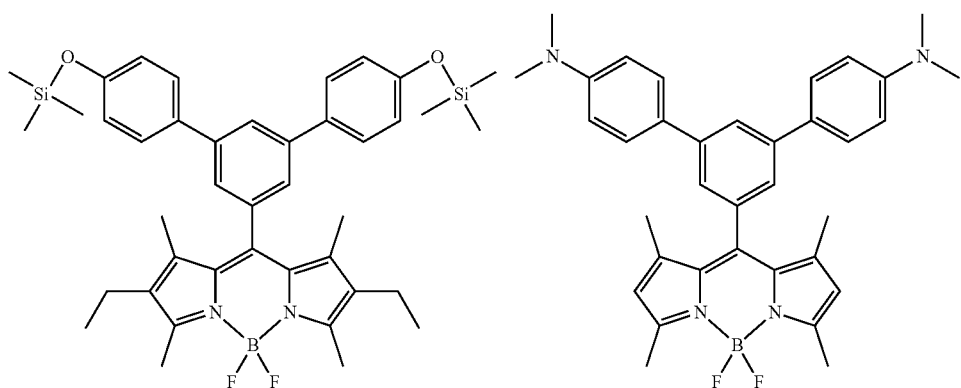
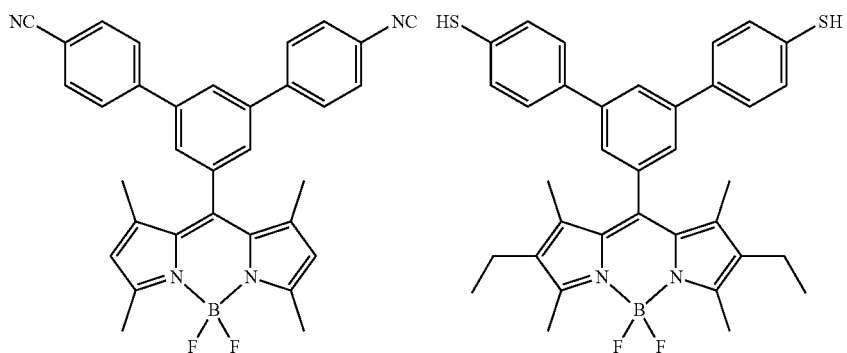

-continued
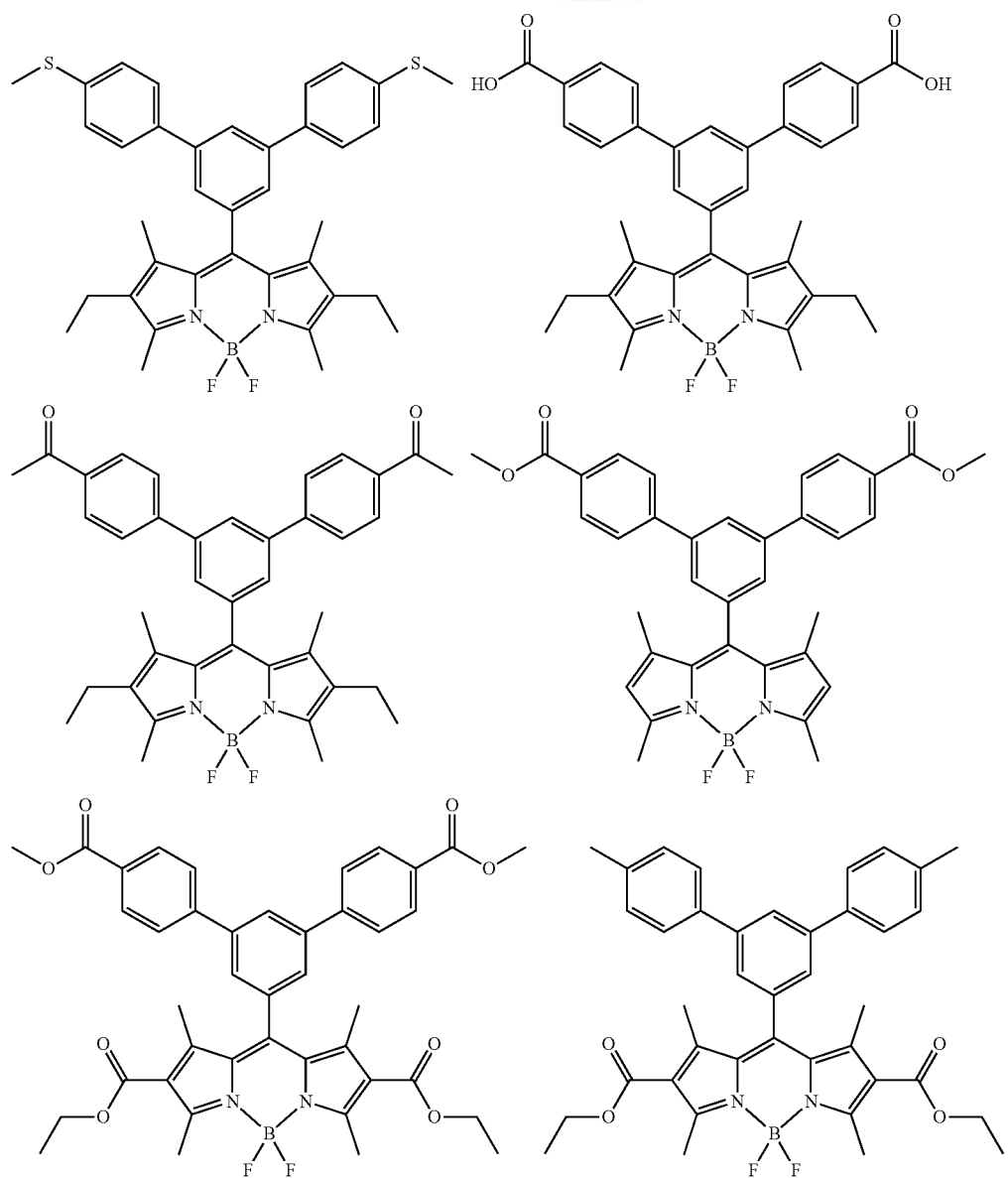
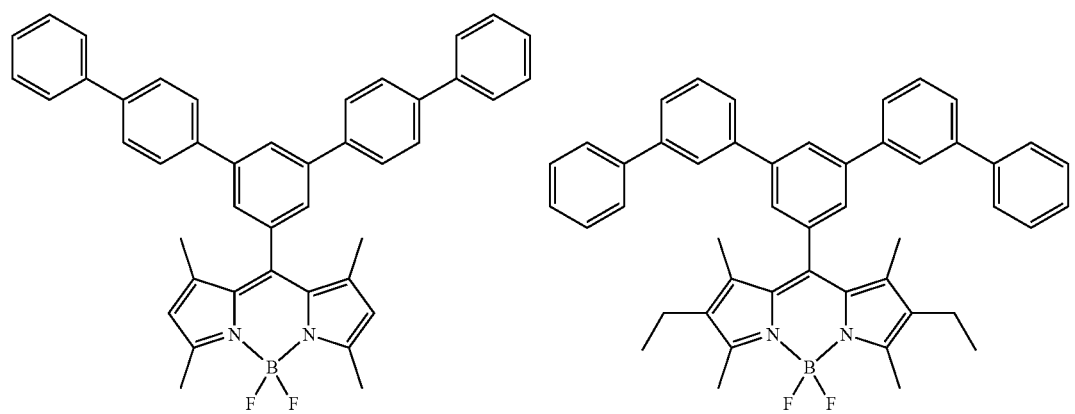

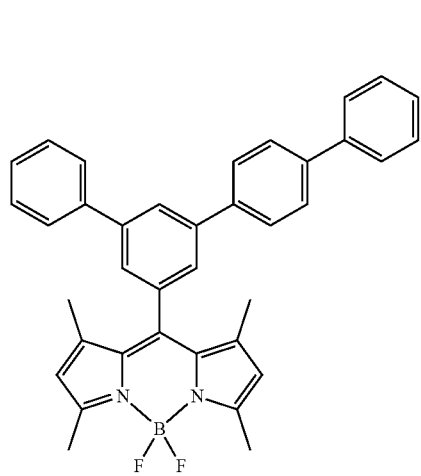
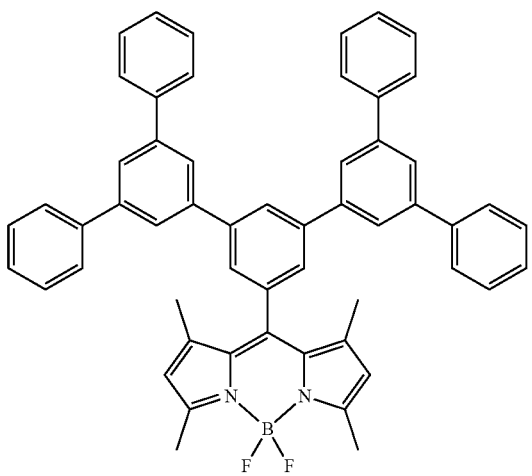
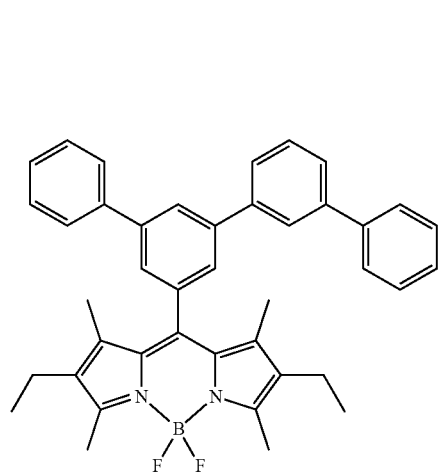
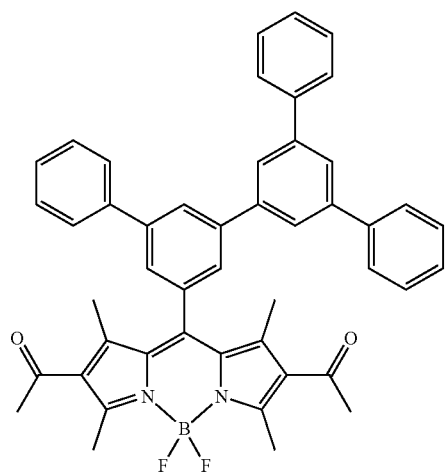
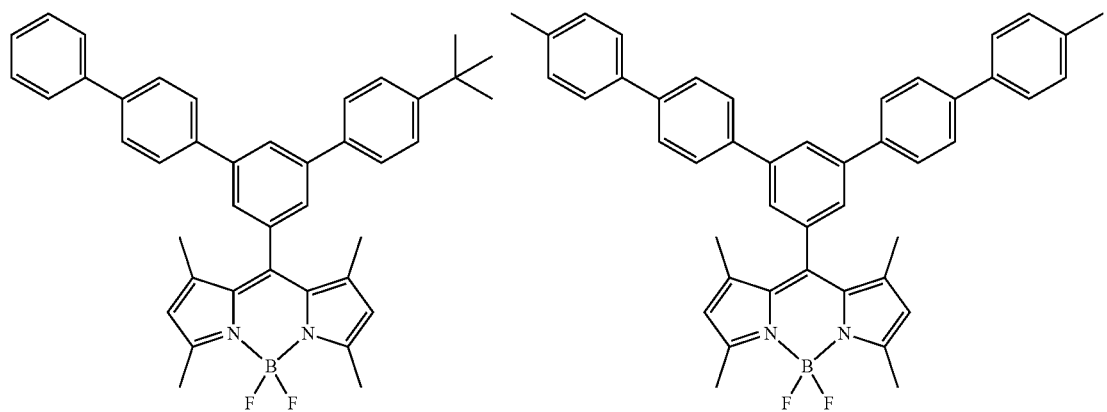

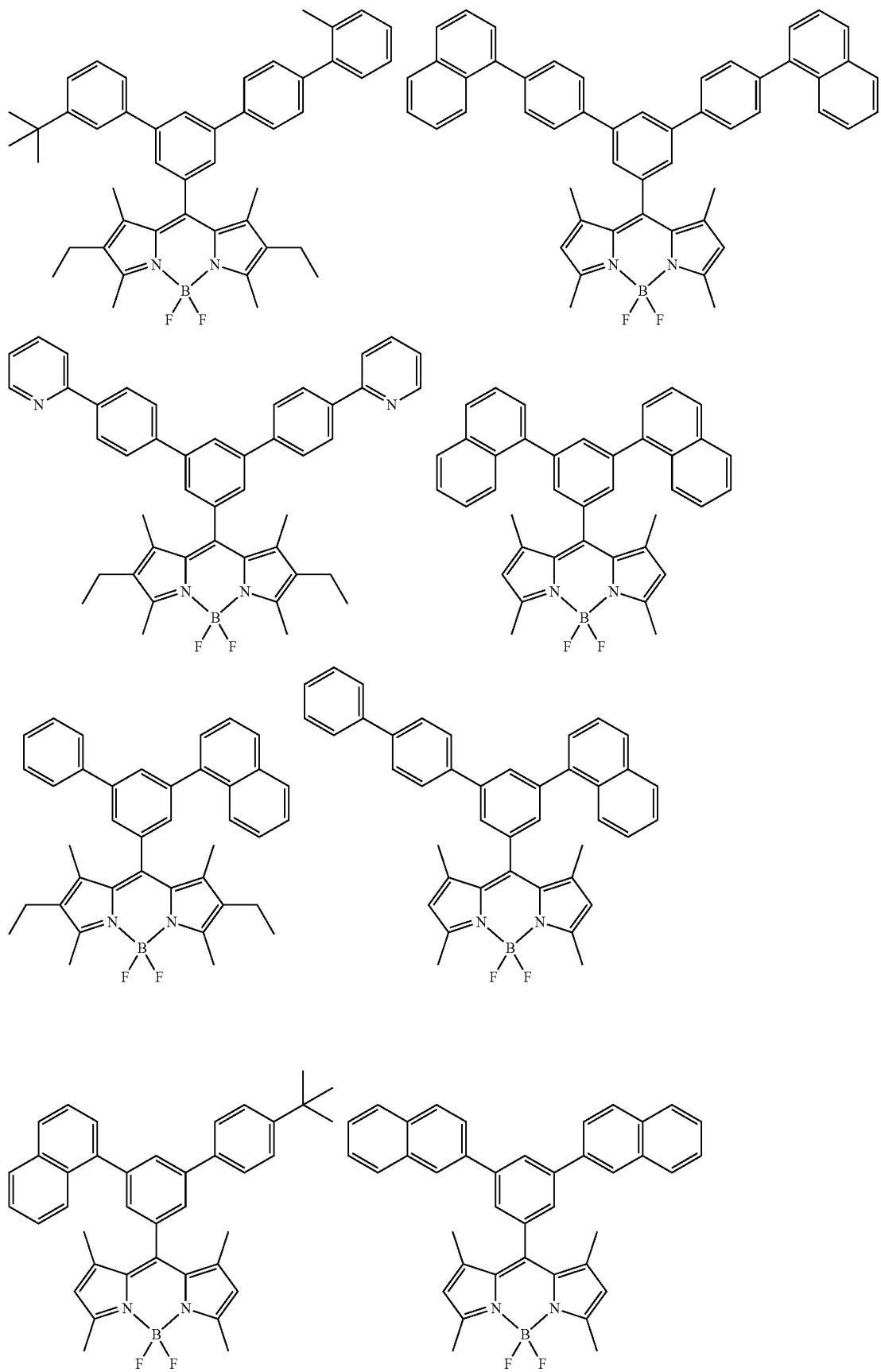

-continued
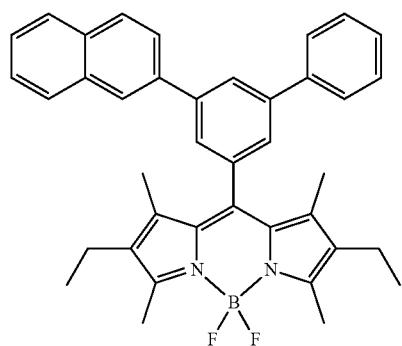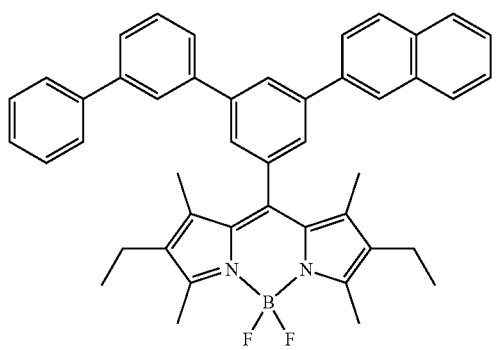
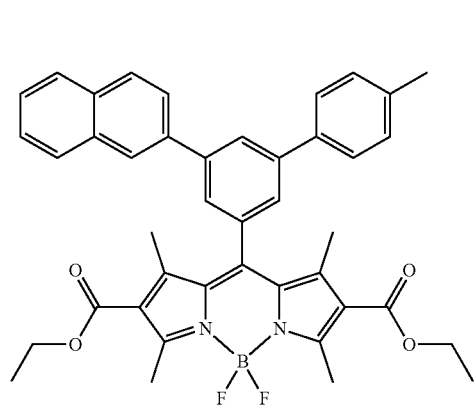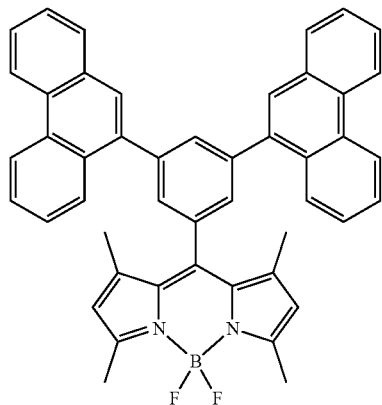
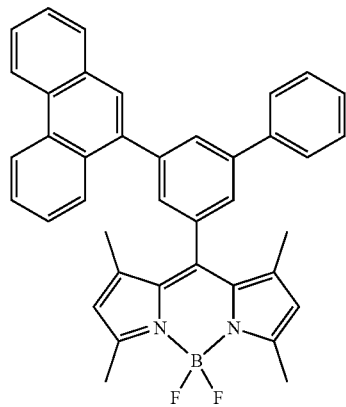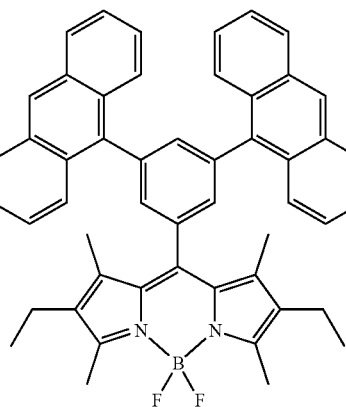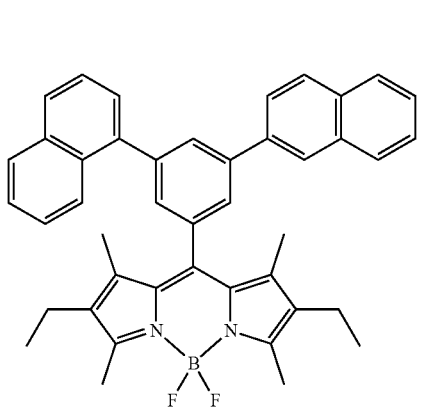
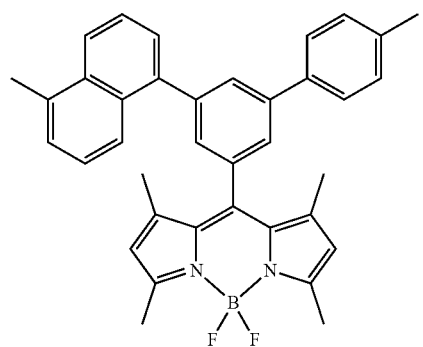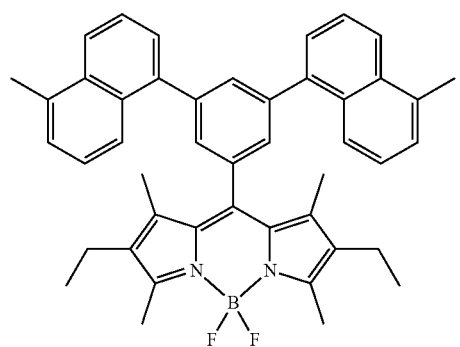

-continued
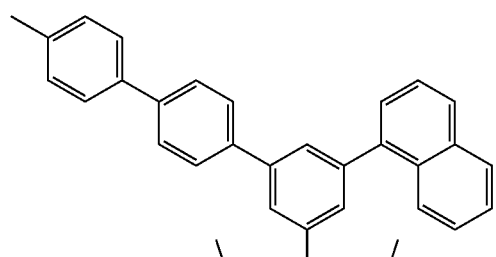
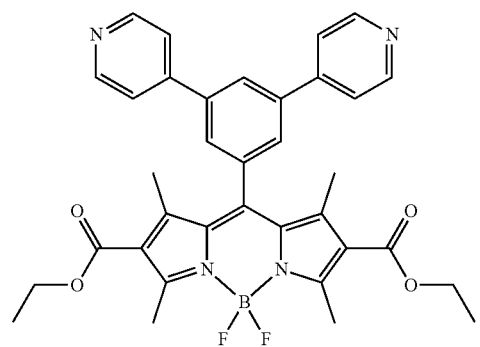
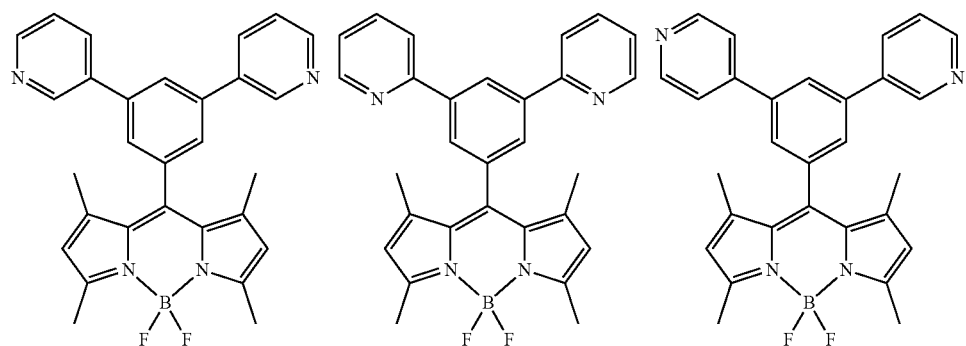
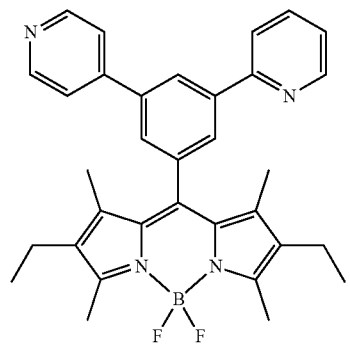
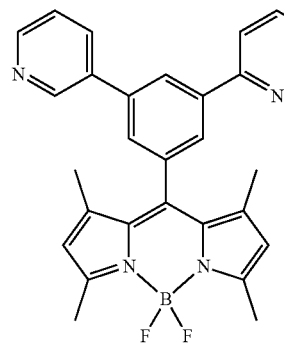
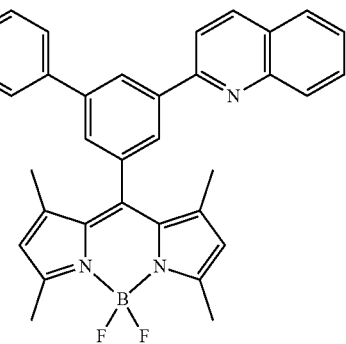
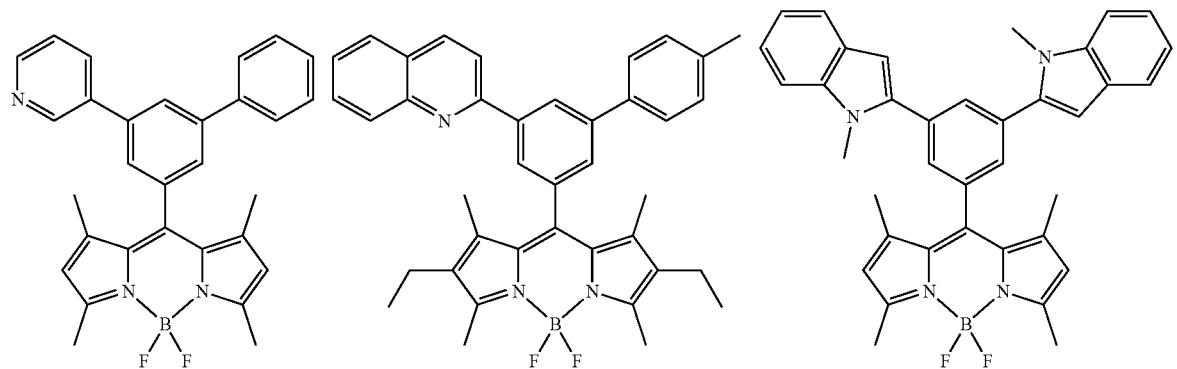

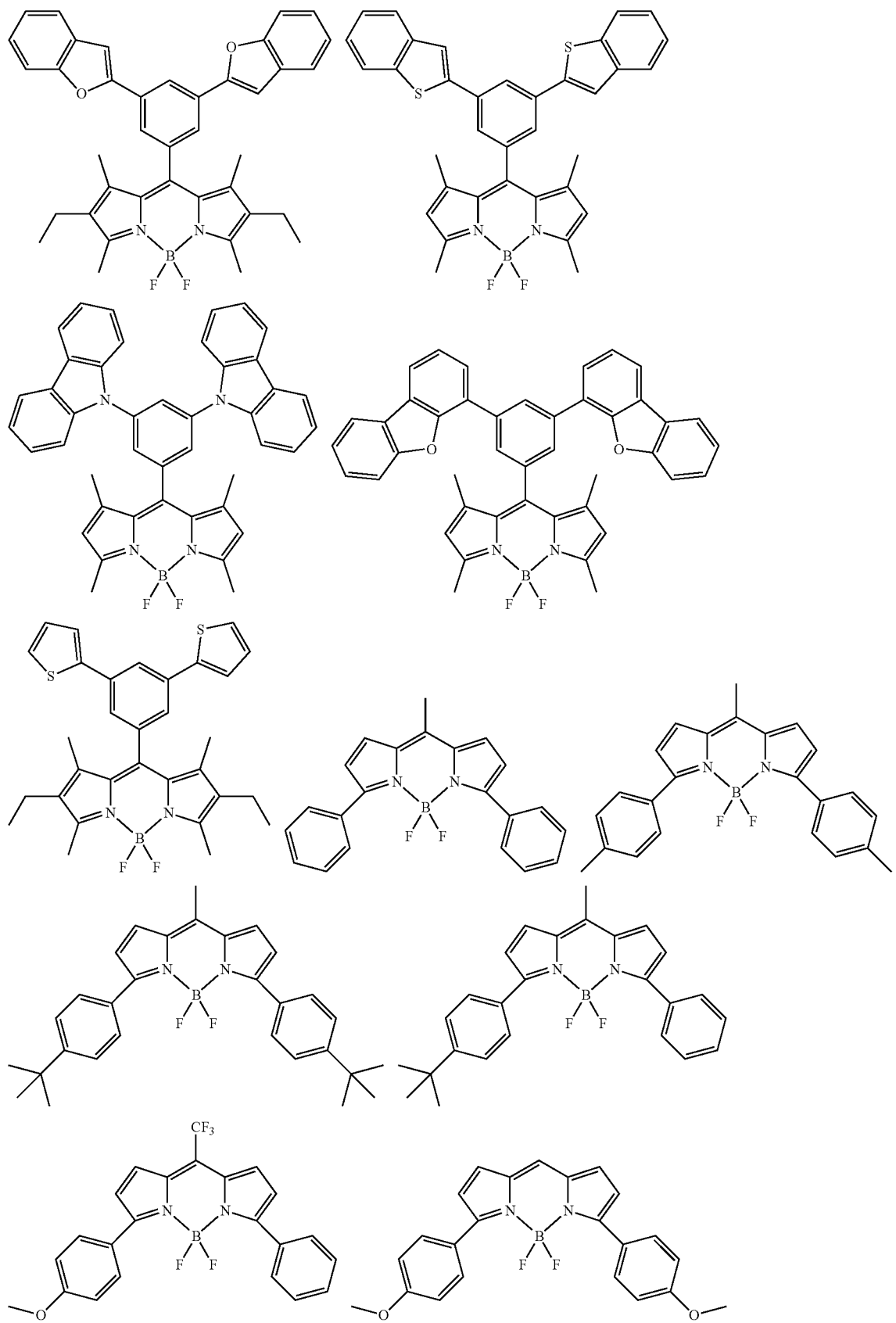

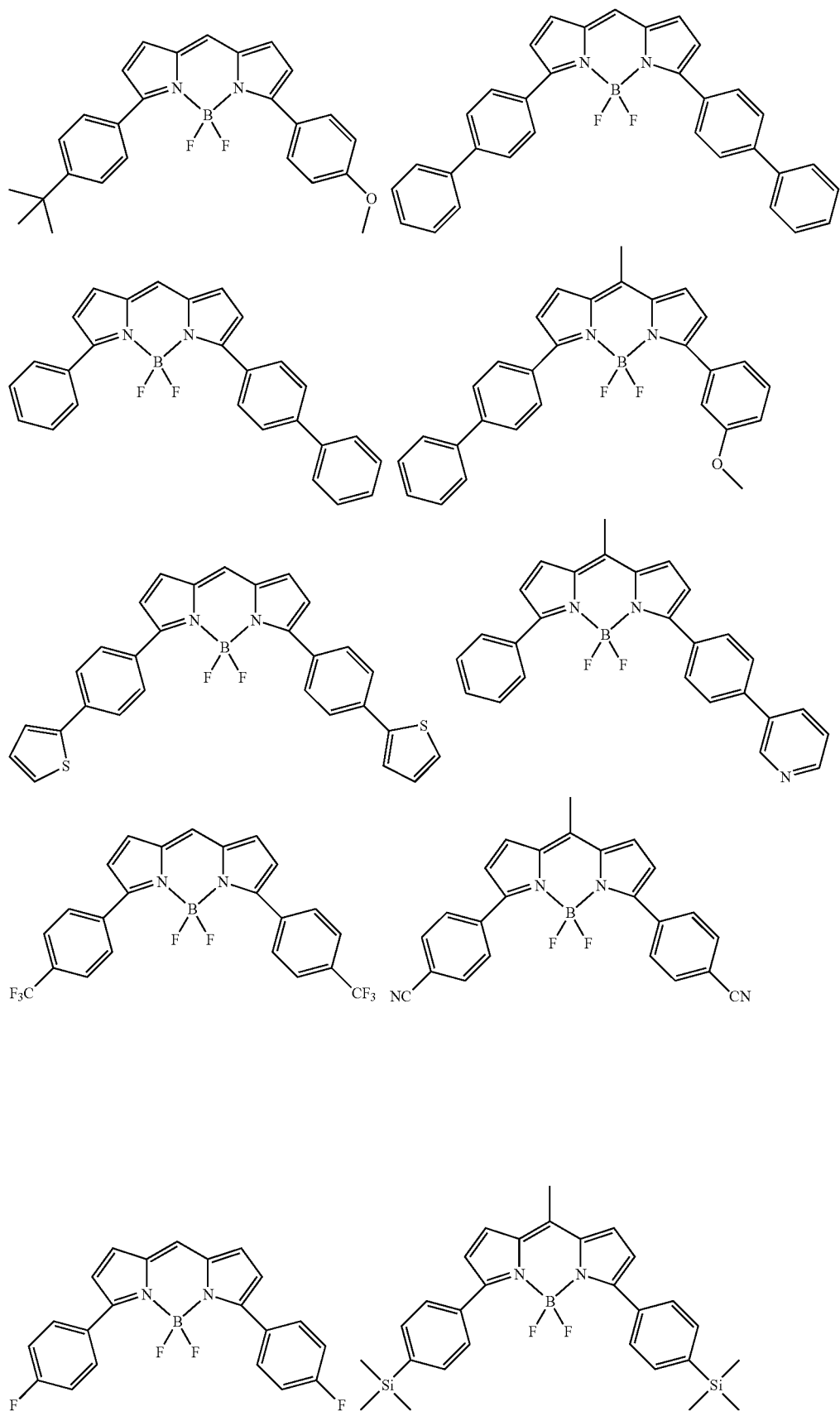

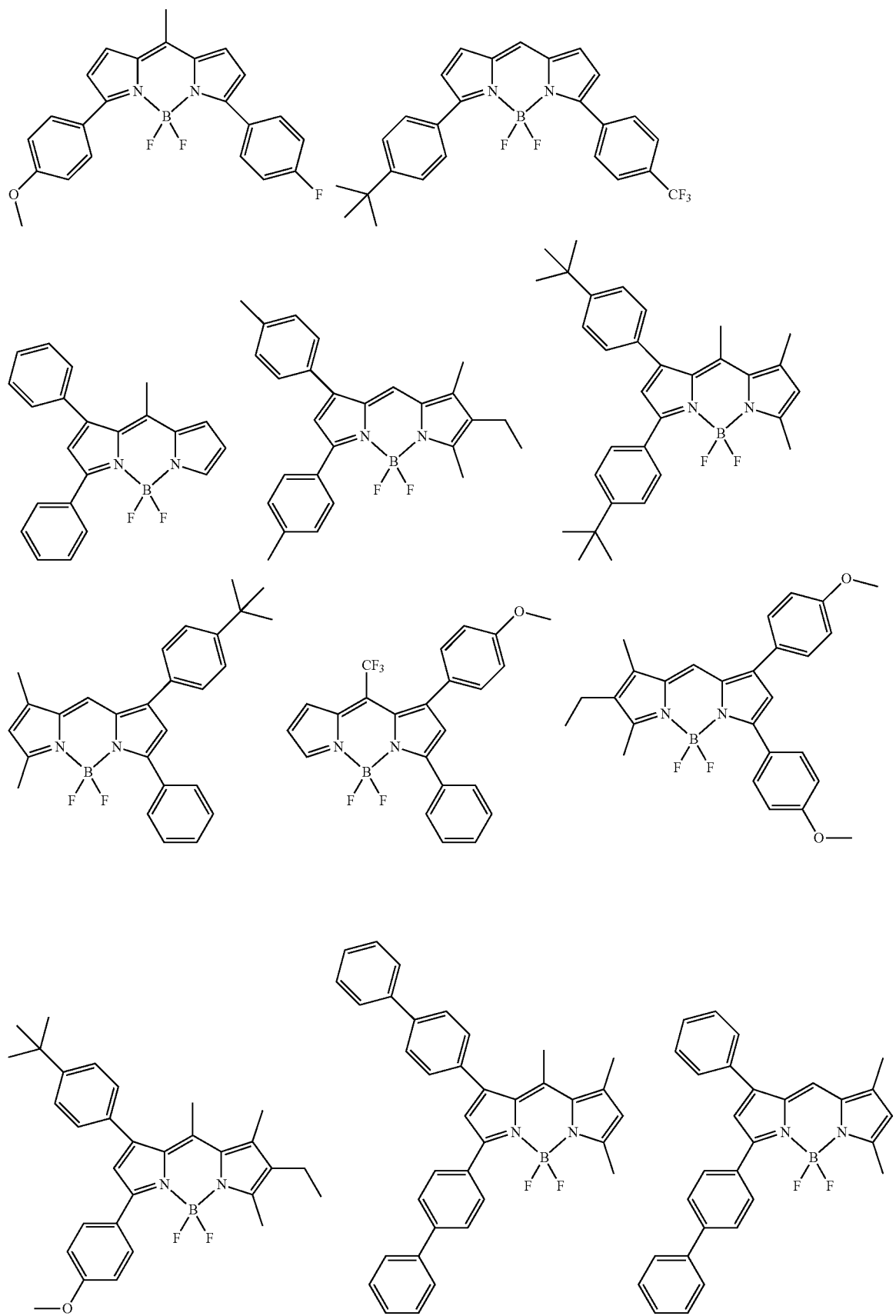

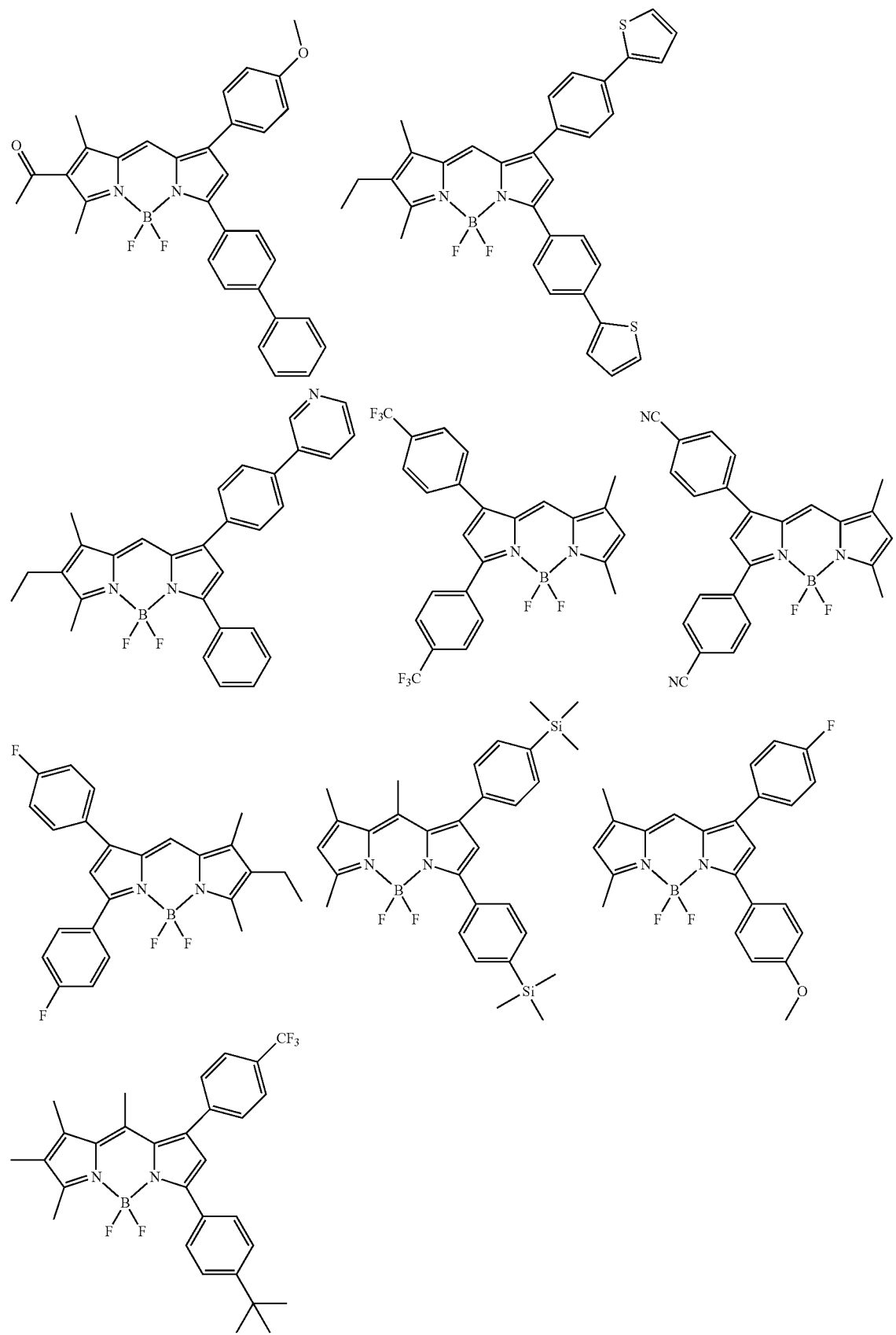

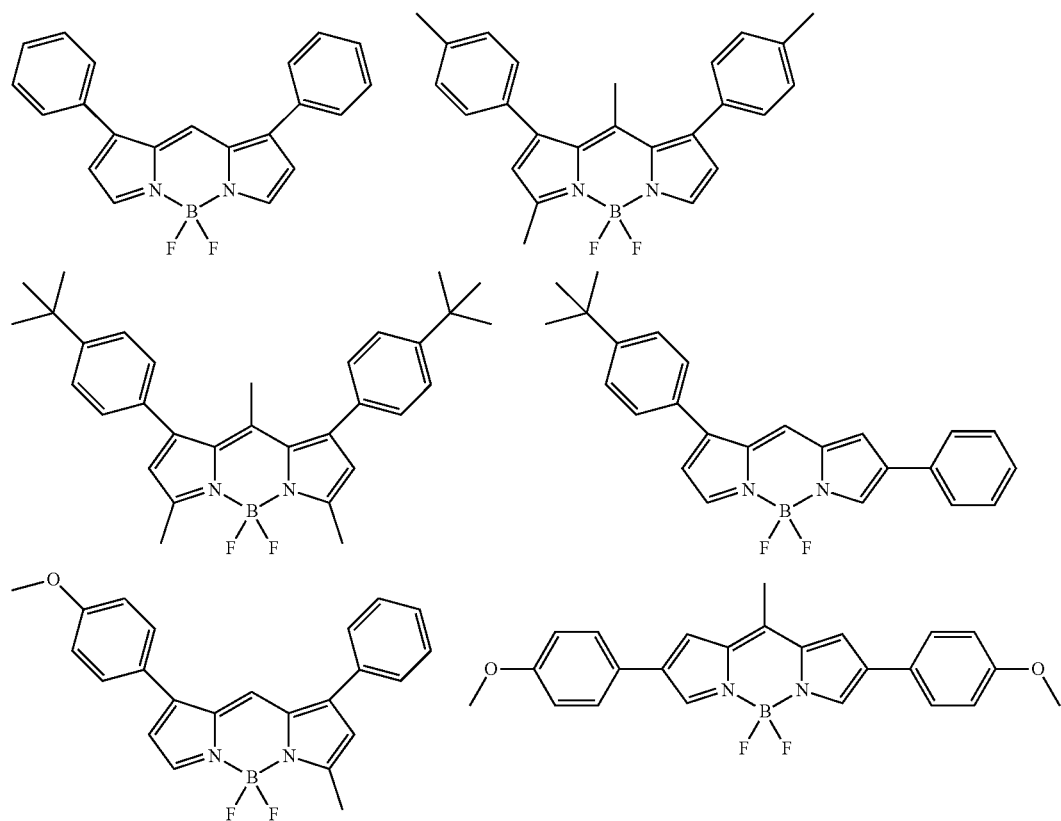
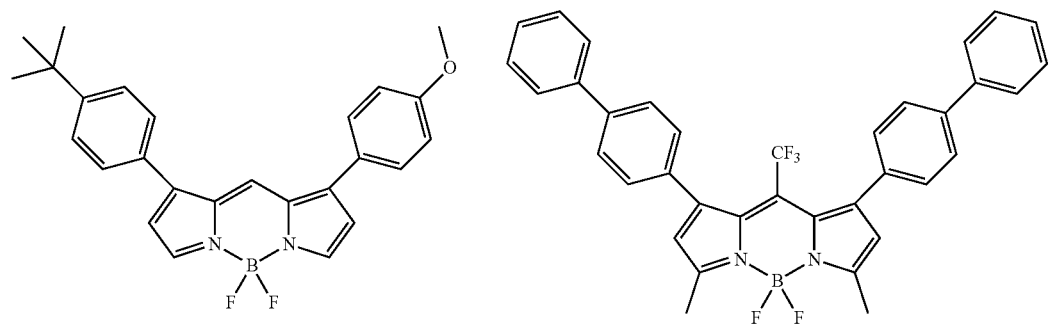
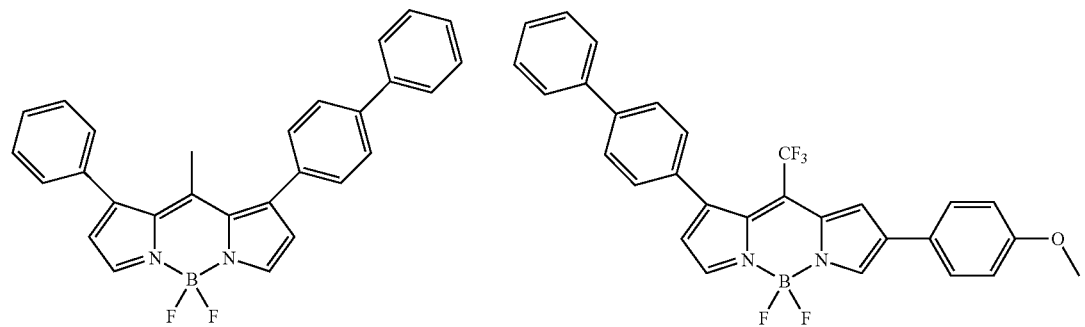

-continued
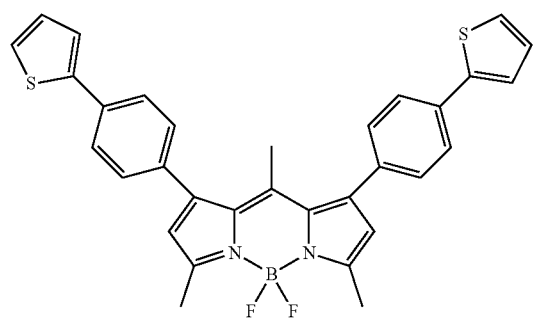
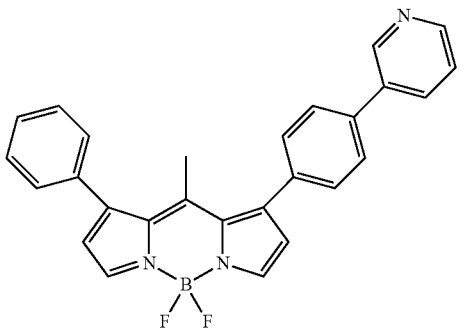
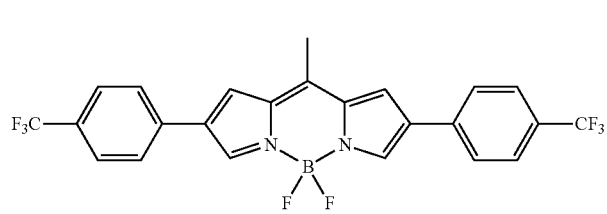
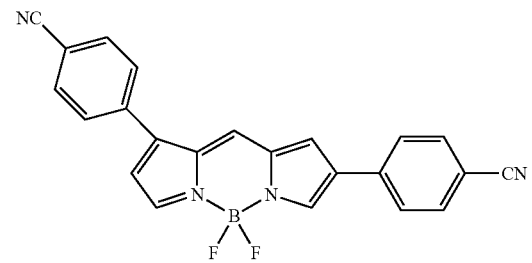
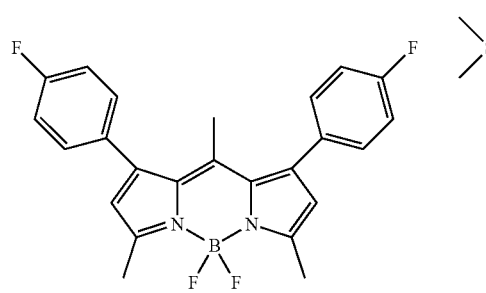
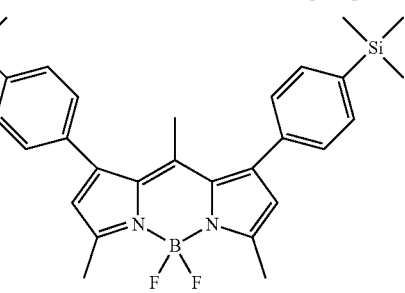
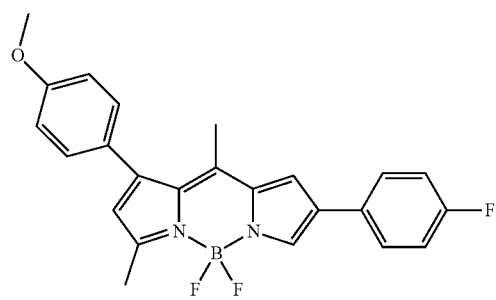
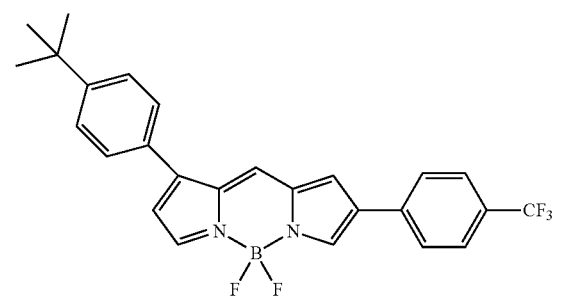
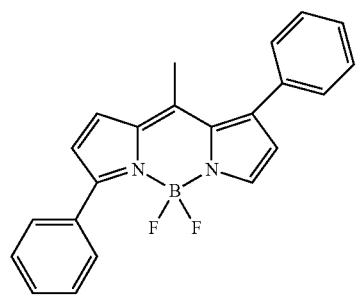
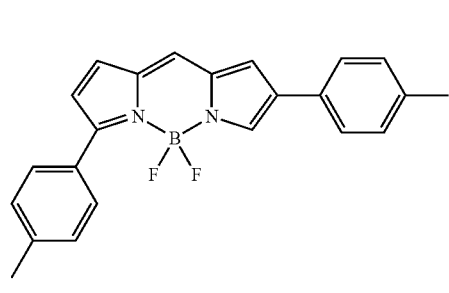

-continued
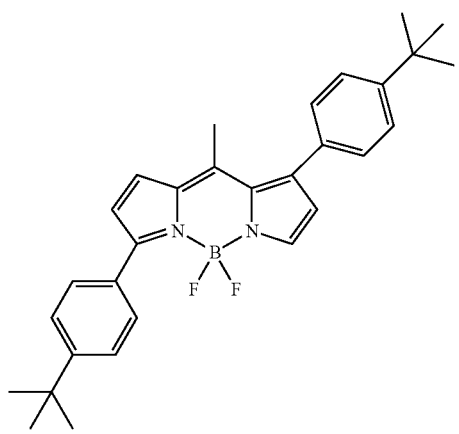
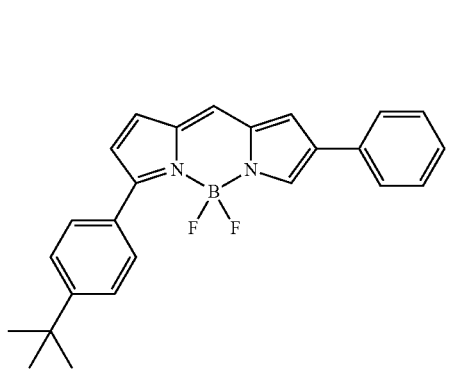
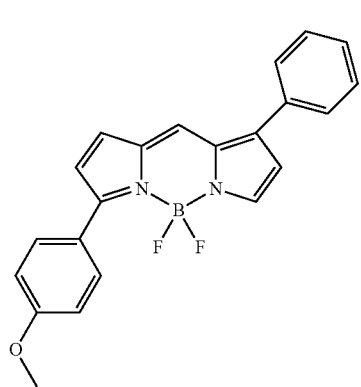
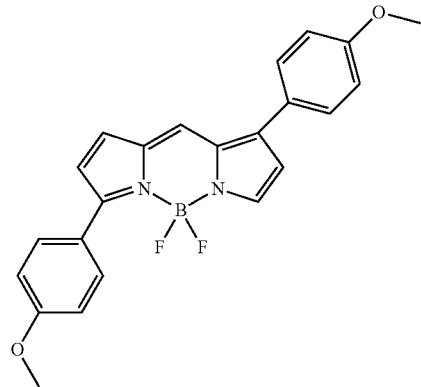
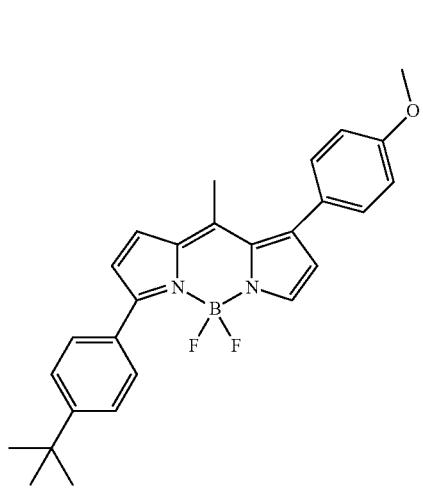
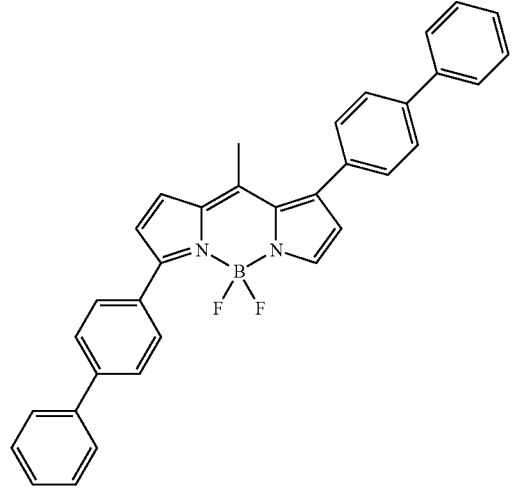
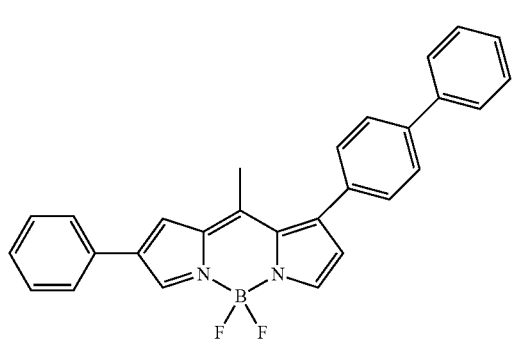
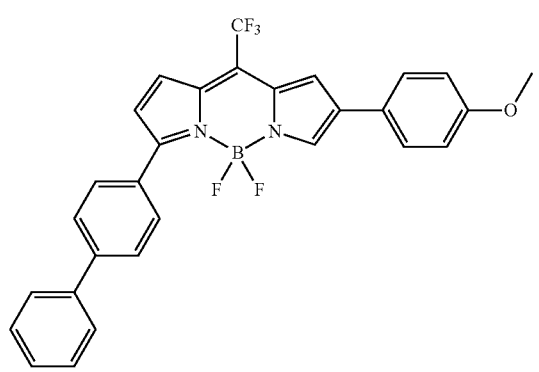

-continued
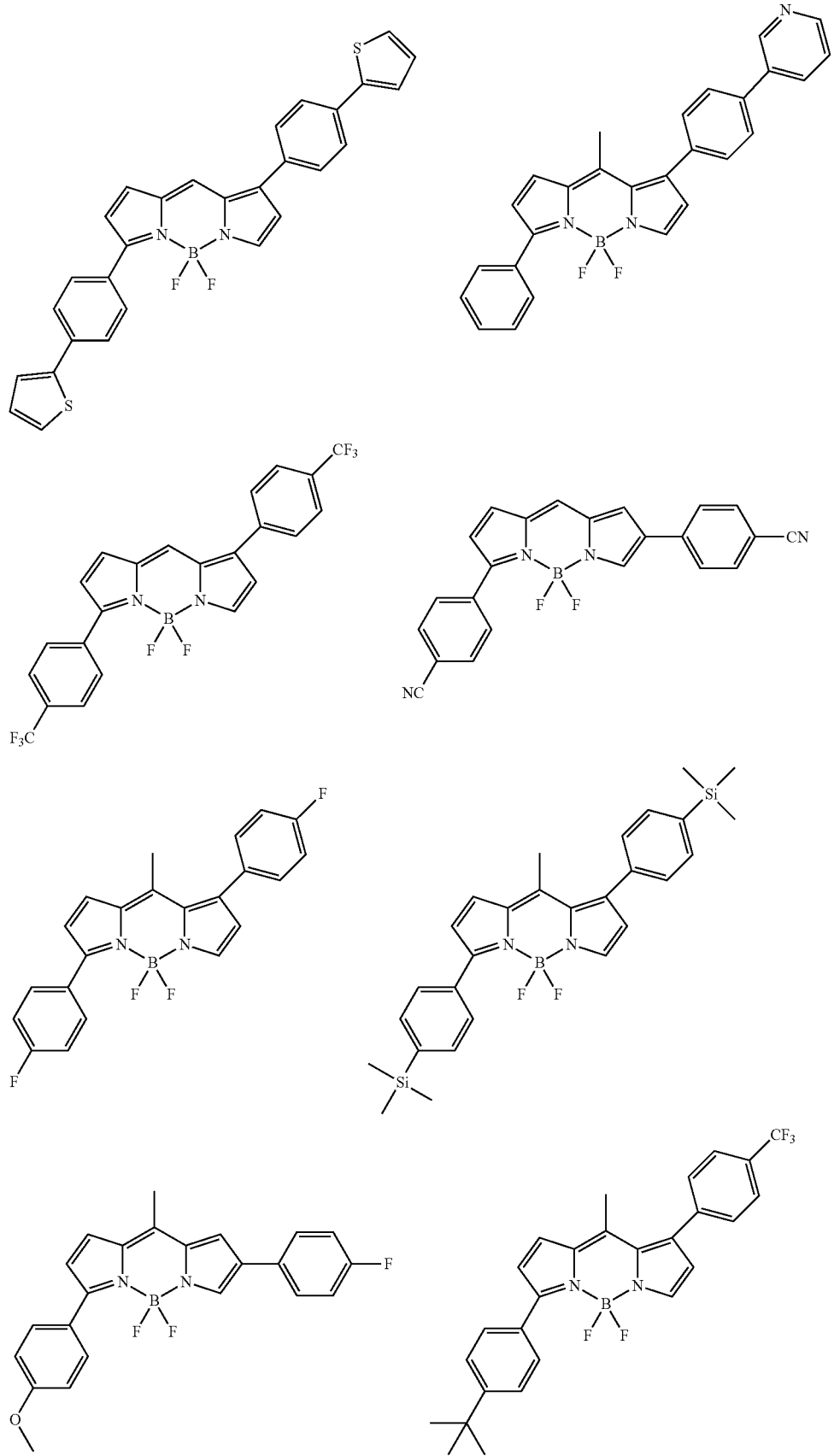

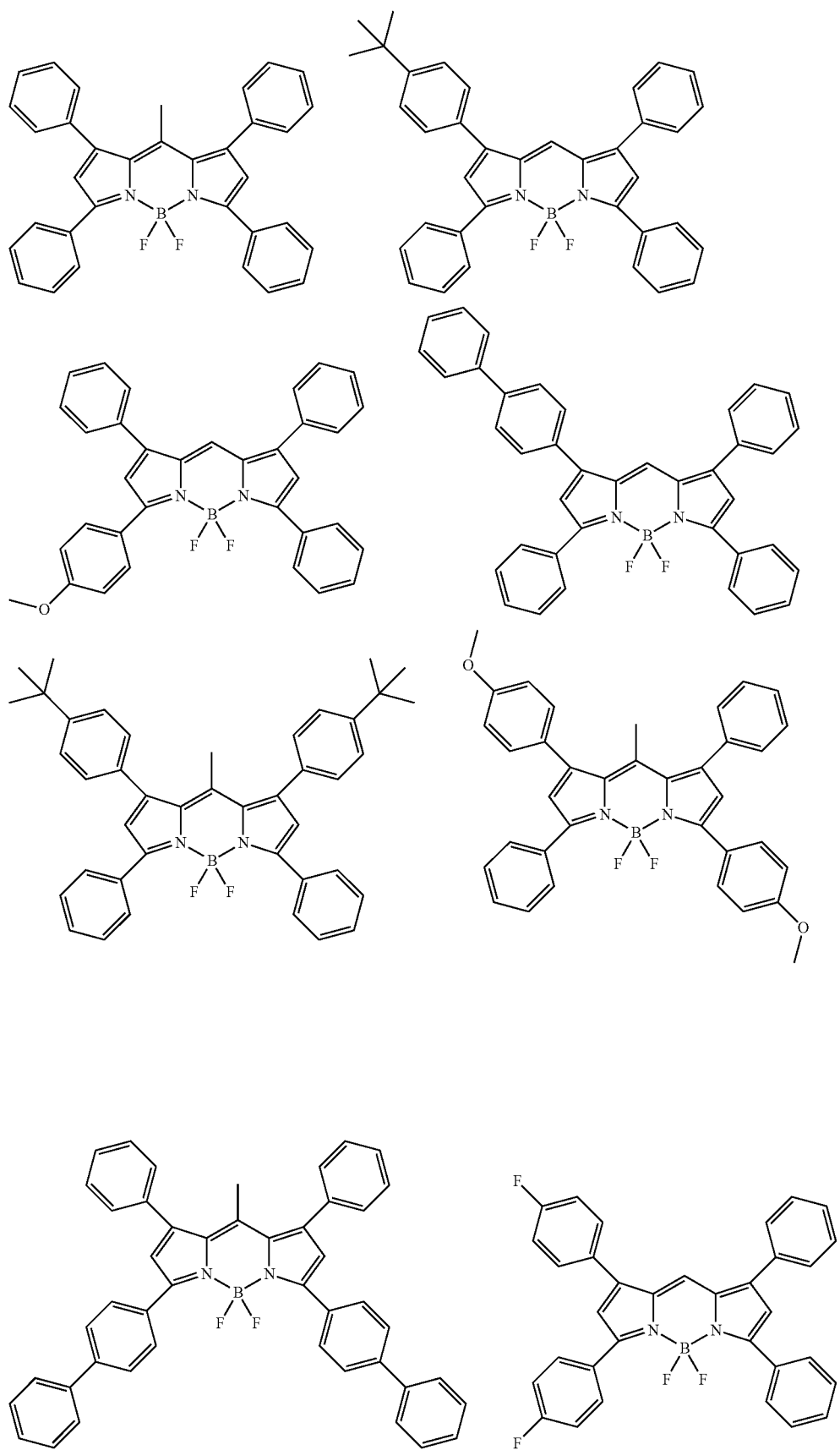

-continued
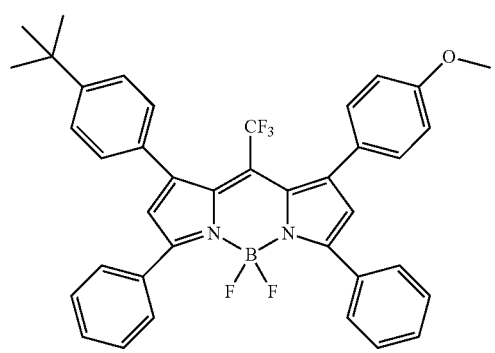
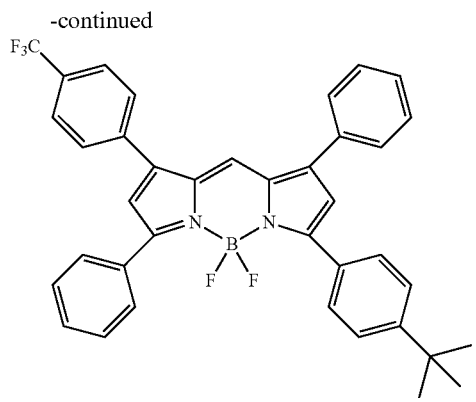
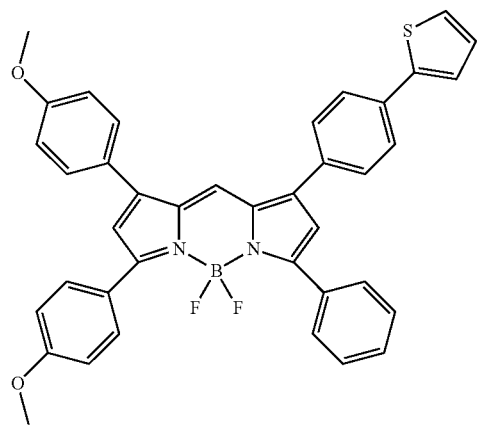
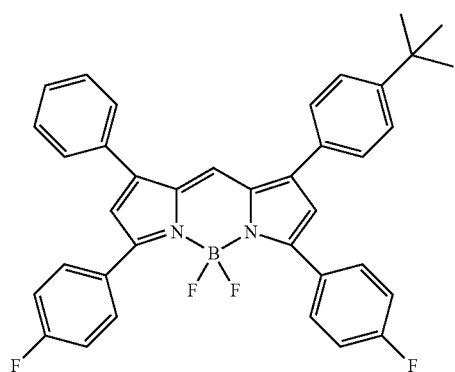
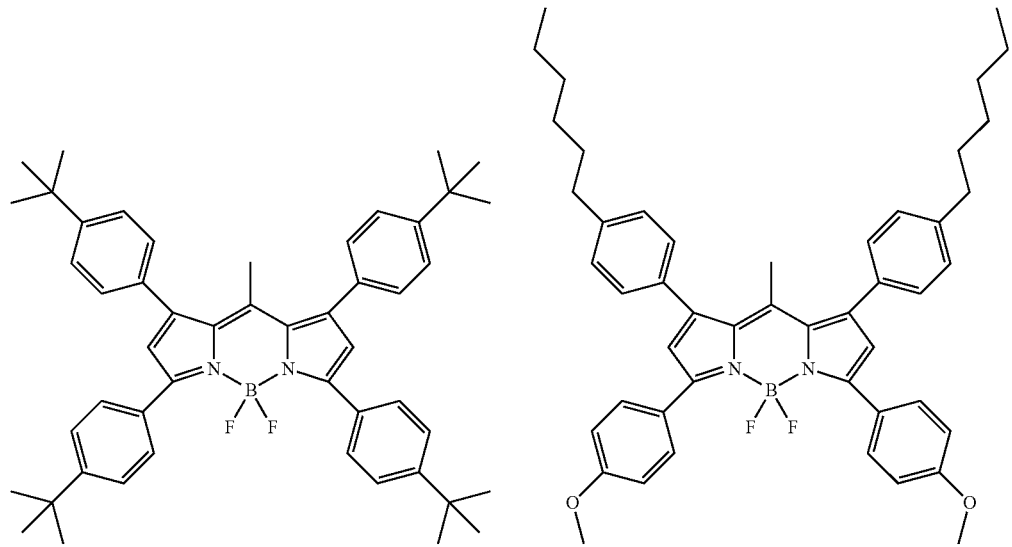

-continued
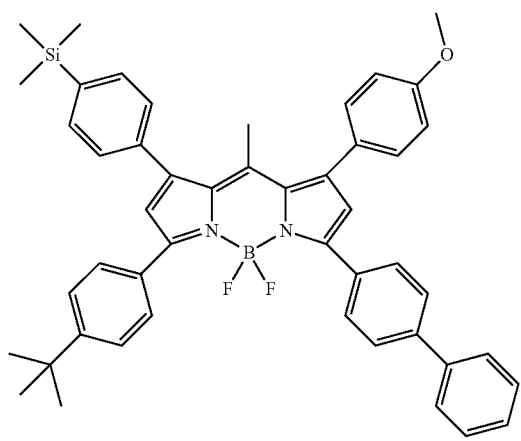
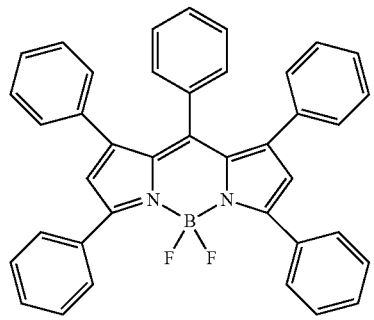
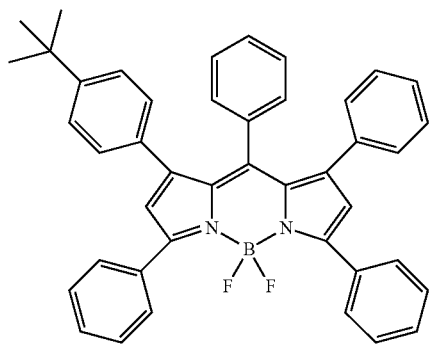
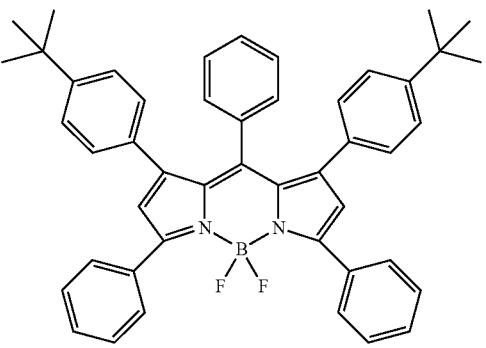
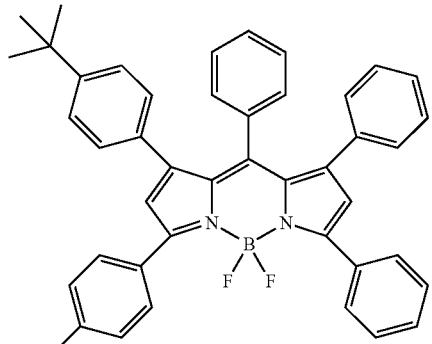
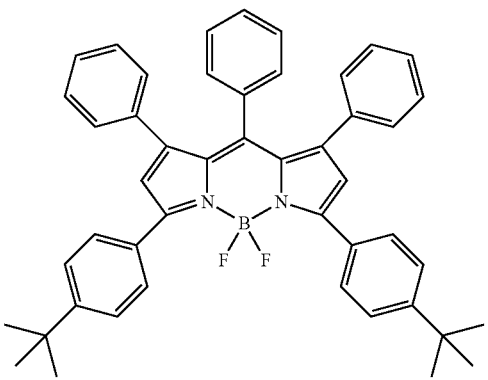
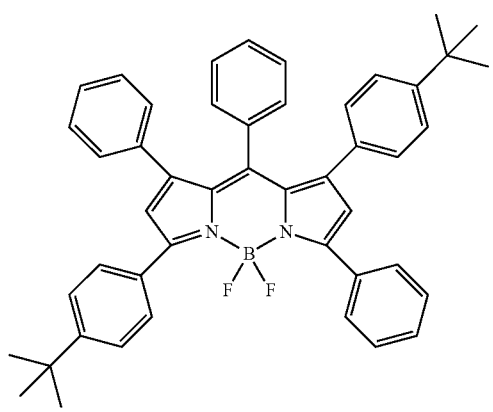
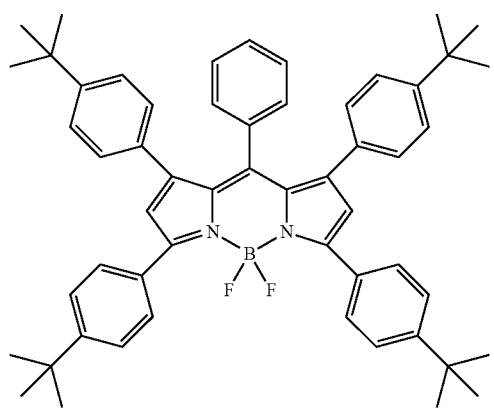

-continued
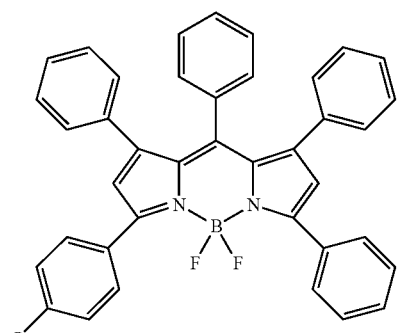 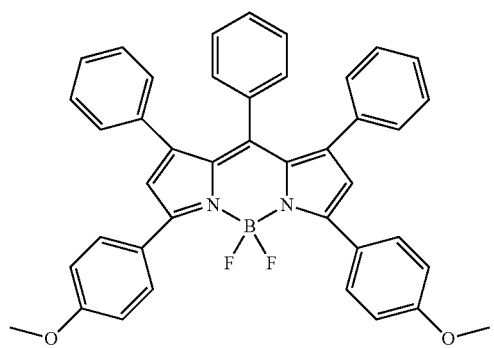
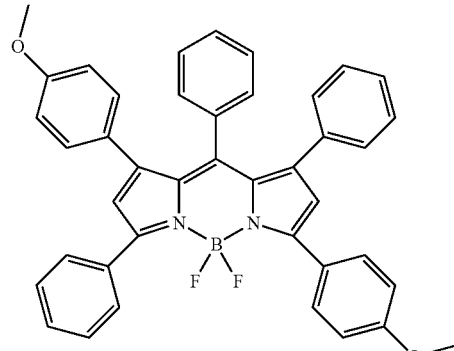 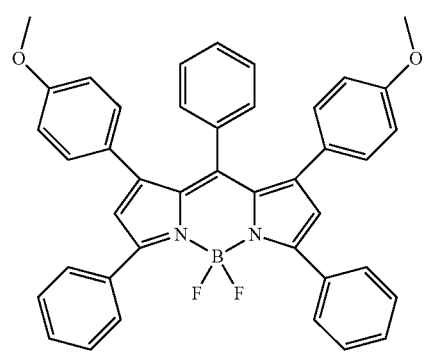
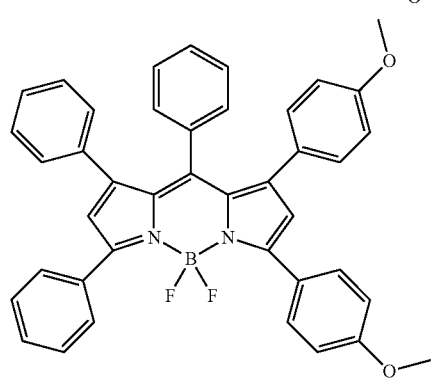 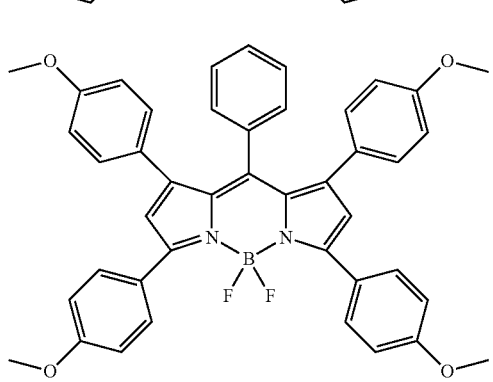
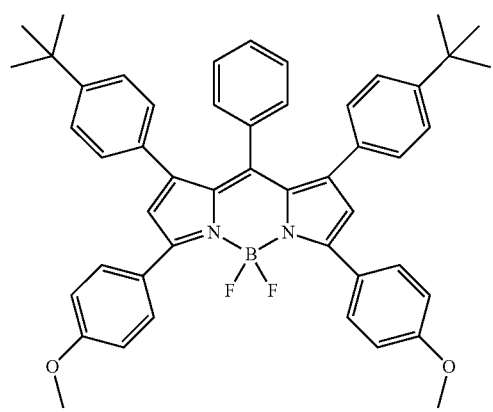 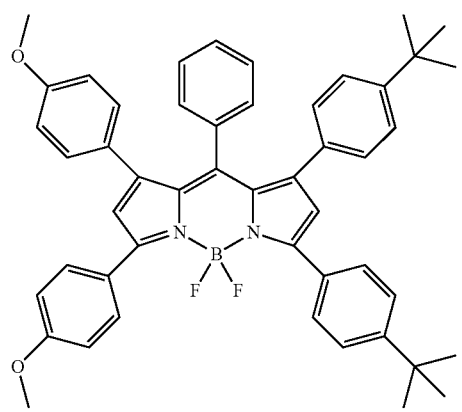

-continued
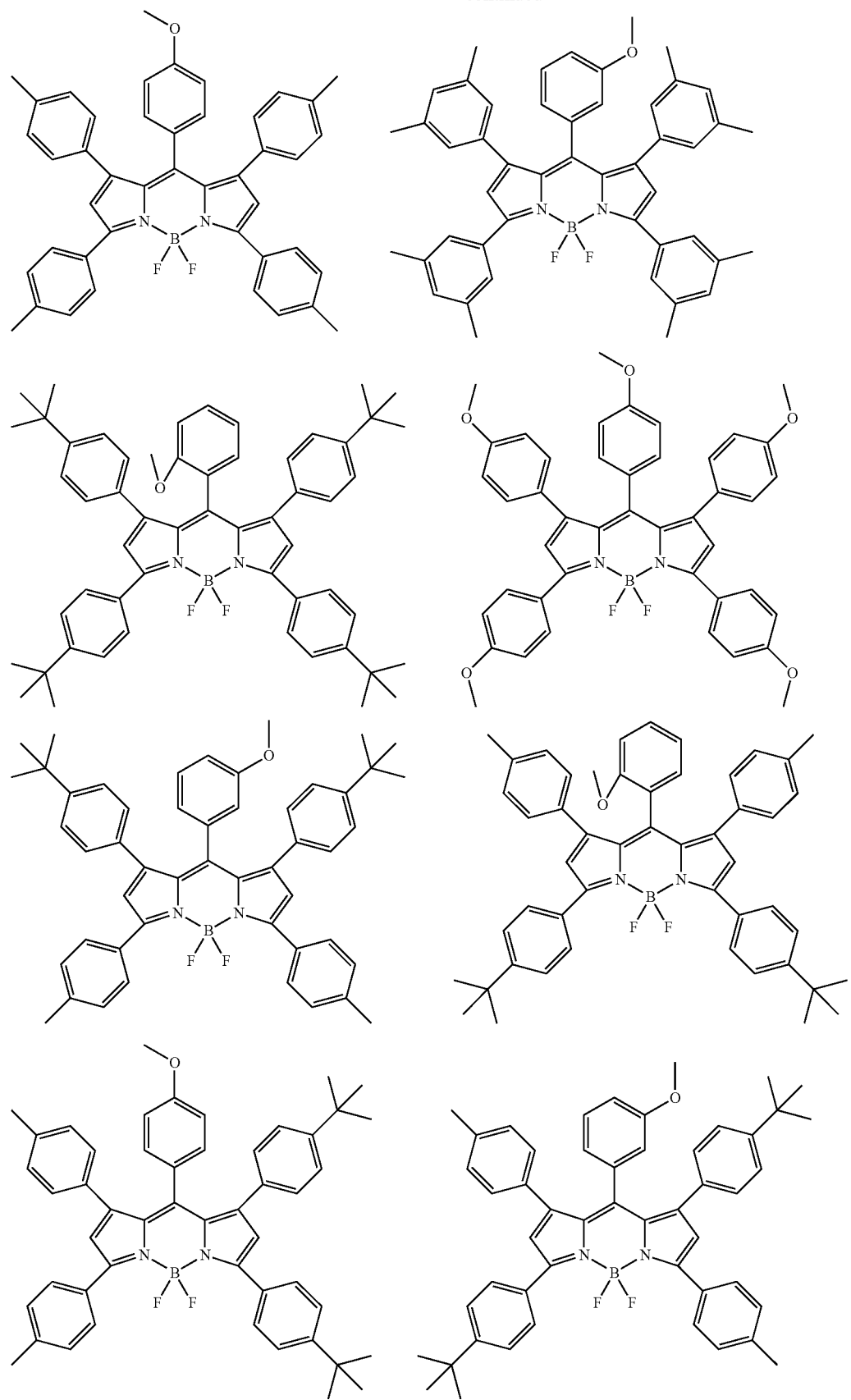

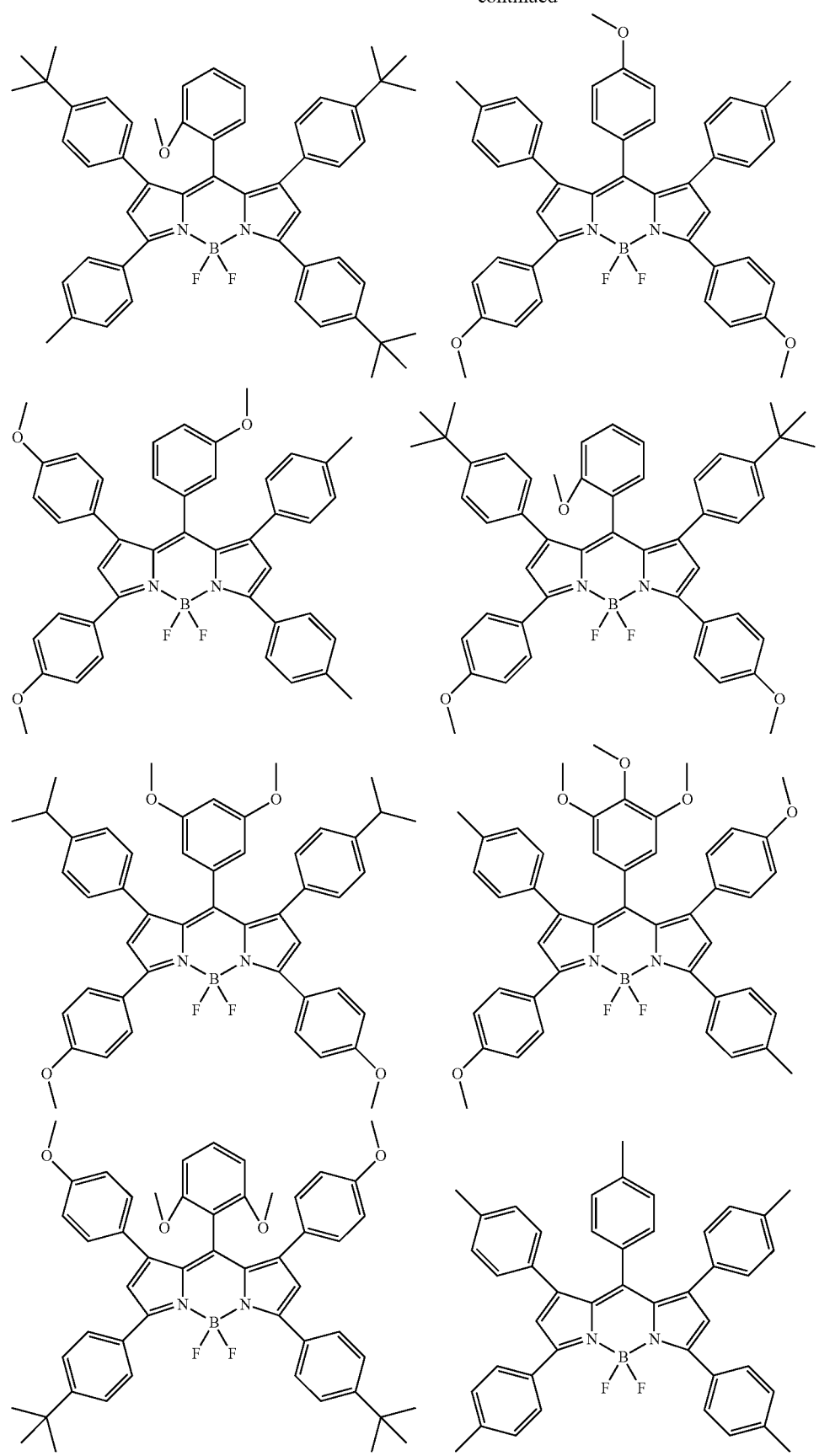

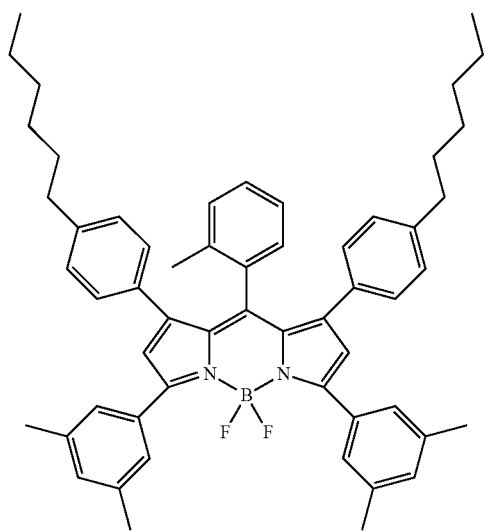
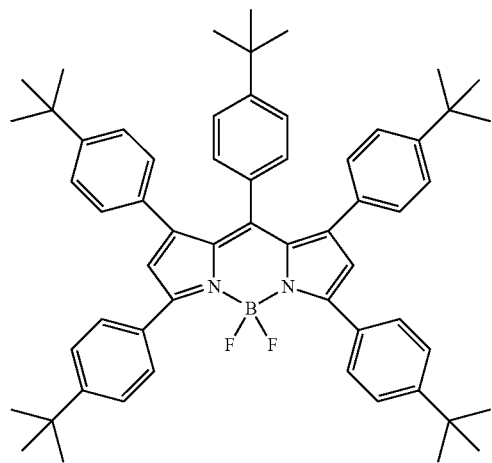
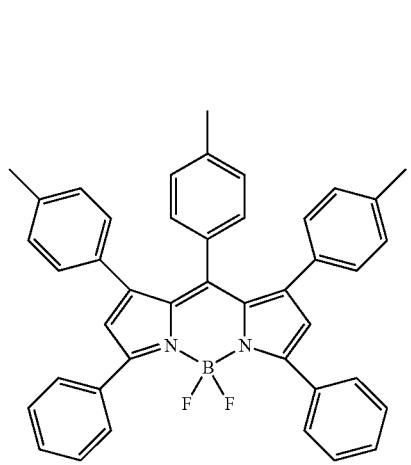
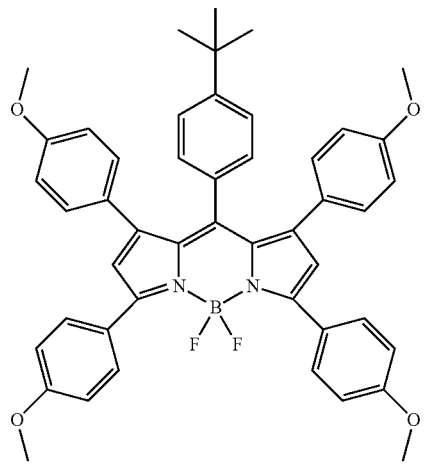
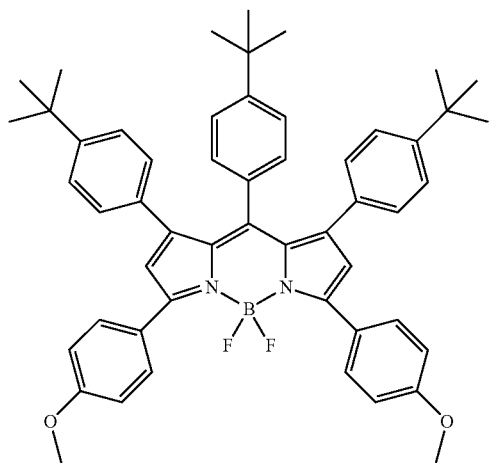
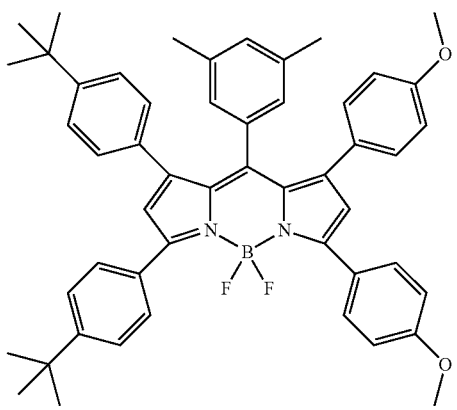

87
-continued
88
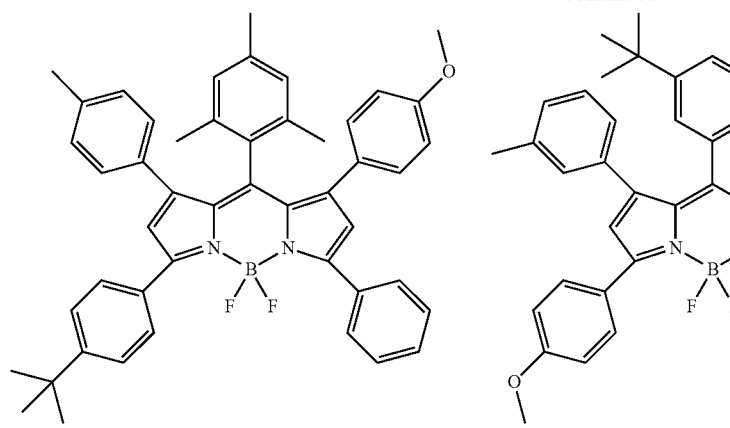
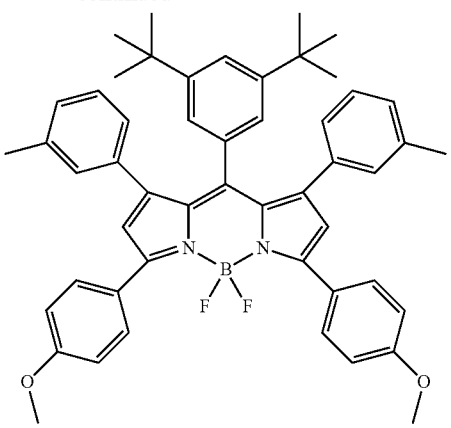
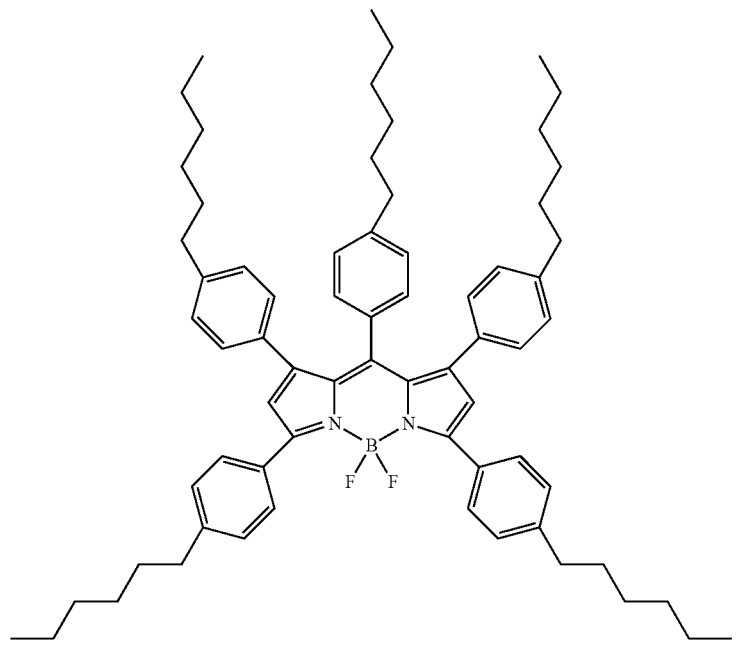
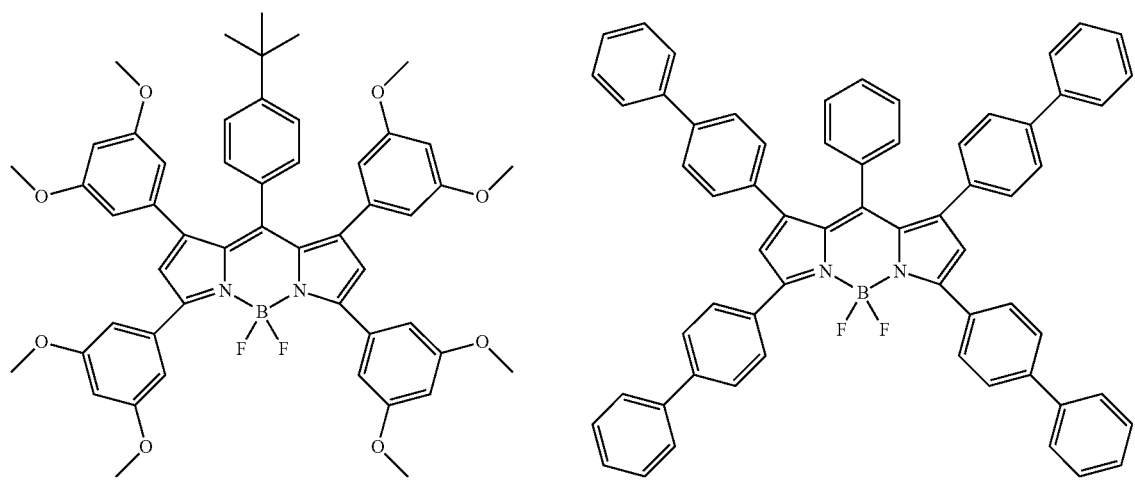

89
90
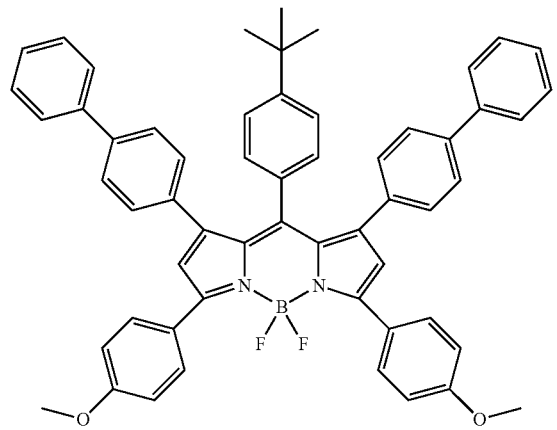
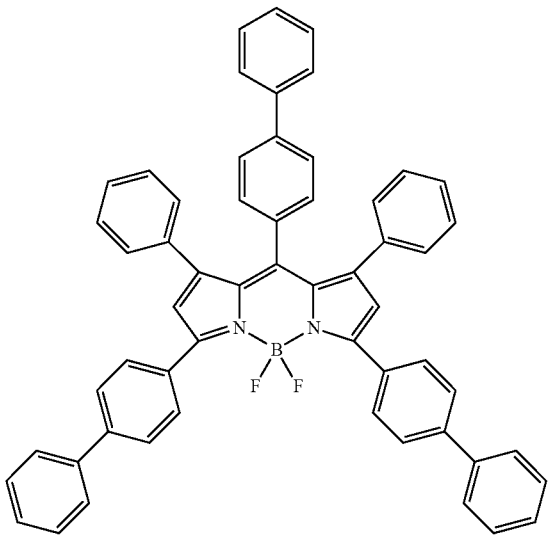
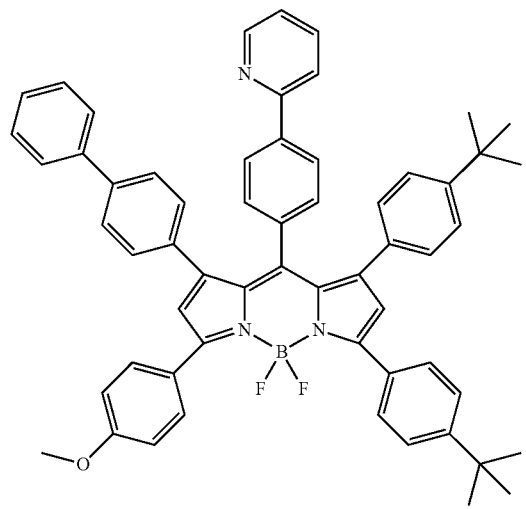
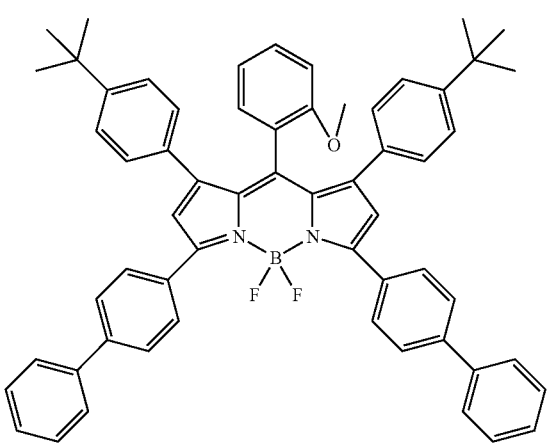
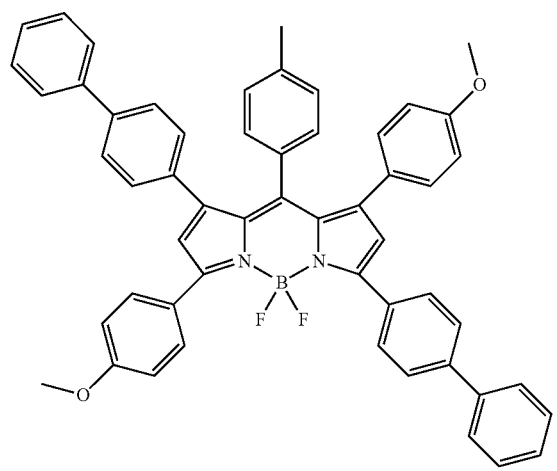
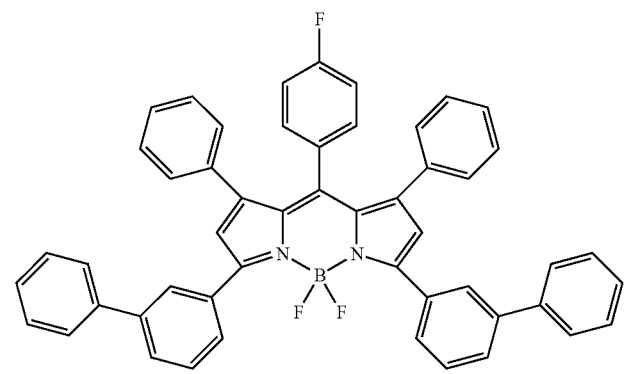

91
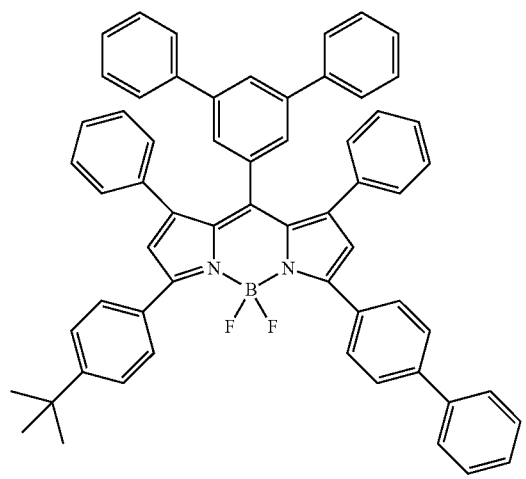
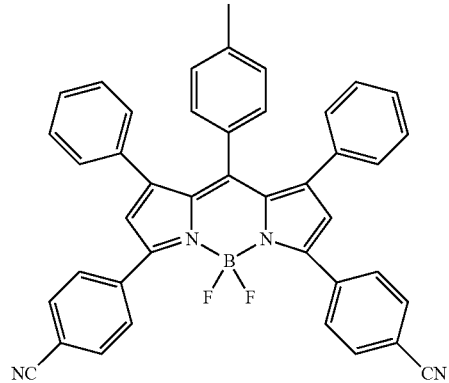
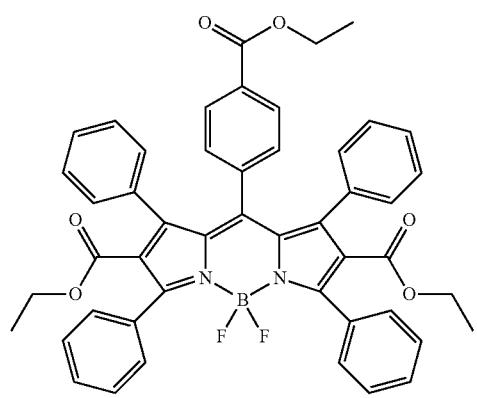
92
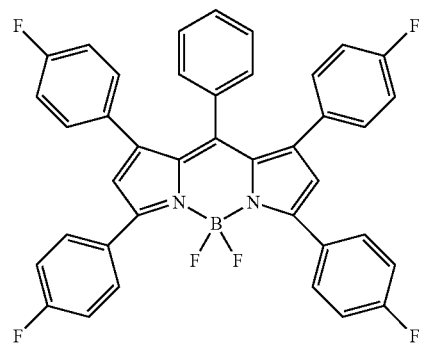
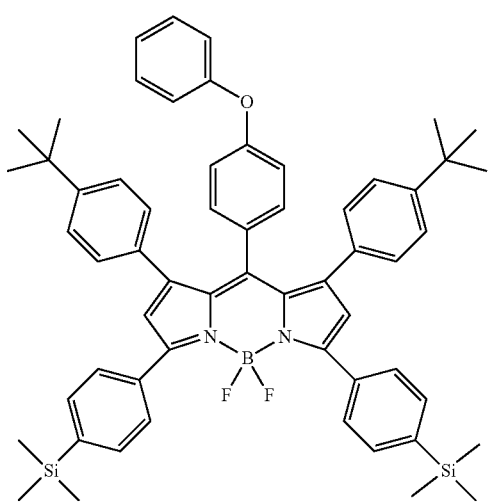
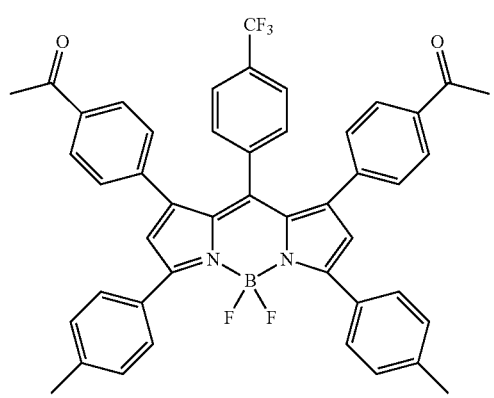

-continued
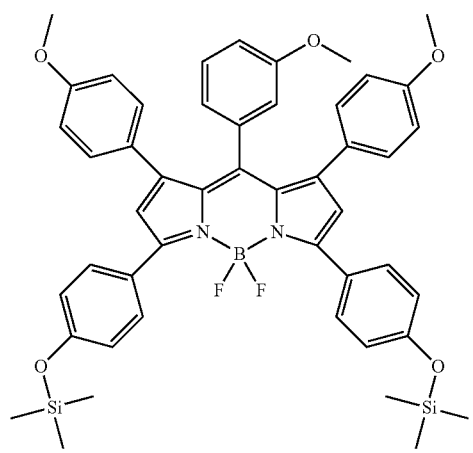
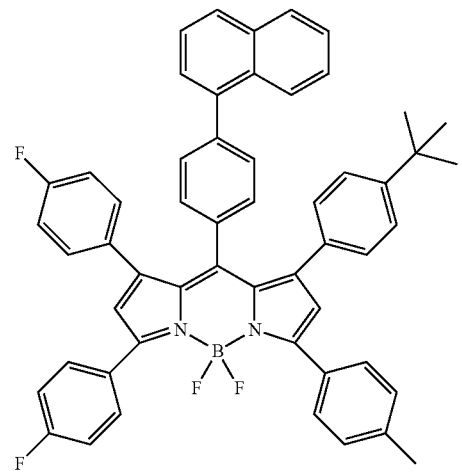
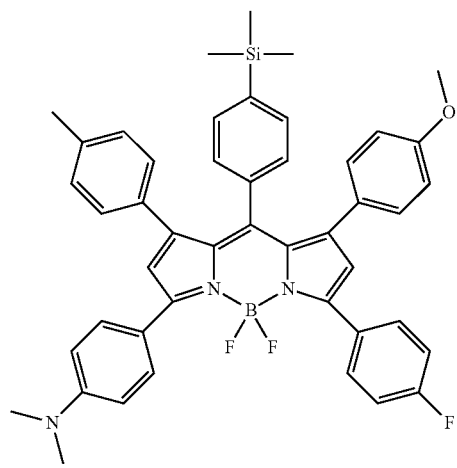
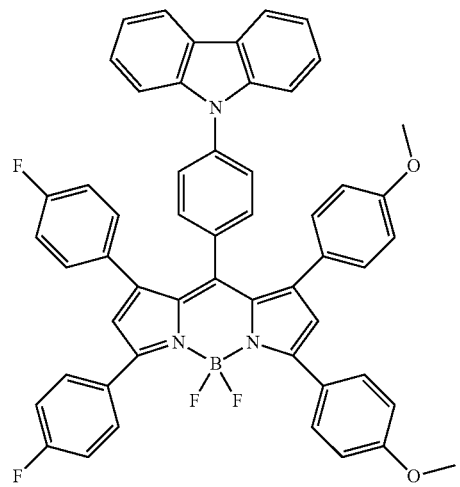
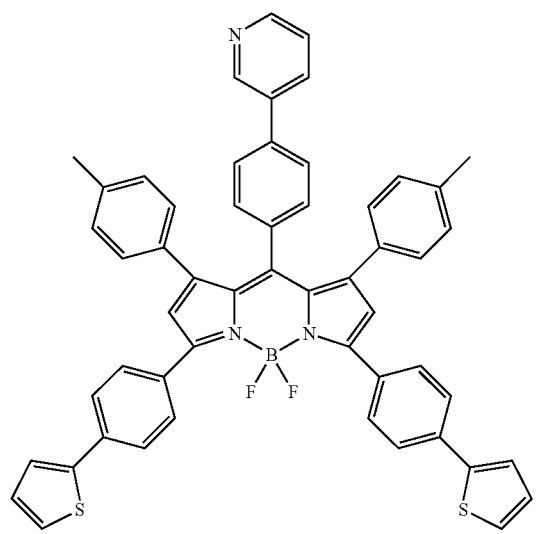
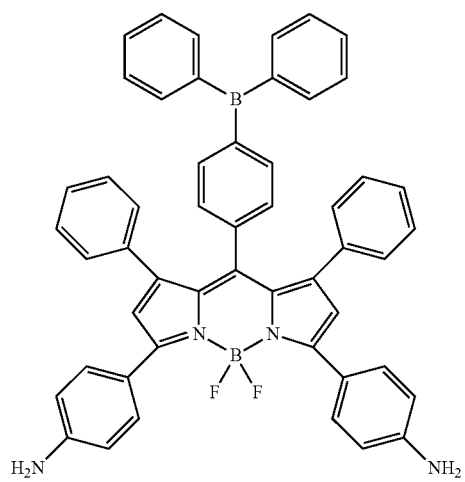

-continued
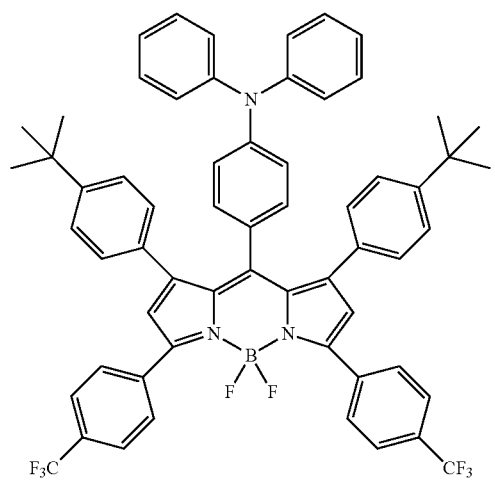
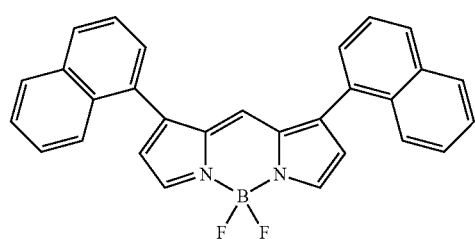
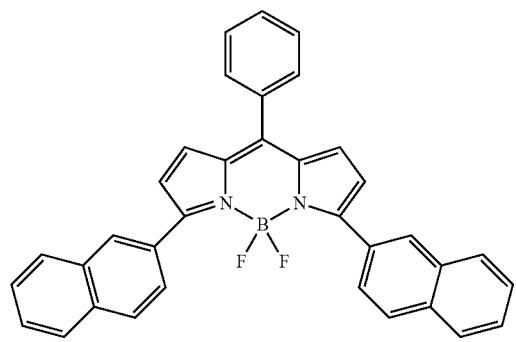
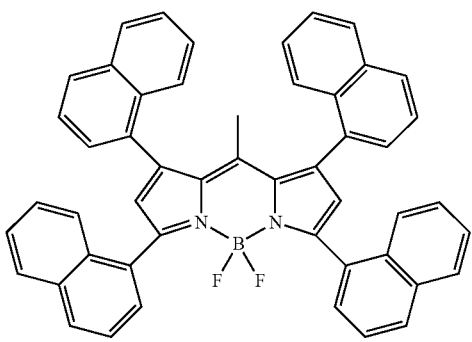
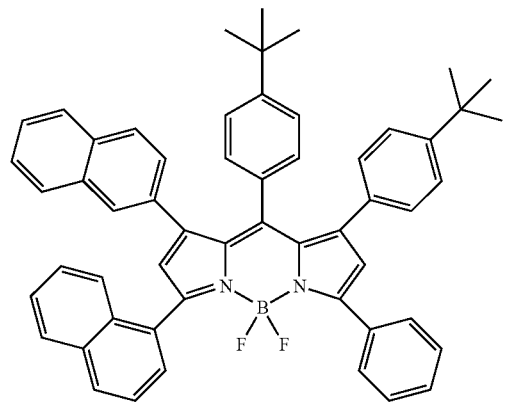
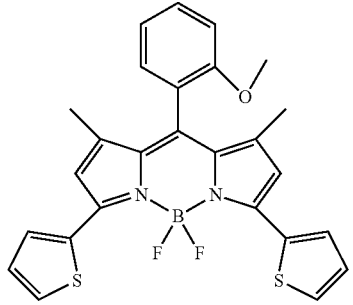
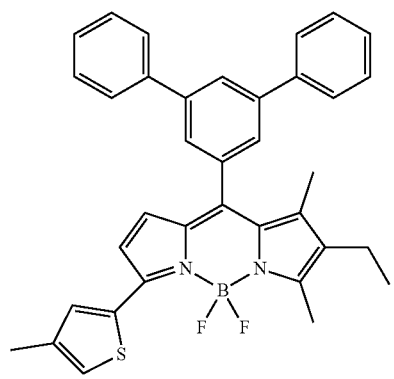
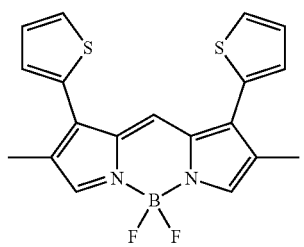

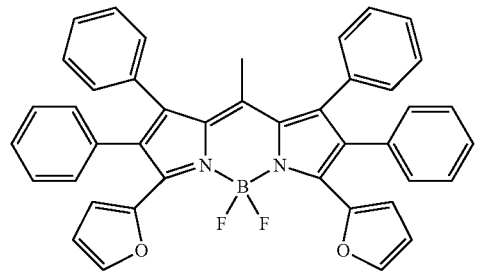
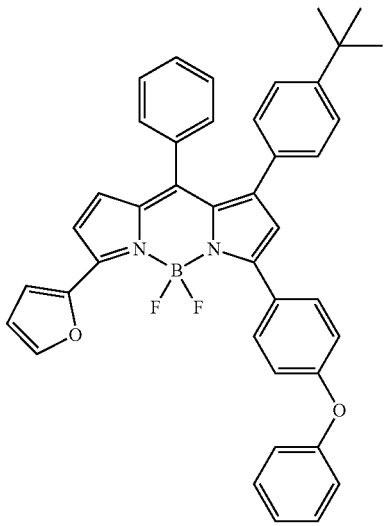
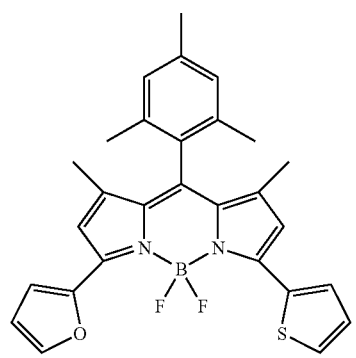
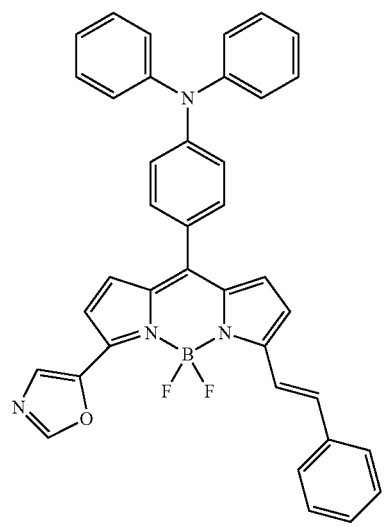
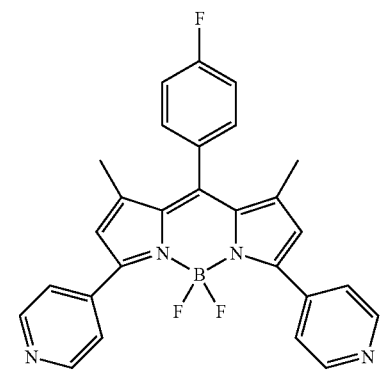
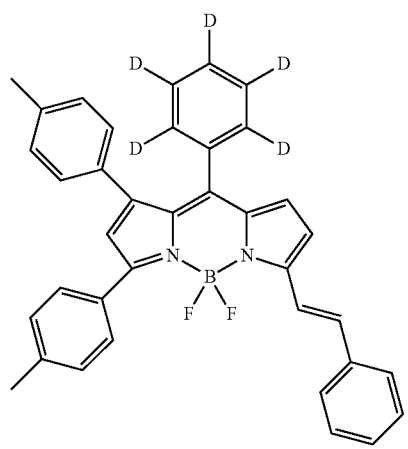
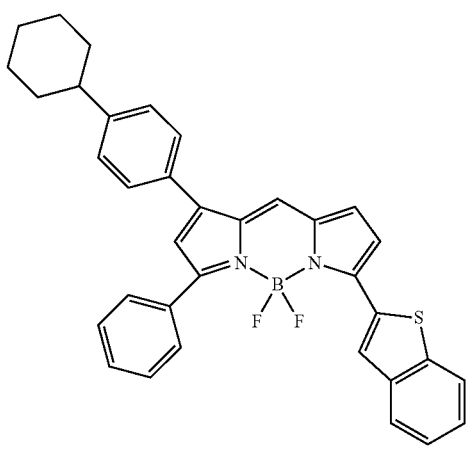

-continued
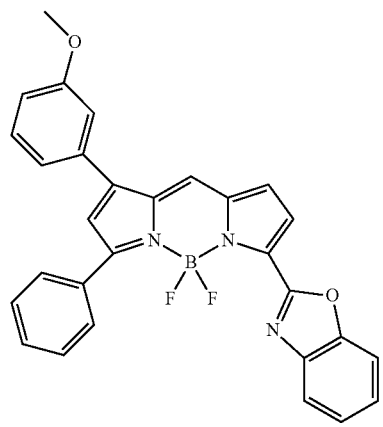
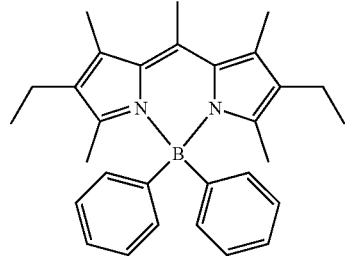
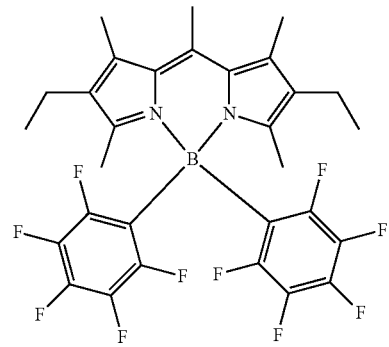
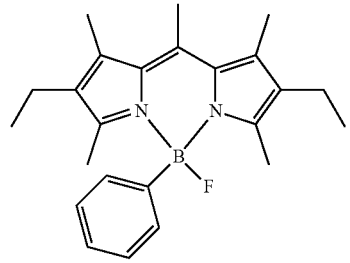
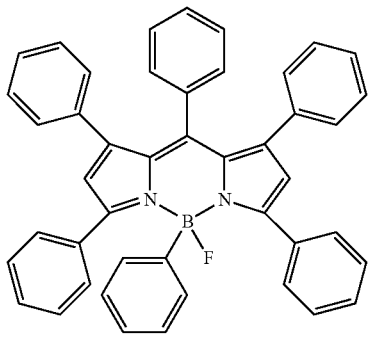
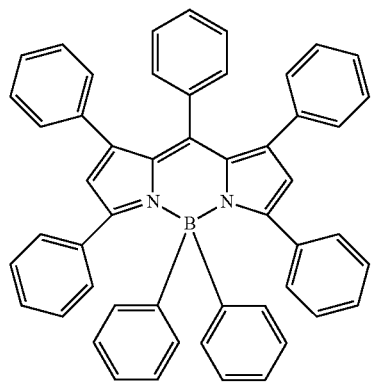
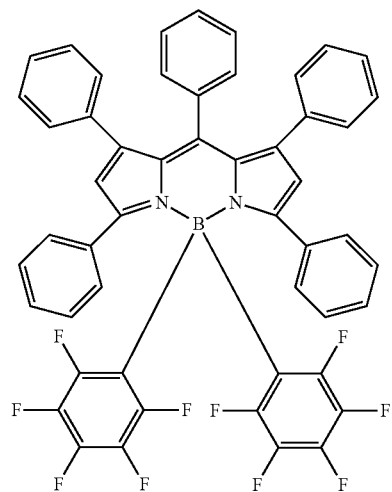
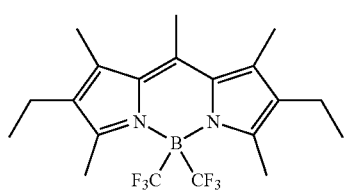
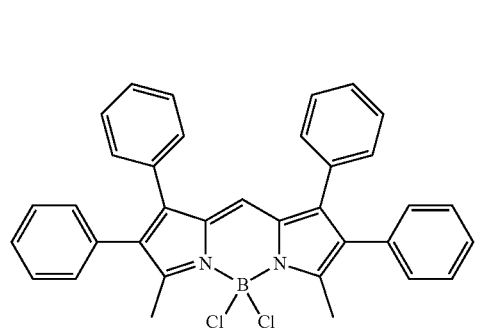
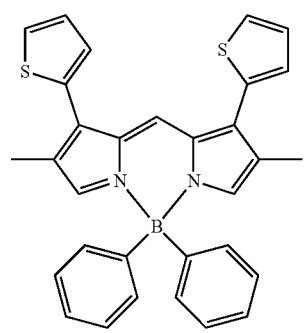

101                    102
-continued
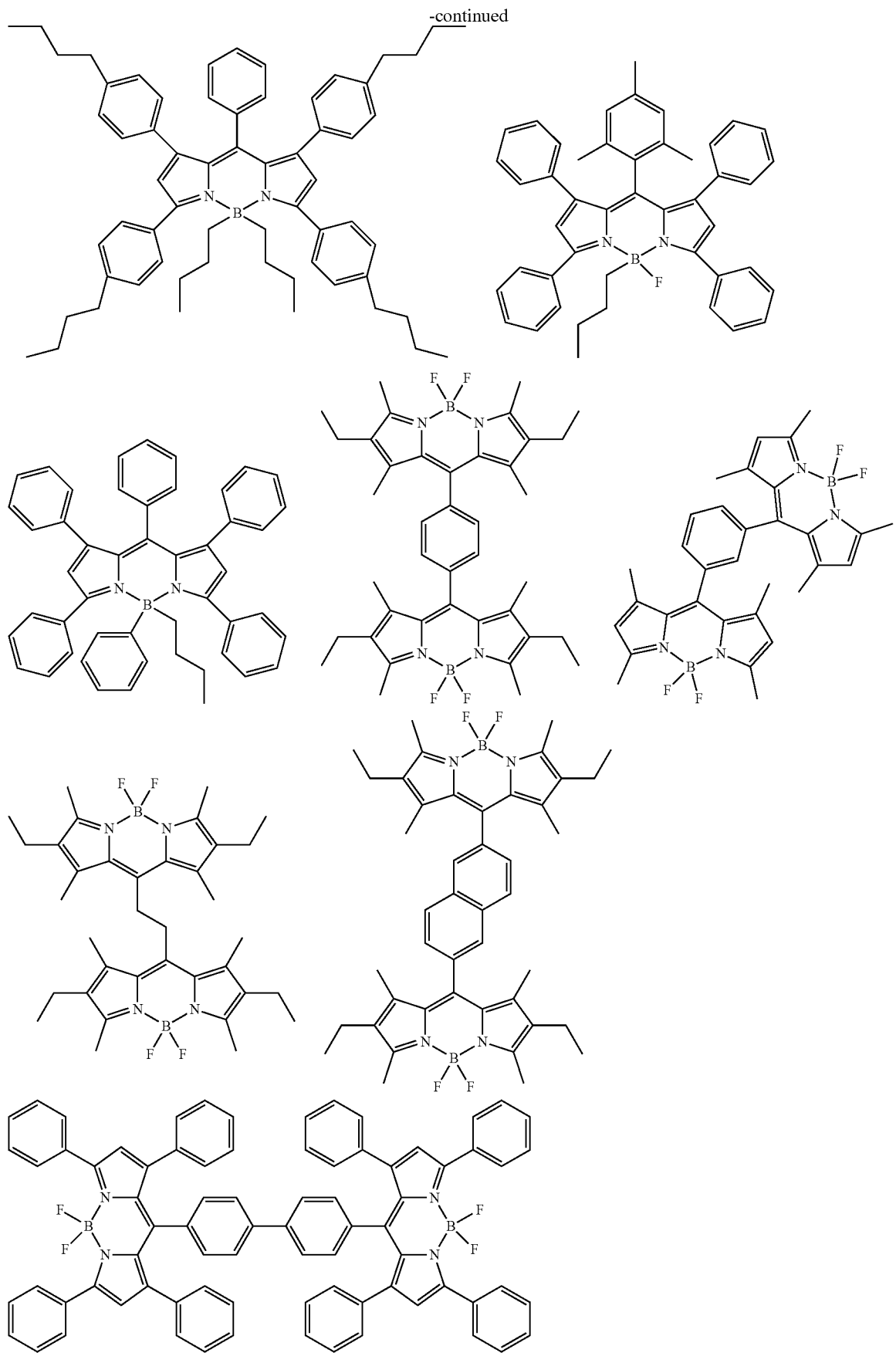

-continued
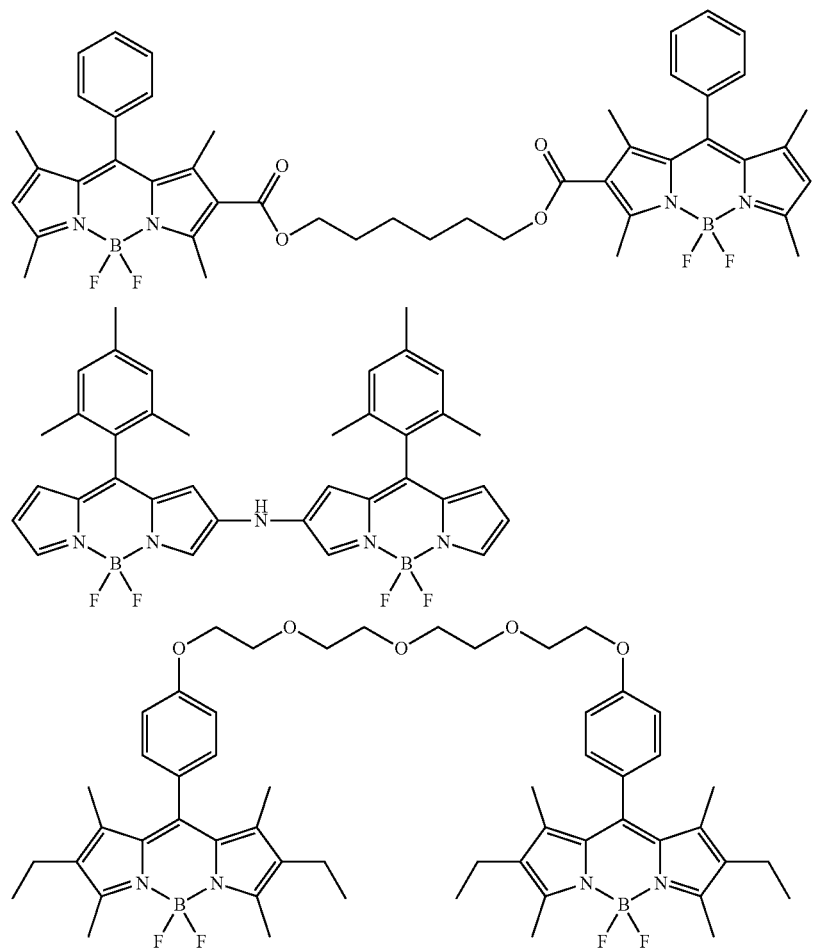
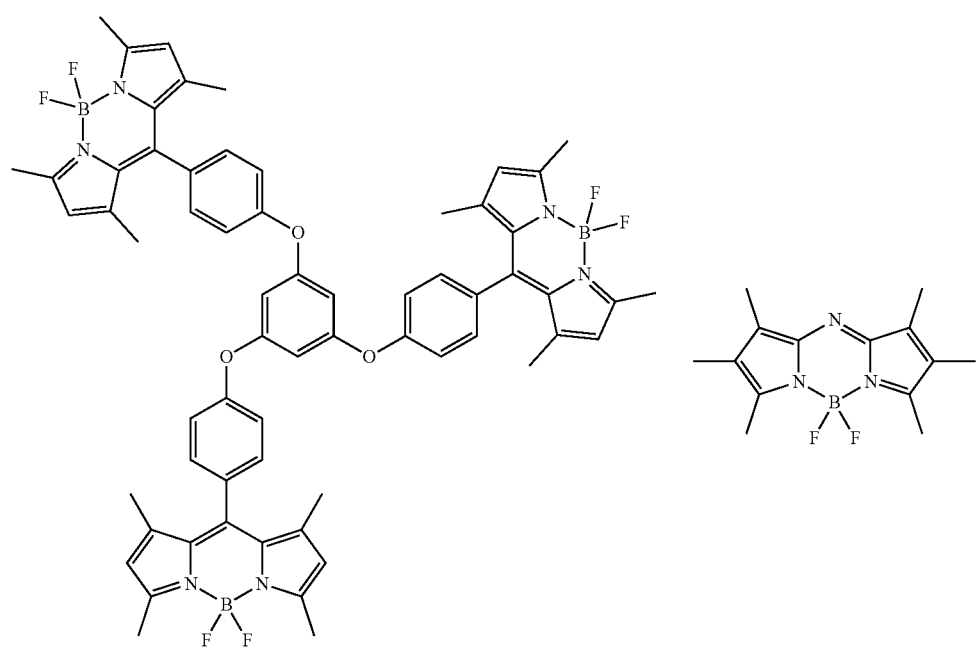

105
-continued
106
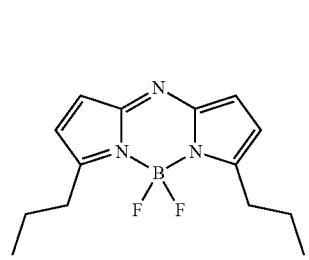
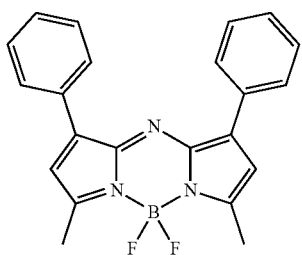
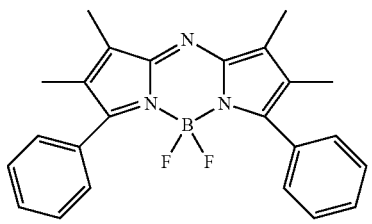
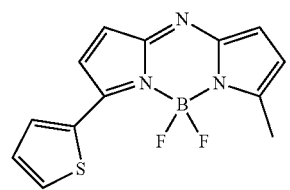
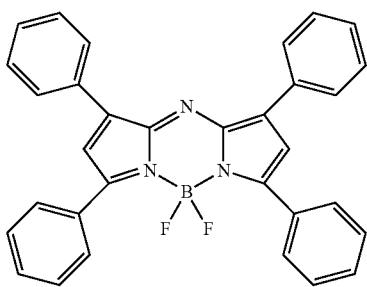
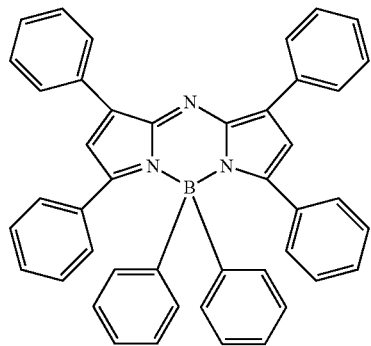
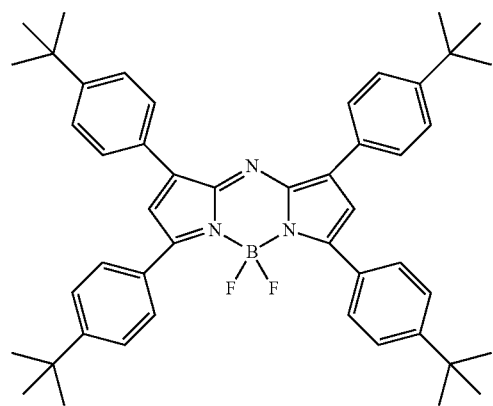
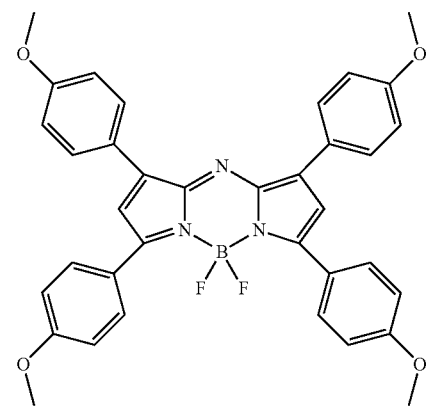
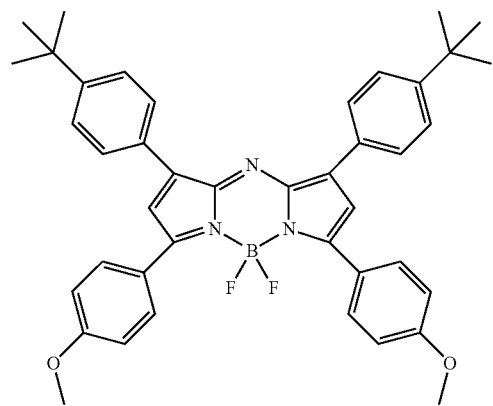
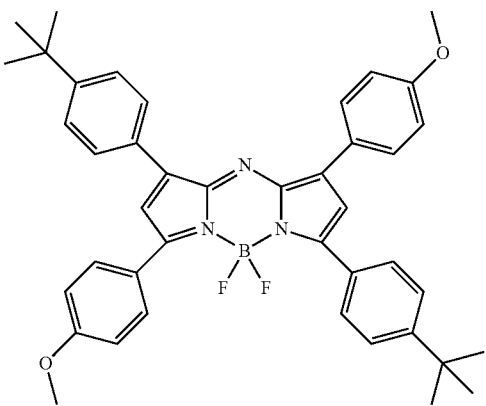

-continued

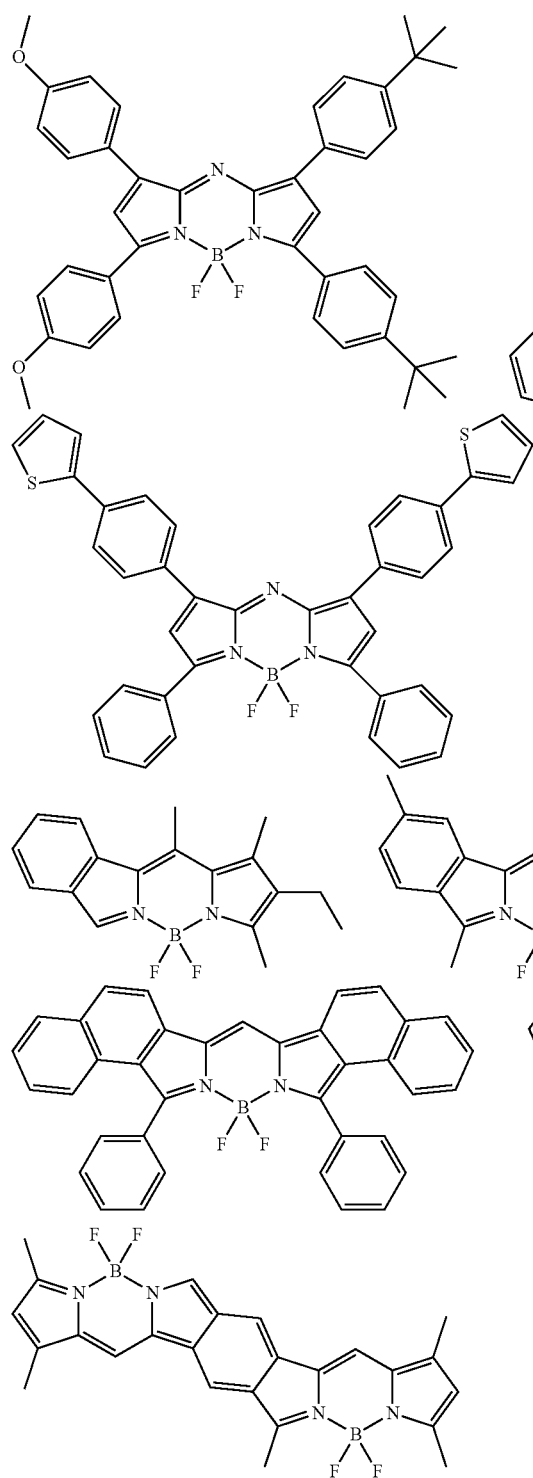

The compound represented by General Formula (1) can be synthesized, for example, by the method described in JP1996-509471A (JP-H8-509471A), JP2000-208262A, and the like. That is, a target pyrromethene-based metal complex is obtained by reacting a pyrromethene compound with a metal salt in the presence of a base.

In addition, with regard to a synthesis of a pyrromethene-boron fluoride complex, the compound represented by General Formula (1) can be synthesized with reference to the method described in J. Org. Chem., vol. 64, No. 21, pp. 7813 to 7819 (1999); Angew. Chem., Int. Ed. Engl., vol. 36, pp. 1333 to 1335 (1997); and the like. Examples thereof include a method of obtaining the compound represented by General Formula (1) by heating a compound represented by General Formula (3) and a compound represented by General Formula (4) in the presence of phosphorus oxychloride, and then reacting with a compound represented by General Formula (5) in 1,2-dichloroethane in the presence of triethylamine. However, the present disclosure is not limited thereto. Here, $R^1$ to $R^9$ are the same as those described above. J represents halogen.

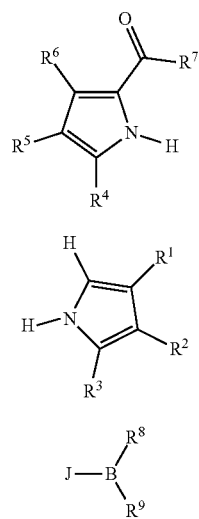

Furthermore, in a case of introducing the aryl group or the heteroaryl group, examples of the above-described method include a method of forming a carbon-carbon bond by a coupling reaction between a halogenated compound and a boronic acid or a boronic esterified compound, but the present disclosure is not limited thereto.

Similarly, in a case of introducing the amino group or the carbazolyl group, examples of the above-described method include a method forming a carbon-nitrogen bond by a coupling reaction between a halogenated compound and an amine or a carbazole compound in the presence of a metal catalyst such as palladium, but the present disclosure is not limited thereto.

The first color conversion layer may appropriately contain other compounds in addition to the compound represented by General Formula (1), as necessary. For example, in order to further increase energy transfer efficiency from the excitation light to the compound represented by General Formula (1), the first color conversion layer may contain an assist dopant such as rubrene.

In addition, in a case where it is desired to add a light-emitting color other than a light-emitting color of the compound represented by General Formula (1), a desired organic light-emitting material (for example, a coumarin-based coloring agent, a rhodamine-based coloring agent, and the like) can be added. In addition to these organic light-emitting materials, it is also possible to add a combination of known light-emitting materials such as an inorganic phosphor, a fluorescent pigment, a fluorescent dye, and quantum dot.

Examples of the organic light-emitting material other than the compound represented by General Formula (1) are shown below, but the present disclosure is not particularly limited thereto.

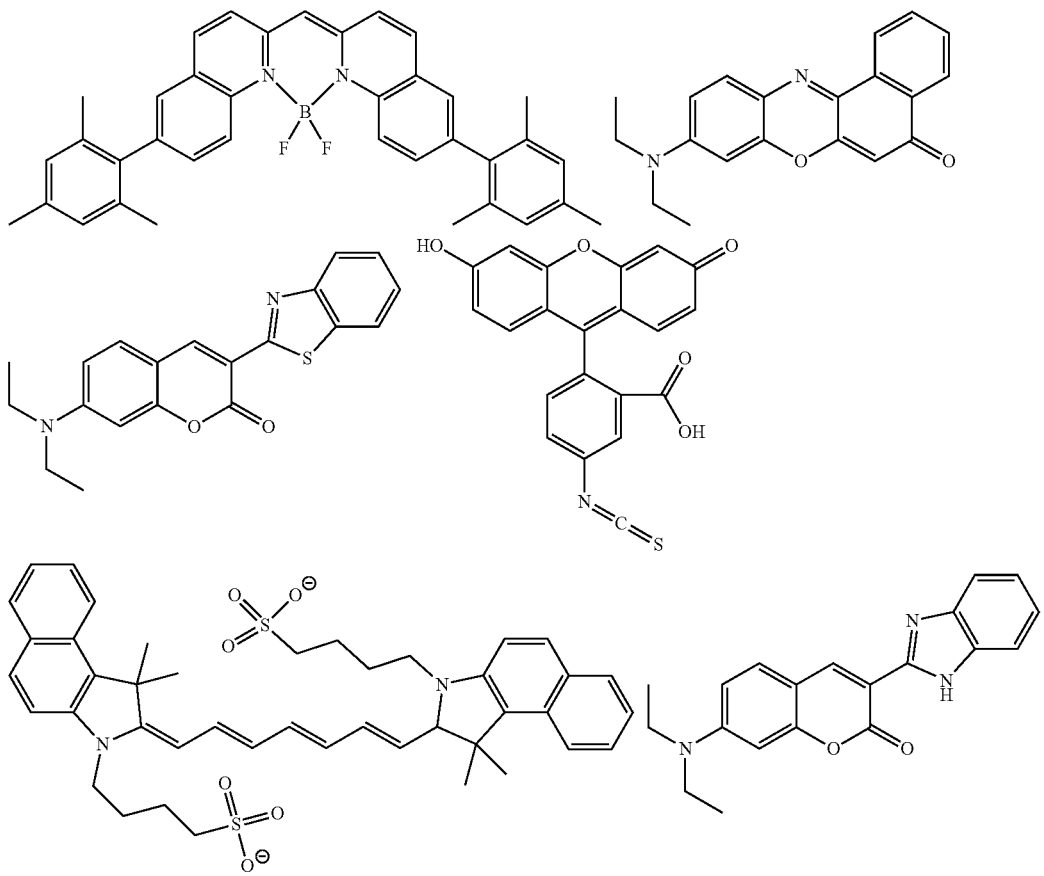

111
-continued
112
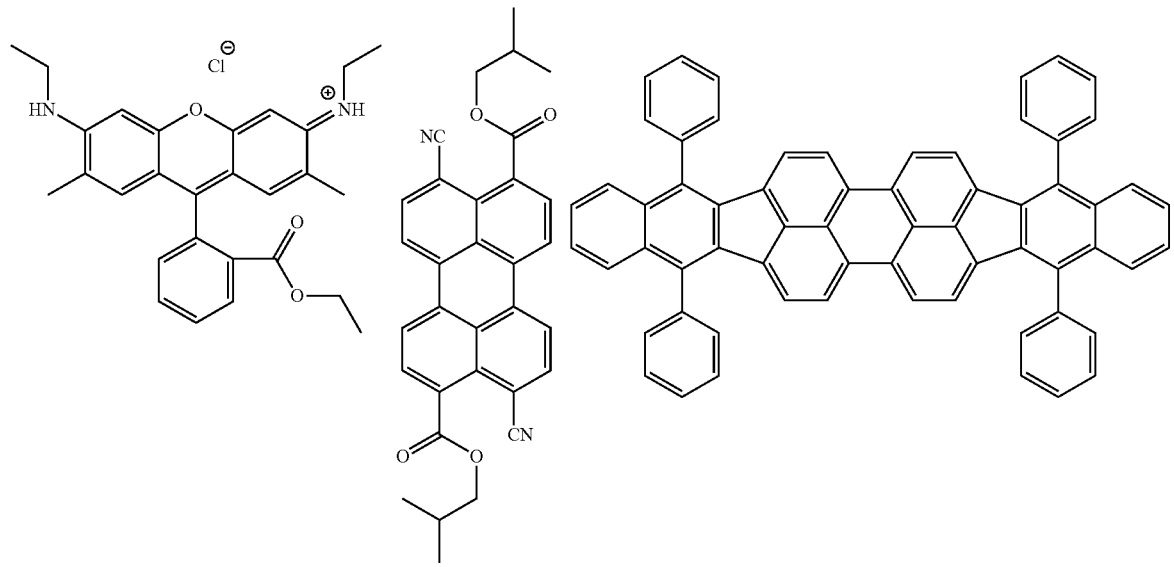
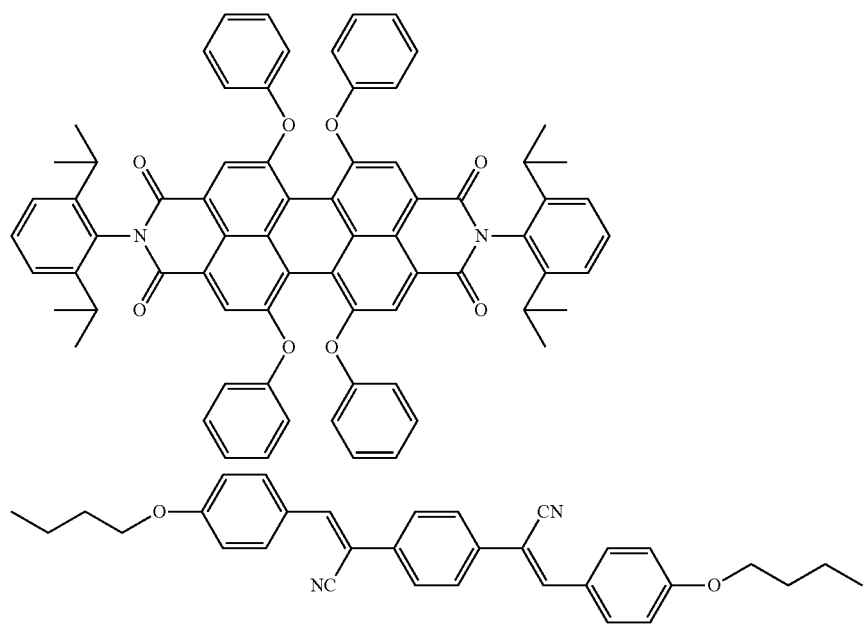
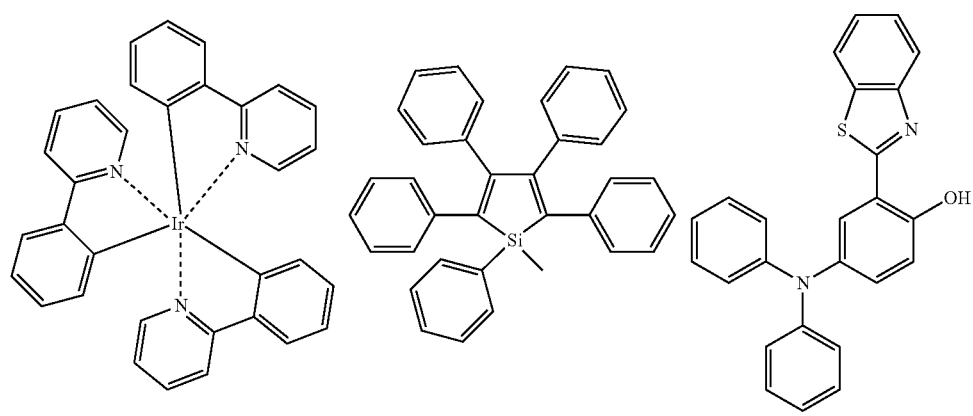

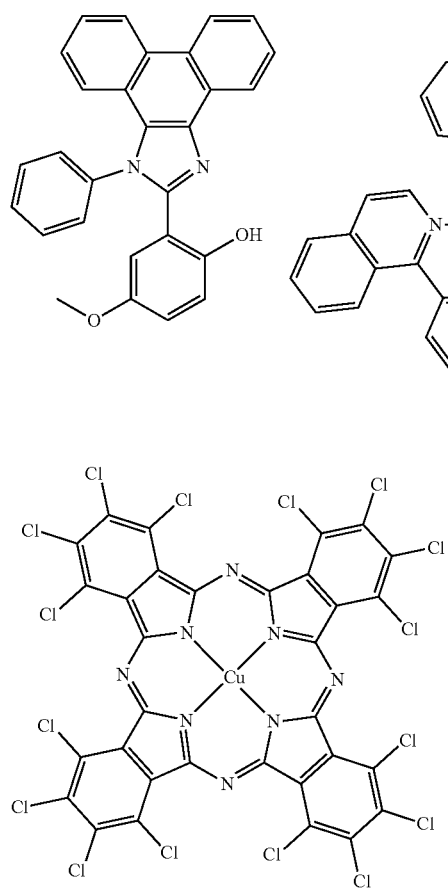
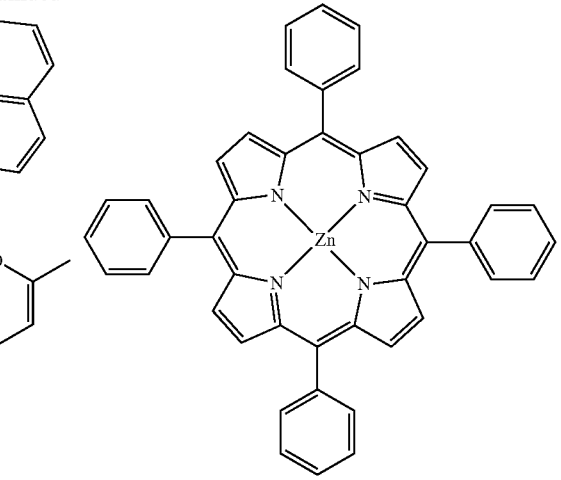
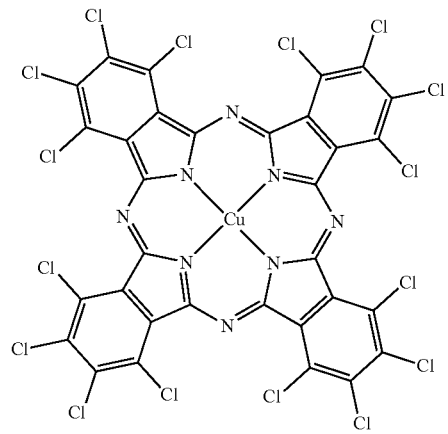

The first color conversion layer may contain two or more kinds of the specific organic light-emitting materials A.

From the viewpoint of wavelength conversion effect, a content of the specific organic light-emitting material A is preferably 0.005 parts by mass to 1 part by mass, more preferably 0.007 parts by mass to 0.7 parts by mass, and still more preferably 0.01 parts by mass to 0.5 parts by mass with respect to 100 parts by mass of the total amount of solid contents contained in the first color conversion layer.

The first color conversion layer may contain one or two or more kinds of the binder resins.

The binder resin is not particularly limited, and examples thereof include an epoxy resin, a silicone resin (including organopolysiloxane cured polymerized substances such as silicone rubber and silicone gel), a polyester resin, a (meth)acrylic resin, a vinyl resin, a polyamide resin, a polyimide resin, a polycarbonate resin, a cellulose resin, a polyolefin resin, a urea resin, a melamine resin, a phenol resin, a polyvinyl alcohol resin, a polyvinyl butyral resin, a fluororesin, a thermocured resin, and a photocured resin.

Among the above, from the viewpoint of transparency and heat resistance, an epoxy resin, a silicone resin, a polyester resin, a (meth)acrylic resin, or a mixture thereof is preferable.

In addition, from the viewpoint of adhesiveness with the interlayer, transparency, and heat resistance, a photocured resin is preferable. The photocured resin means a resin obtained by irradiating a photocurable resin with an actinic ray such as ultraviolet rays to be cured.

The photocurable resin may be a radically polymerizable resin or a cationically polymerizable resin. Examples of the radically polymerizable compound include a compound having an ethylenically unsaturated double bond, a compound having a conjugated diene moiety, a compound having a maleimide moiety, and a thiol compound cured by a thiol-ene reaction. Examples of the cationically polymerizable compound include an episulfide compound, an oxetane compound, a vinyl ether compound, an epoxy compound, a styrene compound, and a diene compound.

It is preferable that the binder resin contained in the first color conversion layer is different from a binder resin contained in the second color conversion layer. Accordingly, the organic light-emitting material contained in the first color conversion layer and the organic light-emitting material contained in the second color conversion layer are dispersed in different binder resins, so that each emission peak wavelength of these organic light-emitting materials can be individually adjusted to the optimum peak wavelength. The fact that the two binder resins are different from each other means that compositions of the resins are different from each other.

From the viewpoint of transparency, heat resistance, and dispersibility of the organic light-emitting material, a content of the binder resin is preferably 90 parts by mass or more, more preferably 93 parts by mass or more, and still more preferably 95 parts by mass or more with respect to 100 parts by mass of the total amount of solid contents contained in the first color conversion layer.

In addition, the content of the above-described binder resin is preferably 99 parts by mass or less with respect to 100 parts by mass of the total amount of solid contents contained in the first color conversion layer.

The first color conversion layer may contain a surfactant.

Examples of the surfactant include surfactants described in paragraph [0017] of JP4502784B and paragraphs [0060] to [0071] of JP2009-237362A.

As the surfactant, a fluorine-based surfactant, a nonionic surfactant, or a silicone-based surfactant is preferable.

Examples of a commercially available product of the fluorine-based surfactant include MEGAFACE (registered trademark) F-171, F-172, F-173, F-176, F-177, F-141, F-142, F-143, F-144, F-437, F-475, F-477, F-479, F-482, F-511, F-552, F-554, F-555-A, F-556, F-557, F-558, F-559, F-560, F-561, F-565, F-563, F-568, F-575, F-780, EXP, MFS-330, MFS-578, MFS-579, MFS-586, MFS-587, R-41, R-41-LM, R-01, R-40, R-40-LM, RS-43, TF-1956, RS-90, R-94, RS-72-K, and DS-21 (all of which are manufactured by DIC Corporation); FLUORAD FC430, FC431, and FC171 (all of which are manufactured by Sumitomo 3M Ltd.); SURFLON (registered trademark) S-382, SC-101, SC-103, SC-104, SC-105, SC-1068, SC-381, SC-383, S-393, and KH-40 (all of which are manufactured by Asahi Glass Co., Ltd.); and POLYFOX PF636, PF656, PF6320, PF6520, and PF7002 (all of which are manufactured by OMNOVA Solutions Inc.); FTERGENT (registered trademark) 710FL, 710FM, 610FM, 601AD, 601ADH2, 602A, 215M, 245F, 251, 212M, 250, 209F, 222F, 208G, 710LA, 710FS, 730LM, 650AC, 681, and 683 (all of which are manufactured by NEOS COMPANY LIMITED).

In addition, as the fluorine-based surfactant, a (meth) acrylic compound which has a molecular structure having a functional group containing a fluorine atom and in which the functional group containing a fluorine atom is broken to volatilize a fluorine atom by applying heat to the molecular structure can also be suitably used.

Examples of such a fluorine-based surfactant include MEGAFACE (registered trademark) DS series manufactured by DIC Corporation (The Chemical Daily (Feb. 22, 2016) and Nikkei Business Daily (Feb. 23, 2016)) (for example, MEGAFACE (registered trademark) DS-21).

In addition, as the fluorine-based surfactant, a polymer of a fluorine atom-containing vinyl ether compound having a fluorinated alkyl group or a fluorinated alkylene ether group, and a hydrophilic vinyl ether compound can also be preferably used.

In addition, a block polymer can also be used as the fluorine-based surfactant.

As the fluorine-based surfactant, a fluorine-containing polymer compound including a constitutional unit derived from a (meth)acrylate compound having a fluorine atom and a constitutional unit derived from a (meth)acrylate compound having 2 or more (preferably 5 or more) alkyleneoxy groups (preferably ethyleneoxy groups or propyleneoxy groups) can also be preferably used.

In addition, as the fluorine-based surfactant, a fluorine-containing polymer having an ethylenically unsaturated bond-containing group at a side chain can also be used.

Specific examples thereof include MEGAFACE (registered trademark) RS-101, RS-102, RS-718K, and RS-72-K (all of which are manufactured by DIC Corporation).

As the fluorine-based surfactant, from the viewpoint of improving environmental suitability, a surfactant derived from a substitute material for a compound having a linear perfluoroalkyl group having 7 or more carbon atoms, such as perfluorooctanoic acid (PFOA) and perfluorooctanesulfonic acid (PFOS), is preferable.

Examples of the nonionic surfactant include glycerol, trimethylolpropane, trimethylolethane, and ethoxylate and propoxylate thereof (for example, glycerol propoxylate, glycerol ethoxylate, and the like), polyoxyethylene lauryl ether, polyoxyethylene stearyl ether, polyoxyethylene oleyl ether, polyoxyethylene octyl phenyl ether, polyoxyethylene nonyl phenyl ether, polyethylene glycol dilaurate, polyethylene glycol distearate, and sorbitan fatty acid ester.

Examples of a commercially available product thereof include PLURONIC (registered trademark) L10, L31, L61, L62, 10R5, 17R2, and 25R2 (all of which are manufactured by BASF); TETRONIC (registered trademark) 304, 701, 704, 901, 904, and 150R1 (all of which are manufactured by BASF); Solsperse 20000 (manufactured by Nippon Lubrizol Corporation); NCW-101, NCW-1001, and NCW-1002 (all of which are manufactured by FUJIFILM Wako Pure Chemical Corporation); Pionin D-6112, D-6112-W, and D-6315 (all of which are manufactured by TAKEMOTO OIL & FAT Co., Ltd.); and OLFINE (registered trademark) E1010, SURFYNOL (registered trademark) 104, 400, and 440 (all of which are manufactured by Nissin Chemical Co., Ltd.).

Examples of the silicone-based surfactant include a linear polymer having a siloxane bond and a modified siloxane polymer with an organic group introduced in the side chain or the terminal.

Specific examples of the silicone-based surfactant include DOWSIL (registered trademark) 8032 ADDITIVE, TORAY SILICONE DC3PA, TORAY SILICONE SH7PA, TORAY SILICONE DC11PA, TORAY SILICONE SH21PA, TORAY SILICONE SH28PA, TORAY SILICONE SH29PA, TORAY SILICONE SH30PA, and TORAY SILICONE SH8400 (all of which are manufactured by Dow Corning Toray Co., Ltd.), X-22-4952, X-22-4272, X-22-6266, KF-351A, K354L, KF-355A, KF-945, KF-640, KF-642, KF-643, X-22-6191, X-22-4515, KF-6004, KP-341, KF-6001, and KF-6002 (all of which are manufactured by Shin-Etsu Silicone Co., Ltd.), F-4440, TSF-4300, TSF-4445, TSF-4460, and TSF-4452 (all of which are manufactured by Momentive Performance Materials Co., Ltd.), and BYK307, BYK323, and BYK330 (all of which are manufactured by BYK Chemie).

The surfactant may be used alone or in combination of two or more kinds thereof.

In a case where the first color conversion layer contains a surfactant, a content of the surfactant is preferably 0.01 parts by mass to 3 parts by mass, more preferably 0.02 parts by mass to 1 part by mass, and still more preferably 0.05 parts by mass to 0.80 parts by mass with respect to 100 parts by mass of solid contents contained in the first color conversion layer.

(Polymerization Initiator)

The first color conversion layer may contain one or two or more kinds of polymerization initiators. The polymerization initiator may be a thermal polymerization initiator or a photopolymerization initiator. In addition, examples of the photopolymerization initiator include a photoradical polymerization initiator and a photocationic polymerization initiator.

Examples of the photoradical polymerization initiator include quinones, aromatic ketones, acetophenones, acylphosphine oxides, benzoins, benzoin ethers, dialkylketals, thioxanthones, dialkylaminobenzoic acid esters, oxime esters, acridines, hexaarylbiimidazoles, pyrazoline compounds, N-arylamino acids and ester compounds thereof, and halogen compounds.

Examples of the photocationic polymerization initiator include aromatic sulfonium salts, aromatic iodonium salts, aromatic diazonium salts, aromatic ammonium salts, thioxanthonium salts, and (2,4-cyclopentadien-1-yl)[(1-methylethyl)benzene]-iron salts, which are composed of a cationic moiety of aromatic sulfonium, aromatic iodonium, aromatic diazonium, aromatic ammonium, thioxanthonium, (2,4-cyclopentadien-1-yl)[(1-methylethyl)benzene]-iron cation, or thianthrenium and an anionic moiety of $BF_4^-$, $PF_6^-$, $SbF_6^-$, or $[BX_4]^-$ (here, X represents a functional group in which two or more hydrogen atoms of a phenyl group are substituted with a fluorine atom or a trifluoromethyl group).

A content of the photopolymerization initiator is preferably 0.001 parts by mass to 10 parts by mass, and more preferably 0.01 parts by mass to 5 parts by mass with respect to 100 parts by mass of solid contents contained in the first color conversion layer.

The first color conversion layer may contain an additive other than the organic light-emitting material and the binder resin described above. Examples of the additive include a viscosity adjuster, an antioxidant, a heat stabilizer, a plasticizer, a leveling agent, an antistatic agent, a curing agent, a silane coupling agent, inorganic particles, and organic particles.

From the viewpoint of wavelength conversion effect, a thickness of the first color conversion layer is preferably 1 μm or more, more preferably 5 μm or more, and still more preferably 10 μm or more.

In addition, from the viewpoint of downsizing of a backlight unit or the like, the thickness of the first color conversion layer is preferably 50 μm or less.

(Interlayer)

In the first aspect, the color conversion film includes an interlayer between the first color conversion layer and the second color conversion layer. Therefore, as a result of suppressing the mixing of the first color conversion layer and the second color conversion layer and maintaining the color reproducibility of each layer, the color conversion film according to the embodiment of the present disclosure has excellent color reproducibility.

It is preferable that a part or the whole of the interlayer is in direct contact with the first color conversion layer.

In addition, it is preferable that a part or the whole of the interlayer is in direct contact with the second color conversion layer.

(Water-Soluble Resin)

The interlayer can contain one or two or more kinds of water-soluble resins, whereby the mixing of the first color conversion layer and the second color conversion layer can be further suppressed, and the color reproducibility of the color conversion film can be further improved.

A weight-average molecular weight (Mw) of the water-soluble resin is preferably 1,000 to 500,000 and more preferably 2,000 to 200,000.

Examples of the water-soluble resin include cellulose resins such as hydroxypropylcellulose and hydroxypropylmethylcellulose; polyvinyl alcohol (PVA) resins; polyvinylpyrrolidone (PVP) resins; acrylamide resins; (meth)acrylate resins; polyethylene oxide resins; gelatin; vinyl ether resins; polyamide resins; modified resins thereof; polymerized substances thereof; and copolymerized substances thereof.

Among the above-described water-soluble resins, the water-soluble resin preferably contains one or more kinds of resins (hereinafter, also referred to specific water-soluble resins) selected from the group consisting of a PVA resin, a PVP resin, a cellulose resin, polymerized substances of these resins, and copolymerized substances of these resins.

From the viewpoint of color reproducibility, a content of the specific water-soluble resin is preferably 50 parts by mass or more, more preferably 70 parts by mass or more, and still more preferably 80 parts by mass or more with respect to 100 parts by mass of the total amount of the water-soluble resins contained in the interlayer.

In addition, the content of the specific water-soluble resin is preferably 100 parts by mass or less with respect to 100 parts by mass of the total amount of the water-soluble resins contained in the interlayer.

The water-soluble resin preferably contains at least one of the PVA resin or the PVP resin.

In a case where the water-soluble resin contains the PVA resin and the PVP resin, from the viewpoint of color reproducibility of the color conversion film and adhesiveness between the first color conversion layer and the second color conversion layer, a ratio of a content of the PVP resin to a content of the PVA resin in the water-soluble resin (content of PVP resin/content of PVA resin) is preferably 1/99 to 75/25, more preferably 5/95 to 60/40, and still more preferably 20/80 to 50/50 on a mass basis.

From the viewpoint of adhesiveness between the first color conversion layer and the second color conversion layer, it is preferable that the above-described water-soluble resin contains a polymerized substance of the PVA resin and a crosslinking agent.

Examples of the crosslinking agent include an aldehyde compound, an N-methylol compound, a dioxane compound, a compound which acts by activating a carboxyl group, an active vinyl compound, an active halogen compound, an isooxazole compound, and dialdehyde starch.

Examples of the aldehyde compound include formaldehyde, glyoxal, and glutaraldehyde.

Examples of the N-methylol compound include dimethylol urea and methylol dimethylhydantoin.

Examples of the dioxane compound include 2,3-dihydroxydioxane.

Examples of the compound which acts by activating a carboxyl group include carbenium, 2-naphthalenesulfonate, 1,1-bispyrrolidino-1-chloropyridinium, and 1-morpholinocarbonyl-3-(sulfonatoaminomethyl).

Examples of the active vinyl compound include 1,3,5-triacryloyl-hexahydro-s-triazine, bis(vinylsulfone)methane, and N,N'-methylenebis-[β-(vinylsulfonyl)propionamide].

Examples of the active halogen compound include 2,4-dichloro-6-hydroxy-S-triazine.

From the viewpoint of reaction activity, an aldehyde compound is preferable, and glutaraldehyde is more preferable.

From the viewpoint of adhesiveness between the first color conversion layer and the second color conversion layer, a content of the crosslinking agent is preferably 0.05 parts by mass to 10 parts by mass, more preferably 0.1 parts by mass to 8 parts by mass, and still more preferably 0.5 parts by mass to 5 parts by mass with respect to 100 parts by mass of the PVA resin.

It is preferable that the above-described water-soluble resin contains at least one of a polymerized substance of a modified PVA resin having a crosslinkable group (hereinafter, also simply referred to as a polymerized substance of a modified PVA resin) or an unmodified PVA resin.

From the viewpoint of adhesiveness between the first color conversion layer and the second color conversion layer, the water-soluble resin preferably contains a polymerized substance of a modified PVA resin.

In addition, the water-soluble resin preferably contains a polymerized substance of a modified PVA resin and an unmodified PVA resin.

In a case where the water-soluble resin contains a polymerized substance of a modified PVA resin and an unmodified PVA resin, from the viewpoint of adhesiveness between the first color conversion layer and the second color conversion layer, a ratio of a content of the polymerized substance of a modified PVA resin to a content of the unmodified PVA resin in the water-soluble resin (content of polymerized substance of modified PVA resin/content of unmodified PVA resin) is preferably 1/99 to 30/70, more preferably 3/97 to 20/80, and still more preferably 5/95 to 15/85 on a mass basis.

The modified PVA resin constituting the polymerized substance of a modified PVA resin will be described below.

The modified PVA resin is obtained by introducing a repeating unit having a polymerizable group into a PVA resin or by reacting a compound having a polymerizable group with a PVA resin or a modified PVA resin.

The polymerizable group included in the modified PVA is preferably an unsaturated polymerizable group, an epoxy group, or an aziridinyl group, more preferably an unsaturated polymerizable group, and still more preferably an ethylenically unsaturated polymerizable group.

In the modified PVA resin, it is preferable that a main chain and the polymerizable group are bonded through a linking group, without being directly bonded to each other. Examples of the linking group include *—O—**, *—O—CO—**, *—O—CO—NH—**, *—O—CO—NH-alkylene group-**, *—O—CO—NH-alkylene group-O—**, *—O—CO—NH-alkylene group-CO—O—**, *—O—CO—NH-alkylene group-O—CO—**, *—O—CO—NH-alkylene group-CO—NH—**, *—O—CO-alkylene group-O—CO—**, *—O—CO-arylene group-O-alkylene group-O—CO—**, *—O—CO-arylene group-O-alkylene group-O—**, *—O—CO-arylene group-O-alkylene group-, and —O-alkylene group-O—CO—**.

* indicates a bonding position to the main chain, and ** indicates a bonding position to the polymerizable group.

The above-described alkylene group may have a branched or cyclic structure. The number of carbon atoms in the alkylene group is preferably 1 to 30, more preferably 1 to 20, still more preferably 1 to 15, and particularly preferably 1 to 12.

The above-described arylene group is preferably phenylene or naphthylene, more preferably phenylene, and particularly preferably p-phenylene. The arylene group may have a substituent. Examples of the substituent of the arylene group include a halogen atom (F, Cl, or Br), carboxyl, cyano, nitro, carbamoyl, sulfamoyl, an alkyl group, a cycloalkyl group, an alkoxy group, an alkylthio group, an acyl group, an acyloxy group, an alkyl-substituted carbamoyl group, an alkyl-substituted sulfamoyl group, an amide group, a sulfonamide group, and an alkylsulfonyl group.

The above-described alkyl group may have a branch. The number of carbon atoms in the alkyl group is preferably 1 to 20, more preferably 1 to 15, still more preferably 1 to 10, and particularly preferably 1 to 6. The above-described cycloalkyl group is preferably a cyclohexyl group. The above-described alkoxy group may have a branch. The number of carbon atoms in the alkoxy group is preferably 1 to 20, more preferably 1 to 15, still more preferably 1 to 10, and particularly preferably 1 to 6. The above-described alkylthio group may have a branch. The number of carbon atoms in the alkylthio group is preferably 1 to 20, more preferably 1 to 15, still more preferably 1 to 10, and particularly preferably 1 to 6. The number of carbon atoms in the above-described acyl group is preferably 2 to 20, more preferably 2 to 15, still more preferably 2 to 10, and particularly preferably 2 to 6. The number of carbon atoms in the above-described acyloxy group is preferably 2 to 20, more preferably 2 to 15, still more preferably 2 to 10, and particularly preferably 2 to 6. The number of carbon atoms in the above-described alkyl-substituted carbamoyl group is preferably 2 to 20, more preferably 2 to 15, still more preferably 2 to 10, and particularly preferably 2 to 6. The alkyl moiety of the alkyl-substituted carbamoyl group may further have a substituent (for example, an alkoxy group and the like). The number of carbon atoms in the above-described alkyl-substituted sulfamoyl group is preferably 1 to 20, more preferably 1 to 15, still more preferably 1 to 10, and particularly preferably 1 to 6. The alkyl moiety of the alkyl-substituted sulfamoyl group may further have a substituent (for example, an alkoxy group and the like). The number of carbon atoms in the above-described amide group is preferably 2 to 20, more preferably 2 to 15, still more preferably 2 to 10, and particularly preferably 2 to 6. The number of carbon atoms in the above-described sulfonamide group is preferably 1 to 20, more preferably 1 to 15, still more preferably 1 to 10, and particularly preferably 1 to 6.

The number of carbon atoms in the above-described alkylsulfonyl group is preferably 1 to 20, more preferably 1 to 15, still more preferably 1 to 10, and particularly preferably 1 to 6. The alkyl moiety of the alkylsulfonyl group may further have a substituent (for example, an alkoxy group and the like).

The modified PVA resin may have two or more of the polymerizable groups.

Preferred examples of the modified PVA resin include a modified PVA resin having a repeating unit having a polymerizable group represented by Formula (II).

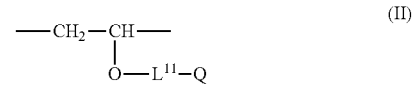

(II)

In Formula (II), $L^{11}$ is a linking group selected from the group consisting of a single bond, *—CO—**, *—CO—NH—**, *—CO—NH-alkylene group-**, *—CO—NH-alkylene group-O—**, *—CO—NH-alkylene group-CO—O—**, *—CO—NH-alkylene group-O—CO—**, *—CO—NH-alkylene group-CO—NH—**, *—CO-alkylene group-O—CO—**, *—CO-arylene group-O-alkylene group-O—CO—**, *—CO-arylene group-O-alkylene group-O—**, *—CO-arylene group-O-alkylene group-, and -alkylene group-O—CO—**.

* indicates a bonding position to O in the main chain, and ** indicates a bonding position to Q which is the polymerizable group.

Among the above-described linking groups, *—CO—NH-alkylene group-**, *—CO—NH-alkylene group-O—**, *—CO—NH-alkylene group-O—CO—**, *—CO-arylene group-O-alkylene group-O—CO—**, *—CO-arylene group-O-alkylene group O—**, *—CO-arylene group-O-alkylene group-, or -alkylene group-O—CO—** is preferable, and *—CO—NH-alkylene group-O—CO—** is more preferable. The above-described alkylene group may have a branched or cyclic structure. The number of carbon atoms in the alkylene group is preferably 1 to 30, more preferably 1 to 20, still more preferably 1 to 15, and particularly preferably 1 to 12. The above-described arylene group is preferably phenylene or naphthylene, more preferably phenylene, and most preferably p-phenylene. The arylene group may have a substituent. Examples of the substituent of the arylene group are the same as the examples of the substituent of the arylene group described above. In Formula (II), Q is the polymerizable group.

Examples of the repeating unit having a polymerizable group are shown below.

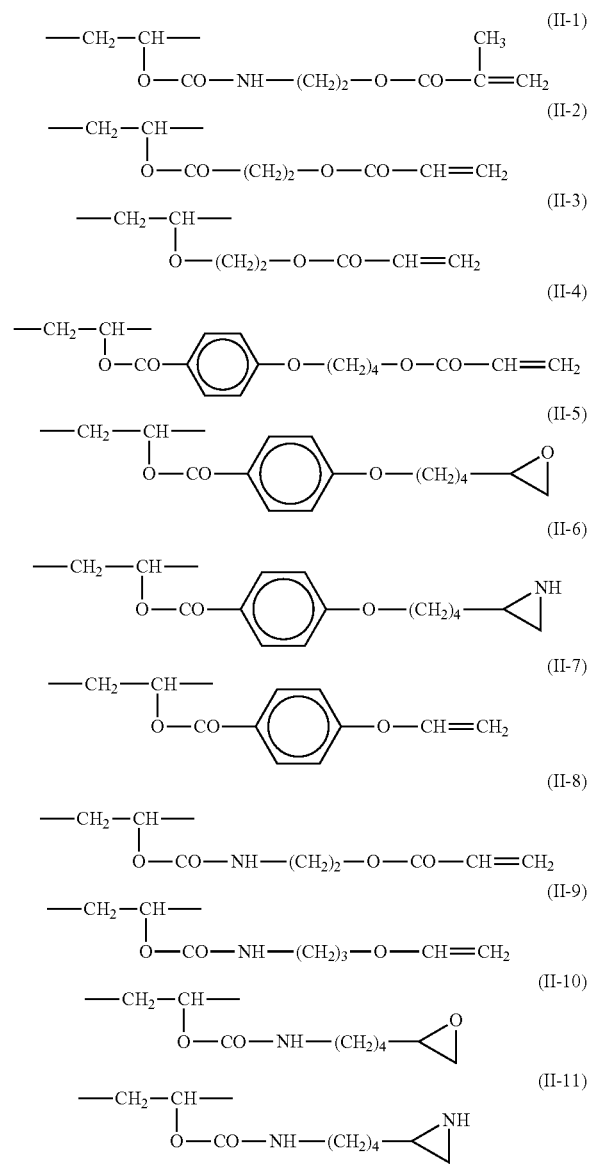

The modified PVA resin can be produced by reacting a commercially available unmodified PVA resin with a reagent such as methacryloyloxyethyl isocyanate and 4-(4-acryloyloxybutoxy)benzoic acid in the presence of a catalyst. As the commercially available unmodified PVA resin, PVA103, PVA203, PVA205, and the like manufactured by KURARAY CO., LTD. can be used. The above-described production method is described in JP1997-152509A (JP-H9-152509A).

It is preferable that an average degree of saponification of the modified PVA resin is less than an average degree of saponification of the unmodified PVA resin. Specifically, the average degree of saponification of the modified PVA resin is preferably 90 mol % or less.

In a case where the water-soluble resin contains the polymerized substance of a modified PVA resin and the unmodified PVA resin, by lowering the degree of saponification of the modified PVA resin, a difference in surface energy between the modified PVA resin before polymerization and the unmodified PVA resin contained in the interlayer increases, resulting in uneven distribution of the modified PVA resin on a surface. As a result, the adhesiveness between the first color conversion layer and the second color conversion layer can be further improved.

The lower limit value of the average degree of saponification of the modified PVA resin is not particularly limited, but in general, it is preferably 50 mol % or more, more preferably 70 mol % or more, and still more preferably 80 mol % or more.

From the viewpoint of adhesiveness between the first color conversion layer and the second color conversion layer, a number-average molecular weight of the modified PVA resin is preferably 800 or less, more preferably 600 or less, and still more preferably 400 or less. The lower limit value of the number-average molecular weight is not particularly limited, but in general, it is preferably 50 or more and more preferably 100 or more.

A content of the water-soluble resin is preferably 50 parts by mass or more, more preferably 70 parts by mass or more, and still more preferably 80 parts by mass with respect to 100 parts by mass of the total amount of solid contents contained in the interlayer.

In addition, the content of the water-soluble resin is preferably 100 parts by mass or less with respect to 100 parts by mass of the total amount of solid contents contained in the interlayer.

The interlayer may contain the above-described surfactant.

In addition, the interlayer may contain a resin other than the water-soluble resin, an additive, and the like. As the additive, the same additive used in the first color conversion layer can be used.

From the viewpoint of color reproducibility of the color conversion film, a thickness of the interlayer is preferably 0.1 µm to 20 µm, more preferably 0.5 µm to 15 µm, and still more preferably 0.7 µm to 10 µm.

(Second Color Conversion Layer)

In the first aspect, the second color conversion layer contains an organic light-emitting material (hereinafter, also referred to as a specific organic light-emitting material B) which emits, by at least one of excitation light having a wavelength of 400 nm or more and less than 500 nm or light emitted from an organic light-emitting material contained in the first color conversion layer, light observed in a region having a peak wavelength of 580 nm or more and less than 750 nm.

Suitable examples of the specific organic light-emitting material B include cyanine compounds such as 4-dicyanomethylene-2-methyl-6-(p-dimethylaminostyryl)-4H-pyran; rhodamine compounds such as rhodamine B, rhodamine 6G, rhodamine 101, and sulforhodamine 101; pyridine compounds such as 1-ethyl-2-(4-(p-dimethylaminophenyl)-1,3-butadienyl)-pyridinium-perchlorate; perylene compounds such as N,N'-bis(2,6-diisopropylphenyl)-1,6,7,12-tetraphenoxyperylene-3,4:9,10-bisdicarboimide; porphyrin compounds; pyrromethene compounds; oxazine compounds; pyrazine compounds; compounds having a fused aryl ring, such as naphthacene and dibenzodiindenoperylene; derivatives thereof; and organic metal complex compounds. However, the specific organic light-emitting material B is not particularly limited thereto.

Among the above-described compounds, a pyrromethene compound is preferable because it provides an excellent emission quantum yield and has good durability. As the pyrromethene compound, for example, the compound represented by General Formula (1) described above is preferable because it exhibits light emission with excellent color purity.

In addition, same as the first color conversion layer, the second color conversion layer may contain an organic light-emitting material other than the compound represented by General Formula (1).

It is preferable that at least one of the specific organic light-emitting material A or the specific organic light-emitting material B is the compound represented by General Formula (1), and it is more preferable that both are the compounds represented by General Formula (1).

In addition, preferred examples of the compound represented by General Formula (1), which can be suitably used as the specific organic light-emitting material B, include a case where all of $R^1$, $R^3$, $R^4$, and $R^6$ are each independently selected from Ar-1 to Ar-6 described above, X represents C—$R^7$, and $R^7$ represents the group represented by General Formula (2). In this case, $R^7$ more preferably represents the group represented by General Formula (2), in which r is a tert-butyl group or a methoxy group, and particularly preferably represents the group represented by General Formula (2), in which r is a methoxy group.

The second color conversion layer may contain two or more kinds of the specific organic light-emitting materials B. In addition, same as the first color conversion layer, the second color conversion layer may contain a light-emitting material other than the organic light-emitting material.

From the viewpoint of wavelength conversion effect, a content of the specific organic light-emitting material B is preferably 0.005 parts by mass to 1 part by mass, more preferably 0.007 parts by mass to 0.7 parts by mass, and still more preferably 0.01 parts by mass to 0.5 parts by mass with respect to 100 parts by mass of the total amount of solid contents contained in the second color conversion layer.

The second color conversion layer may contain one or two or more kinds of the binder resins. The type and preferred content of the binder resin are the same as those of the first color conversion layer, and thus the description thereof will be omitted here.

The second color conversion layer may contain one or two or more kinds of polymerization initiators. The type and preferred content of the polymerization initiator are the same as those of the first color conversion layer, and thus the description thereof will be omitted here.

The second color conversion layer may contain one or two or more kinds of surfactants. The type and preferred content of the surfactant are the same as those of the first color conversion layer, and thus the description thereof will be omitted here.

The second color conversion layer may contain an additive. As the additive, the same additive used in the first color conversion layer can be used.

From the viewpoint of wavelength conversion effect, a thickness of the second color conversion layer is preferably 1 μm or more, more preferably 5 μm or more, and still more preferably 10 μm or more.

In addition, from the viewpoint of downsizing of a backlight unit or the like, the thickness of the second color conversion layer is preferably 50 μm or less.

(Protective Layer)

In the first aspect, the color conversion film may include a protective layer on a side of the second color conversion layer opposite to the first color conversion layer.

As the protective layer, the same material as the support described above can be used. Since the specific materials have been described above, the description thereof will be omitted here.

From the viewpoint of strength of the color conversion film, a thickness of the protective layer is preferably 20 μm or more, and more preferably 30 μm or more.

In addition, from the viewpoint of downsizing of a backlight unit or the like, the thickness of the protective layer is preferably 1000 μm or less.

(Formation of Other Layers)

In the color conversion film of the first aspect, other layers may be formed on the support, the second color conversion layer, or the protective layer.

Examples of the other layers include an oxygen barrier layer, a water vapor barrier layer, an antireflection layer, an antistatic layer, and an antifouling later.

(Method for Manufacturing Color Conversion Film According to First Aspect)

In the first aspect, a method for manufacturing the color conversion film includes forming, on a support, a first color conversion layer containing an organic light-emitting material which emits, by excitation light having a wavelength of 400 nm or more and less than 500 nm, light observed in a region having a peak wavelength of 500 nm or more and less than 580 nm; forming an interlayer on the first color conversion layer; and forming, on the interlayer, a second color conversion layer containing an organic light-emitting material which emits, by at least one of the excitation light having a wavelength of 400 nm or more and less than 500 nm or the light emitted from the organic light-emitting material, light observed in a region having a peak wavelength of 580 nm or more and less than 750 nm.

(Formation of First Color Conversion Layer)

In the first aspect, the method for manufacturing the color conversion film includes forming the first color conversion layer on the support.

Examples of the method of forming the first color conversion layer include applying and drying, on the support, a coating liquid for forming the first color conversion layer, that contains an organic light-emitting material (specific organic light-emitting material A) which emits, by excitation light having a wavelength of 400 nm or more and less than 500 nm, light observed in a region having a peak wavelength of 500 nm or more and less than 580 nm.

In addition, the first color conversion layer may be formed by melt-extruding a composition containing the specific organic light-emitting material A onto the support.

In addition, after the drying, an actinic ray such as ultraviolet rays and an electron beam may be radiated.

In a case where the first color conversion layer is formed by applying and drying the coating liquid for forming the first color conversion layer on the support, the applying method is not particularly limited, and a known method in the related art can be performed. Examples of the applying method include a curtain coating method, a dip coating method, a spin coating method, a printing coating method, a spray coating method, a slot coating method, a roll coating method, a slide coating method, a blade coating method, a gravure coating method, and a wire bar method.

A drying method is not particularly limited, and the drying can be performed by a known method in the related art, such as using warm air.

A drying temperature is preferably changed as appropriate depending on composition of a coating liquid for forming the first color conversion layer, but is preferably 50° C. to 200° C. and more preferably 70° C. to 150° C.

As a light source for the light irradiation, a known light source in the related art can be used, and for example, an air-cooled metal halide lamp can be used.

In a case where ultraviolet rays are used in the light irradiation, an output density is not particularly limited, but is preferably 30 W/cm to 100 W/cm. In addition, an irradiation amount is not particularly limited, but is preferably 300 mJ/cm$^2$ to 2000 mJ/cm$^2$.

(Coating Liquid for Forming First Color Conversion Layer)

In the first aspect, the coating liquid for forming the first color conversion layer contains the specific organic light-emitting material A. The specific organic light-emitting material A is as described above, and the description thereof will be omitted here.

In addition, the coating liquid for forming the first color conversion layer may contain the binder resin, the additive, or the like described above.

The coating liquid for forming the first color conversion layer may contain one or two or more kinds of organic solvents.

Examples of the organic solvent include methanol, 1-methoxy-2-propyl acetate, 1,2-pentanediol, 1,2-propanediol, 1,3-propanediol, 1,2-butanediol, 3-methoxy-3-methyl-1-butanol, 1,3-butanediol, 1,4-butanediol, 1,5-pentanediol, 2-ethyl-1,3-hexanediol, 2-butene-1,4-diol, 1,2-hexanediol, 2-methyl-2,4-pentanediol, methyl ethyl ketone, acetaldehyde, acetone, acetonitrile, benzene, and chloroform.

An amount of the organic solvent contained in the coating liquid for forming the first color conversion layer is not particularly limited, but from the viewpoint dispersibility of the organic light-emitting material and the like, ease of applying a coating liquid onto a support, and ease of drying, a content of the organic solvent is preferably 50 parts by mass to 500 parts by mass with respect to 100 parts by mass of the total amount of solid contents contained in the coating liquid for forming the first color conversion layer.

(Formation of Interlayer)

In the first aspect, the method for manufacturing the color conversion film includes forming the interlayer on the first color conversion layer.

Examples of the method of forming the interlayer include applying and drying, on the first color conversion layer, a coating liquid for forming the interlayer, which contains a water-soluble resin. The applying method, the drying temperature, and the like can be the same as those for forming the first color conversion layer, and the description thereof will be omitted here.

(Coating Liquid for Forming Interlayer)

In the first aspect, the coating liquid for forming the interlayer can contain a water-soluble resin. The water-soluble resin is as described above, and the description thereof will be omitted here.

In addition, the coating liquid for forming the interlayer may contain the crosslinking agent, the additive, and the like described above.

The coating liquid for forming the interlayer may contain one or two or more kinds of solvents. The solvent may be water, the above-described organic solvent, or a combination of these.

An amount of the solvent contained in the coating liquid for forming the interlayer is not particularly limited, but from the viewpoint ease of applying the coating liquid and ease of drying, a content of the solvent is preferably 50 parts by mass to 800 parts by mass with respect to 100 parts by mass of the total amount of solid contents contained in the coating liquid for forming the interlayer.

(Formation of Second Color Conversion Layer)

In the first aspect, the method for manufacturing the color conversion film includes forming the second color conversion layer on the interlayer.

Examples of the method of forming the second color conversion layer include applying and drying, on the interlayer, a coating liquid for forming the second color conversion layer, that contains an organic light-emitting material (hereinafter, also referred to as a specific organic light-emitting material B) which emits, by at least one of the excitation light having a wavelength of 400 nm or more and less than 500 nm or the light emitted from the organic light-emitting material contained in the first color conversion layer, light observed in a region having a peak wavelength of 580 nm or more and less than 750 nm. In addition, as in the formation of the first color conversion layer, irradiation with an actinic ray may be performed.

The applying method, the drying temperature, the irradiation conditions, and the like can be the same as those for forming the first color conversion layer, and the description thereof will be omitted here.

In addition, the first color conversion layer may be formed by melt-extruding a composition containing the specific organic light-emitting material B onto the interlayer.

(Coating Liquid for Forming Second Color Conversion Layer)

In the first aspect, the coating liquid for forming the second color conversion layer contains the specific organic light-emitting material B. The specific organic light-emitting material B is as described above, and the description thereof will be omitted here.

In addition, the coating liquid for forming the second color conversion layer may contain the binder resin, the additive, or the like described above.

The coating liquid for forming the second color conversion layer may contain one or two or more kinds of organic solvents. The organic solvent is as described above, and the description thereof will be omitted here.

An amount of the organic solvent contained in the coating liquid for forming the second color conversion layer is not particularly limited, but from the viewpoint dispersibility of the organic light-emitting material and the like, ease of applying a coating liquid, and ease of drying, a content of the organic solvent is preferably 50 parts by mass to 500 parts by mass with respect to 100 parts by mass of the total amount of solid contents contained in the coating liquid for forming the second color conversion layer.

(Formation of Protective Layer)

In the first aspect, the method for manufacturing a color conversion film may include forming a protective layer on the second color conversion layer opposite to the interlayer.

The protective layer can be formed by heating and pressure-bonding the resin film or the like described above onto the second color conversion layer.

In another aspect, the protective layer can be formed by applying and drying a coating liquid containing the resin material on the second color conversion layer.

(Formation of Other Layers)

In the method for manufacturing the color conversion film of the first aspect, other layers may be formed on a layer such as the second color conversion layer. Since the specific examples of the other layers have been described above, the description thereof will be omitted here.

(Color Conversion Film According to Second Aspect)

In the second aspect, the color conversion film includes, in the following order, a support; a first color conversion layer containing an organic light-emitting material which emits, by at least one of excitation light having a wavelength of 400 nm or more and less than 500 nm or light emitted from an organic light-emitting material contained in a second color conversion layer, light observed in a region having a peak wavelength of 580 nm or more and less than 750 nm; an interlayer; and a second color conversion layer containing the organic light-emitting material which emits, by the excitation light having a wavelength of 400 nm or more and less than 500 nm, light observed in a region having a peak wavelength of 500 nm or more and less than 580 nm (not shown).

(Support)

As the support, the same as the support provided in the color conversion film according to the first aspect can be used, and the description thereof will be omitted here.

(First Color Conversion Layer)

In the second aspect, the first color conversion layer contains an organic light-emitting material (specific organic light-emitting material B) which emits, by at least one of excitation light having a wavelength of 400 nm or more and less than 500 nm or light emitted from an organic light-emitting material contained in a second color conversion layer, light observed in a region having a peak wavelength of 580 nm or more and less than 750 nm. Since the specific organic light-emitting material B is as described above, and the description thereof will be omitted here.

From the viewpoint of wavelength conversion effect, a content of the specific organic light-emitting material B is preferably 0.005 parts by mass to 1 part by mass, more preferably 0.007 parts by mass to 0.7 parts by mass, and still more preferably 0.01 parts by mass to 0.5 parts by mass with respect to 100 parts by mass of the total amount of solid contents contained in the first color conversion layer.

The first color conversion layer may contain one or two or more kinds of the binder resins. The type and preferred content of the binder resin are the same as in the first aspect, and thus the description thereof will be omitted here.

The coating liquid for forming the first color conversion layer may contain the above-described additive.

From the viewpoint of wavelength conversion effect, a thickness of the first color conversion layer is preferably 1 μm or more, more preferably 5 μm or more, and still more preferably 10 μm or more.

In addition, from the viewpoint of downsizing of a backlight unit or the like, the thickness of the first color conversion layer is preferably 50 μm or less.

(Interlayer)

In the second aspect, the color conversion film includes an interlayer between the first color conversion layer and the second color conversion layer. Since the interlayer is the same as that in the first aspect, the description thereof will be omitted here.

(Second Color Conversion Layer)

In the second aspect, the second color conversion layer contains an organic light-emitting material (hereinafter, also referred to as a specific organic light-emitting material A) which emits, by excitation light having a wavelength of 400 nm or more and less than 500 nm, light observed in a region having a peak wavelength of 500 nm or more and less than 580 nm. Since the specific organic light-emitting material A is as described above, and the description thereof will be omitted here.

From the viewpoint of wavelength conversion effect, a content of the specific organic light-emitting material A is preferably 0.005 parts by mass to 1 part by mass, more preferably 0.007 parts by mass to 0.7 parts by mass, and still more preferably 0.01 parts by mass to 0.5 parts by mass with respect to 100 parts by mass of the total amount of solid contents contained in the second color conversion layer.

The second color conversion layer may contain one or two or more kinds of the binder resins. The type and preferred content of the binder resin are the same as in the first aspect, and thus the description thereof will be omitted here.

The coating liquid for forming the second color conversion layer may contain the above-described additive.

From the viewpoint of wavelength conversion effect, a thickness of the second color conversion layer is preferably 1 μm or more, more preferably 5 μm or more, and still more preferably 10 μm or more.

In addition, from the viewpoint of downsizing of a backlight unit or the like, the thickness of the second color conversion layer is preferably 50 μm or less.

(Protective Layer)

In the second aspect, the color conversion film may include a protective layer on the second color conversion layer opposite to the interlayer. Since the protective layer is the same as that in the first aspect, the description thereof will be omitted here.

(Formation of Other Layers)

In the color conversion film of the second aspect, other layers may be formed on the support, the second color conversion layer, or the protective layer. Since the other layers are the same as that in the first aspect, the description thereof will be omitted here.

(Method for Manufacturing Color Conversion Film According to Second Aspect)

In the second aspect, a method for manufacturing the color conversion film includes forming, on a support, a first color conversion layer containing an organic light-emitting material which emits, by at least one of excitation light having a wavelength of 400 nm or more and less than 500 nm or light emitted from an organic light-emitting material contained in a second color conversion layer, light observed in a region having a peak wavelength of 580 nm or more and less than 750 nm; forming an interlayer on the first color conversion layer; and forming, on the interlayer, a second color conversion layer containing an organic light-emitting material which emits, by the excitation light having a wavelength of 400 nm or more and less than 500 nm, light observed in a region having a peak wavelength of 500 nm or more and less than 580 nm.

(Formation of First Color Conversion Layer)

In the second aspect, the method for manufacturing the color conversion film includes forming the first color conversion layer on the support. Since the method of forming the first color conversion layer is the same as that of the first aspect, the description thereof will be omitted here.

(Formation of Interlayer)

In the second aspect, the method for manufacturing the color conversion film includes forming the interlayer on the first color conversion layer. Since the method of forming the interlayer is the same as that of the first aspect, the description thereof will be omitted here.

(Formation of Second Color Conversion Layer)

In the second aspect, the method for manufacturing the color conversion film includes forming the second color conversion layer on the interlayer. Since the method of forming the second color conversion layer is the same as that of the first aspect, the description thereof will be omitted here.

(Formation of Protective Layer)

In the second aspect, the method for manufacturing a color conversion film may include forming a protective layer on the second color conversion layer. Since the method of forming the protective layer is the same as that of the first aspect, the description thereof will be omitted here.

(Formation of Other Layers)

In the method for manufacturing the color conversion film of the second aspect, other layers may be formed on at least one of the first color conversion layer or the second color conversion layer. Since the method of forming the other layers is the same as that of the first aspect, the description thereof will be omitted here.

(Backlight Unit)

The backlight unit according to the embodiment of the present disclosure includes a light source, and the color conversion film according to the first aspect or the color conversion film according to the second aspect described above.

In a case of the color conversion film according to the first aspect, it is preferable that the color conversion film is disposed with a surface on which the support is provided, facing the light source side.

In a case of the color conversion film according to the second aspect, it is preferable that the color conversion film is disposed with a surface opposite to a surface on which the support is provided (surface on which the second color conversion layer is provided), facing the light source side.

Figure 2:
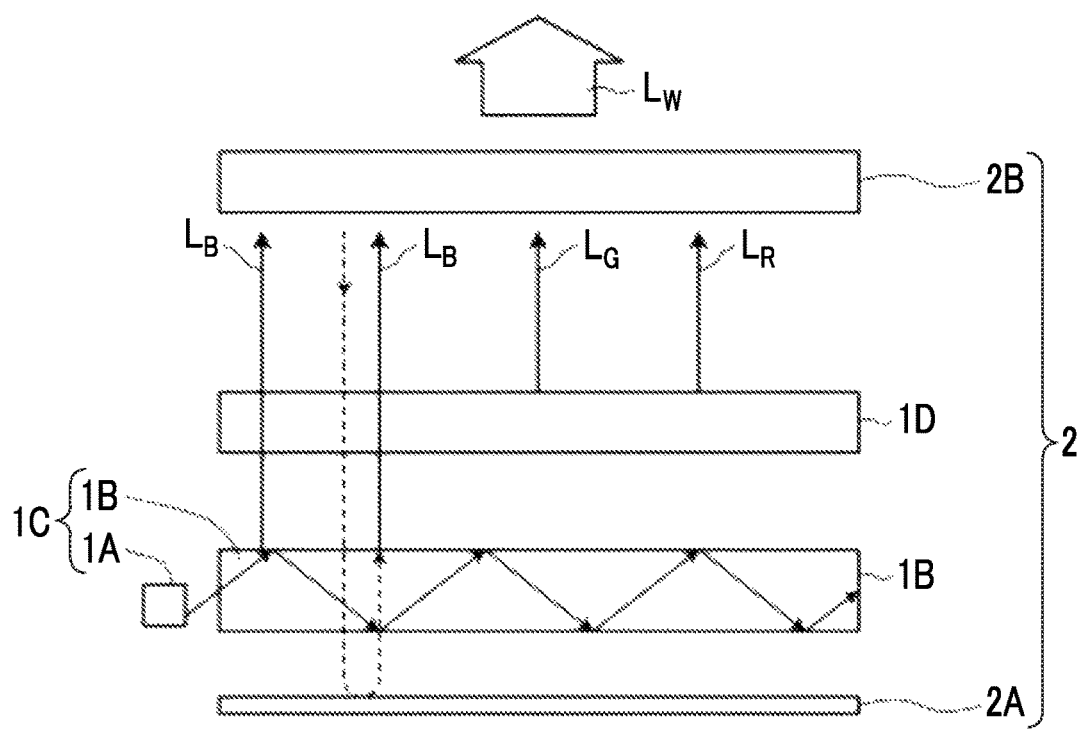
FIG. 2 is a schematic configuration cross-sectional diagram showing an embodiment of a backlight unit according to the present disclosure.

FIG. 2 is a schematic configuration cross-sectional diagram showing an embodiment of the backlight unit, and the backlight unit will be described below with reference to FIG. 2.

As shown in FIG. 2, a backlight unit 2 includes a planar light source 1C including a light source 1A which emits excitation light (blue light $L_B$) having a wavelength of 400 nm or more and less than 500 nm and a light guide plate 1B which guides and emits the excitation light emitted from the light source 1A, a color conversion film 1D provided on the planar light source 1C, a retroreflective member 2B disposed to face the planar light source 1C with the color conversion film 1D interposed therebetween, and a reflecting plate 2A disposed to face the color conversion film 1D with the planar light source 1C interposed therebetween.

In a case where the color conversion film 1D is the color conversion film according to the first aspect, the specific organic light-emitting material A contained in the first color conversion layer emits, by the excitation light emitted from the planar light source 1C, light (green light $L_G$) observed in a region having a peak wavelength of 500 nm or more and less than 580 nm.

In addition, the specific organic light-emitting material B contained in the second color conversion layer emits, by at least one of the excitation light which has passed through the first color conversion layer or the light emitted from the specific organic light-emitting material A, light (red light $L_R$) observed in a region having a peak wavelength of 580 nm or more and 750 nm or less.

White light $L_W$ is emitted from a surface of the retroreflective member 2B by the excitation light (blue light $L_B$) which has been passed through the color conversion film, the light (green light $L_G$) which has been passed through the second color conversion layer and is observed in the region having a peak wavelength of 500 nm or more and less than 580 nm, and the light (red light $L_R$) which is observed in the region having a peak wavelength of 580 nm or more and 750 nm or less.

The above-described aspect is an example, and the present disclosure is not limited thereto.

In a case where the color conversion film 1D is the color conversion film according to the second aspect, the specific organic light-emitting material A contained in the second color conversion layer emits, by the excitation light emitted from the planar light source 1C, light (green light $L_G$) observed in a region having a peak wavelength of 500 nm or more and less than 580 nm.

In addition, the specific organic light-emitting material B contained in the first color conversion layer emits, by at least one of the excitation light which has passed through the second color conversion layer or the light emitted from the specific organic light-emitting material B, light (red light $L_R$) observed in a region having a peak wavelength of 580 nm or more and 750 nm or less.

White light $L_W$ is emitted from a surface of the retroreflective member 2B by the excitation light (blue light $L_B$) which has been passed through the color conversion film, the light (green light $L_G$) which has been passed through the first color conversion layer and is observed in the region having a peak wavelength of 500 nm or more and less than 580 nm, and the light (red light $L_R$) which is observed in the region having a peak wavelength of 580 nm or more and 750 nm or less.

The above-described aspect is an example, and the present disclosure is not limited thereto.

In FIG. 2, the blue light $L_B$, the green light $L_G$, and the red light $L_R$ emitted from the color conversion film 1D are incident on the retroreflective member 2B, and each incident light is repeatedly reflected between the retroreflective member 2B and the reflecting plate 2A and passes through the color conversion film 1D multiple times.

As a result, in the color conversion film 1D, a sufficient amount of the excitation light (blue light $L_B$) is absorbed by the specific organic light-emitting material B which emits the red light $L_R$ and the specific organic light-emitting material A which emits the green light $L_G$, a required amount of fluorescence (the green light $L_G$, and the red light $L_R$) is emitted, and the white light $L_W$ is emitted from the retroreflective member 2B as the sum of the blue light $L_B$, the green light $L_G$, and the red light $L_R$.

From the viewpoint of improving brightness and color reproducibility, half-widths of each light emission intensity of the blue light, the green light, and the red light emitted by the backlight unit are all preferably 80 nm or less, more preferably 50 nm or less, still more preferably 40 nm or less, and even more preferably 30 nm or less. In addition, it is particularly preferable that the half-width of the light emission intensity of the blue light is 25 nm or less.

As the light source, a light-emitting diode, a laser light source, or the like can be used.

As shown in FIG. 2, the planar light source 1C may be a light source (edge light mode light source) including the light source 1A and the light guide plate 1B which guides and emits primary light emitted from the light source 1A, or may be a light source (direct backlight mode light source) in which the light source 1A is disposed in a plane parallel to the color conversion film 1D and a diffusion plate is provided in place of the light guide plate 1B. As the configuration of the backlight unit, although the edge light mode light source including the light guide plate, the reflecting plate, and the like as constituent members has been described in FIG. 2, the backlight unit may be the direct backlight mode light source.

As the light guide plate, a known light guide plate can be used without any limitation. In the present embodiment, the case where the planar light source is used as the light source has been described as an example, but a light source other than the planar light source can also be used as the light source.

In addition, the reflecting plate is not particularly limited, and a known reflecting plate can be used. For example, reflecting plates described in each publication such as JP3416302B, JP3363565B, JP4091978B, and JP3448626B can be used. The contents of these publications are incorporated herein by reference.

The retroreflective member may be configured of a known diffusion plate, diffusion sheet, prism sheet (for example, BEF series manufactured by Sumitomo 3M), a reflective type polarizing film (for example, DBEF series manufactured by Sumitomo 3M), or the like.

The configuration of the retroreflective member is described in each publication such as JP3416302B, JP3363565B, JP4091978B, and JP3448626B, the contents of which are incorporated herein by reference.

(Liquid Crystal Display Device)

The liquid crystal display device according to the embodiment of the present disclosure includes the above-described backlight unit and a liquid crystal cell unit.

Figure 3:
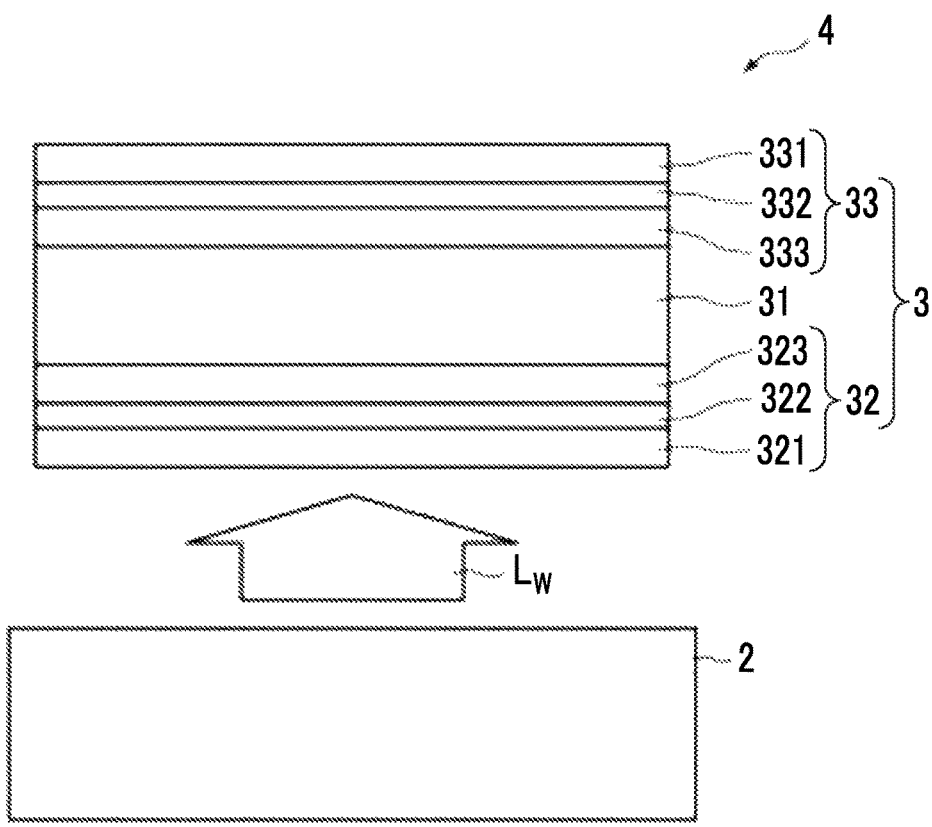
FIG. 3 is a schematic configuration cross-sectional diagram showing an embodiment of a liquid crystal display device according to the present disclosure.

FIG. 3 shows a schematic configuration cross-sectional diagram showing an embodiment of the liquid crystal display device according to the present disclosure. As shown in FIG. 3, a liquid crystal display device 4 includes the backlight unit 2 shown in FIG. 2 and a liquid crystal cell unit 3 disposed to face the retroreflective member 2B side of the backlight unit 2.

The liquid crystal cell unit 3 has a configuration in which a liquid crystal cell 31 is sandwiched between a polarizing plate 32 and a polarizing plate 33. In addition, each of the polarizing plate 32 and the polarizing plate 33 has a configuration in which both main surfaces of a polarizer 322 and a polarizer 332 are protected by polarizing plate protective films 321, 323, 331, and 333.

The liquid crystal cell and the polarizing plate constituting the liquid crystal display device are not particularly limited, and those manufactured by a known method or commercially available products can be used. In addition, a known interlayer such as an adhesive layer may be provided between the layers.

A drive mode of the liquid crystal cell is not particularly limited, and various modes such as twisted nematic (TN), super twisted nematic (STN), vertical alignment (VA), in-plane switching (IPS), and optically compensated bend cell (OCB) can be used.

Examples of a configuration of the liquid crystal display device in the VA mode include a configuration shown in FIG. 2 of JP2008-262161A. However, the specific configuration of the liquid crystal display device is not particularly limited, and a known configuration can be adopted.

The liquid crystal display device may include a functional layer such as an optical compensation member which performs optical compensation and an adhesive layer.

In addition, the liquid crystal display device may include a color filter substrate, a thin-layer transistor substrate, a lens film, a diffusion sheet, a hard coat layer, an antireflection layer, a low reflection layer, an antiglare layer, or the like.

Further, the liquid crystal display device may include a forward scattering layer, a primer layer, an antistatic layer, an undercoat layer, or the like.

The polarizing plate on the backlight unit side may include a phase difference film as the polarizing plate protective film on the liquid crystal cell side. As such a phase difference film, a known phase difference film such as a cellulose acylate film can be used.

EXAMPLES

Hereinafter, the present disclosure will be described in more detail using Examples. However, the present disclosure is not limited to the following examples as long as it does not exceed the gist of the present invention.

In addition, the numerical value in the tables means "part by mass" unless otherwise specified.

(Preparation of Coating Liquid for Forming Color Conversion Layer)

Components shown in Table 23 were mixed to prepare coating liquids A-1 to A-3 and B-1 to B-3 for forming a color conversion layer.

Details of the components in Table 23 are as follows.

Organic light-emitting material a: compound represented by the following chemical formula

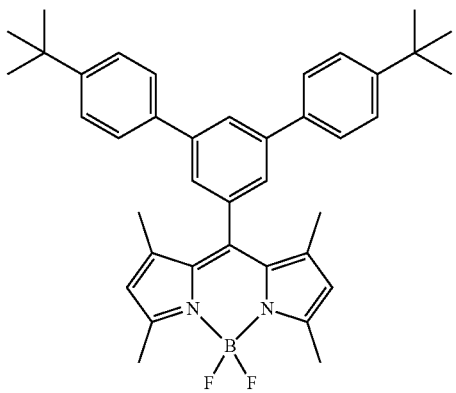

Organic light-emitting material b: compound represented by the following chemical formula

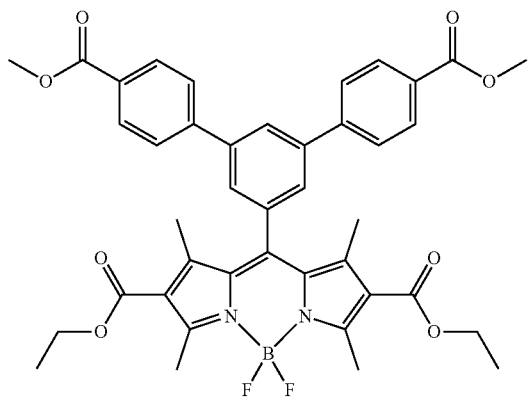

Organic light-emitting material c: compound represented by the following chemical formula

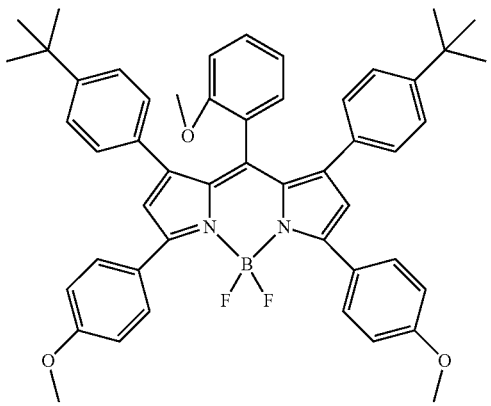

Organic light-emitting material b: compound represented by the following chemical formula

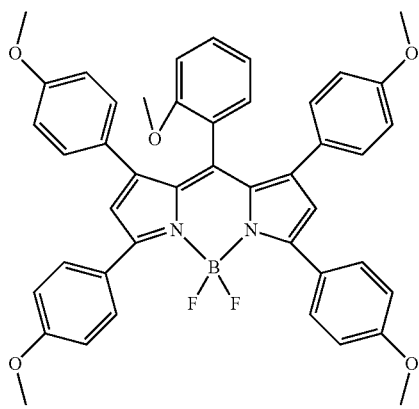

Polyester resin: manufactured by TAKAMATSU OIL & FAT CO., LTD., PESRESIN S-250 (30% by mass solution of MEK/toluene, weight-average molecular weight (Mw): 16,000, solid content: 30% by mass)

(Meth)acrylic resin: poly(methyl methacrylate), weight-average molecular weight (Mw): 28,000

Acrylic acid ester: manufactured by Shin-Nakamura Chemical Co., Ltd., A-DPH

Photopolymerization initiator: manufactured by BASF, Irgacure (registered trademark) 379EG MEK: methyl ethyl ketone, boiling point: 80° C.

MMPGAC: 1-methoxy-2-propyl acetate, boiling point: 140° C.

TABLE 23

| | Organic light-emitting material | | Binder resin | | | | Photopolymerization initiator | Organic solvent | | | |
|---|---|---|---|---|---|---|---|---|---|---|---|
| | Type | Content | Type | Content | Type | Content | Content | Type | Content | Type | Content |
| A-1 | a | 0.25 | Polyester resin | 333 | | | | — | | — | |
| A-2 | b | 0.25 | Polyester resin | 333 | | | | — | | — | |
| A-3 | a | 0.25 | (Meth)acrylic resin | 100 | | | | MEK | 200 | MMPGAC | 33 |
| A-4 | a | 0.25 | (Meth)acrylic resin | 70 | Acrylic acid ester | 27 | 3 | MEK | 200 | MMPGAC | 33 |
| B-1 | c | 0.03 | (Meth)acrylic resin | 100 | | | | MEK | 240 | MMPGAC | 60 |
| B-2 | d | 0.03 | (Meth)acrylic resin | 100 | | | | MEK | 240 | MMPGAC | 60 |
| B-3 | c | 0.03 | Polyester resin | 333 | | | | — | | MMPGAC | 67 |
| B-4 | c | 0.03 | (Meth)acrylic resin | 100 | Acrylic acid ester | 27 | 3 | MEK | 240 | MMPGAC | 60 |

(Preparation of Coating Liquid for Forming Interlayer)

Components shown in Table 24 were mixed to prepare coating liquids C-1 to C-9 for forming an interlayer.

Details of the components in Table 24 are as follows.

Unmodified PVA resin: polyvinyl alcohol resin, manufactured by KURARAY CO., LTD., PVA4-88LA Modified PVA resin: modified PVA resin having a crosslinkable group, which was synthesized based on the method described in paragraph [0101] of JP1997-152509A (JP-H9-152509A), except that MP polymer MP-203 was changed to PVA4-88LA PVP resin: polyvinylpyrrolidone resin, manufactured by FUJIFILM Wako Pure Chemical Corporation, PVPK-30

Cellulose resin A: hydroxypropyl cellulose, manufactured by NIPPON SODA CO., LTD., HPC-SSL Cellulose resin B: hydroxypropylmethyl cellulose, manufactured by Shin-Etsu Chemical Co., Ltd., TC-5

Crosslinking agent: glutaraldehyde

Surfactant: manufactured by DIC Corporation, F-444

TABLE 24

| | Water-soluble resin | | | | | Crosslinking agent | Surfactant | Solvent | |
| | Unmodified PVA resin | Modified PVA resin | PVP resin | Cellulose resin A | Cellulose resin B | | | Pure water | Methanol |
|---|---|---|---|---|---|---|---|---|---|
| C-1 | 100 | — | — | — | — | — | — | 500 | 100 |
| C-2 | 95 | — | 5 | — | — | — | — | 500 | 100 |
| C-3 | 50 | — | 50 | — | — | — | — | 500 | 100 |
| C-4 | — | — | 100 | — | — | — | — | 500 | 100 |
| C-5 | 90 | 10 | — | — | — | — | — | 500 | 100 |
| C-6 | 99 | — | — | — | — | 1 | — | 500 | 100 |
| C-7 | — | — | — | 100 | — | — | — | 500 | 100 |
| C-8 | — | — | — | — | 100 | — | — | 500 | 100 |
| C-9 | 50 | — | 50 | — | — | — | 1 | 500 | 100 |

Example 1

As a support, a polyethylene terephthalate (PET) film (thickness: 50 µm, manufactured by Toray Industries, Inc., LUMIRROR (registered trademark) U48) was prepared.

The coating liquid A-1 for forming a color conversion layer was applied onto one surface of the PET film using a slit-shaped nozzle, and dried at 100° C. to volatilize the solvent, thereby forming, on the support, a first color conversion layer having a thickness of 15 µm after drying.

The coating liquid C-1 for forming an interlayer was applied onto the above-described first color conversion layer using a slit-shaped nozzle, and dried at 100° C. to volatilize the solvent, thereby forming an interlayer having a thickness of 13 µm.

The coating liquid B-1 for forming a color conversion layer was applied onto the above-described interlayer using a slit-shaped nozzle, and dried at 100° C. to volatilize the solvent, thereby forming a second color conversion layer having a thickness of 13 µm.

Next, a chemical mat-treated film having a thickness of 138 µm (manufactured by KIMOTO, Chemical Matte 125PW) as a protective layer was heated and pressure-bonded to the second color conversion layer to manufacture a color conversion film.

The color conversion film was disposed on a planar light-emitting device equipped with a blue LED element having an emission peak wavelength of 465 nm such that a support surface was in contact with the planar light-emitting device, and a prism sheet was placed on the color conversion film.

In a case where a current was passed through the planar light-emitting device to turn on the blue LED element and light having an emission peak wavelength of 465 nm was radiated from the support side, white light including blue light, green light, and red light was observed.

Using a spectral emission brightness meter (CS-1000 manufactured by Konica Minolta Inc.), an emission spectrum of the above-described white light was obtained.

In a case where a peak wavelength of the green light was determined from the obtained emission spectrum, it was 530 nm. In addition, in a case where a peak wavelength of the red light was determined in the same manner, it was 630 nm.

The same measurement was performed for Examples below, and the results are summarized in Table 25.

Examples 2 to 22 and Comparative Example 1

Color conversion films were manufactured in the same manner as in Example 1, except that at least one of the coating liquid for forming a color conversion layer, the coating liquid for forming an interlayer, or the thickness of the interlayer was changed as shown in Table 25.

In Example 22, after manufacturing the color conversion film, the color conversion film was further irradiated with UV light from both sides using a high-pressure mercury lamp. An irradiation amount was 500 mJ/cm².

In Comparative Example 1, the interlayer was not formed, and the second color conversion layer was formed on the first color conversion layer.

Example 23

The coating liquid B-1 for forming a color conversion layer was applied onto a smooth surface side of a chemical mat-treated film having a thickness of 138 µm (manufactured by KIMOTO, Chemical Matte 125PW) using a slit-shaped nozzle, and dried at 100° C. to volatilize the solvent, thereby forming a first color conversion layer having a thickness of 13 µm.

The coating liquid C-1 for forming an interlayer was applied onto the above-described first color conversion layer using a slit-shaped nozzle, and dried at 100° C. to volatilize the solvent, thereby forming an interlayer having a thickness of 13 µm.

The coating liquid A-1 for forming a color conversion layer was applied onto the above-described interlayer using a slit-shaped nozzle, and dried at 100° C. to volatilize the solvent, thereby forming, on the interlayer, a second color conversion layer having a thickness of 15 µm after drying.

A polyethylene terephthalate (PET) film (thickness: 50 µm, manufactured by Toray Industries, Inc., LUMIRROR (registered trademark) U48) as a protective layer was heated and pressure-bonded to the second color conversion layer to manufacture a color conversion film.

Examples 24 to 44 and Comparative Example 2

Color conversion films were manufactured in the same manner as in Example 23, except that at least one of the coating liquid for forming a color conversion layer, the coating liquid for forming an interlayer, or the thickness of the interlayer was changed as shown in Table 26.

In Example 44, after manufacturing the color conversion film, the color conversion film was further irradiated with UV light at 500 mJ/cm² from both sides using a high-pressure mercury lamp.

In Comparative Example 2, the interlayer was not formed, and the second color conversion layer was formed on the first color conversion layer.

<<Evaluation of Color Reproducibility>>

From an emission spectrum obtained in Examples and Comparative Examples described above spectral data of transmittance of a color filter, a color gamut in (u', v') color space in a case where a color purity was improved by the color filter was calculated. In addition, the calculated color gamut in the (u', v') color space was evaluated according to the following standard based on a coverage ratio with respect to DCI-P3 color gamut standard. The evaluation results are shown in Tables 25 and 26.

(Evaluation Standard)
- A: coverage ratio was 98% or more.
- B: coverage ratio was 97% or more and less than 98%.
- C: coverage ratio was 96% or more and less than 97%.
- D: coverage ratio was less than 96%, but there was no problem in practical use.

<<Evaluation of Adhesiveness>>

The color conversion films manufactured in Examples and Comparative Examples described above were cut into a size of 50 mm×50 mm to produce a test piece.

The above-described test piece was cross-cut. In the cross-cut, a cut interval was set to 1 mm, and 25 square lattices of 1 mm square were formed.

The cross-cut test piece was allowed to stand for 50 hours in an environment of 85° C. and a relative humidity of 85%.

With the test piece after being allowed to stand, adhesiveness of the first color conversion layer and the second color conversion layer was evaluated by a peeling area of the first color conversion layer and the second color conversion layer based on the following evaluation standard. The evaluation results are shown in Tables 25 and 26.

(Evaluation Standard)
- A: no peeling occurred between the first color conversion layer and the second color conversion layer.
- B: peeling occurred between the first color conversion layer and the second color conversion layer, but the peeling area was less than 5%.
- C: peeling occurred between the first color conversion layer and the second color conversion layer, and the peeling area was 5% or more and less than 15%.
- D: peeling occurred between the first color conversion layer and the second color conversion layer, and the peeling area was 15% or more.

TABLE 25

| | Coating liquid used for forming first color conversion layer | Coating liquid used for forming interlayer | Thickness of interlayer (μm) | Coating liquid used for forming second color conversion layer | Peak wavelength of green light (nm) | Peak wavelength of red light (nm) | Evaluation of color reproducibility | Evaluation of adhesiveness |
|---|---|---|---|---|---|---|---|---|
| Example 1 | A-1 | C-1 | 13 | B-1 | 530 | 630 | A | D |
| Example 2 | A-1 | C-1 | 10 | B-1 | 530 | 630 | A | C |
| Example 3 | A-1 | C-1 | 5 | B-1 | 530 | 630 | A | B |
| Example 4 | A-1 | C-1 | 1 | B-1 | 530 | 630 | A | B |
| Example 5 | A-1 | C-1 | 0.5 | B-1 | 530 | 630 | B | B |
| Example 6 | A-1 | C-1 | 0.25 | B-1 | 530 | 630 | C | C |
| Example 7 | A-1 | C-2 | 10 | B-1 | 530 | 630 | A | B |
| Example 8 | A-1 | C-2 | 1 | B-1 | 530 | 630 | A | A |
| Example 9 | A-1 | C-3 | 10 | B-1 | 530 | 630 | A | A |
| Example 10 | A-1 | C-3 | 1 | B-1 | 530 | 630 | A | A |
| Example 11 | A-1 | C-4 | 10 | B-1 | 530 | 630 | B | A |
| Example 12 | A-1 | C-4 | 1 | B-1 | 530 | 630 | C | A |
| Example 13 | A-1 | C-5 | 1 | B-1 | 530 | 630 | A | B |
| Example 14 | A-1 | C-6 | 1 | B-1 | 530 | 630 | A | A |
| Example 15 | A-1 | C-7 | 1 | B-1 | 530 | 630 | B | B |
| Example 16 | A-1 | C-8 | 1 | B-1 | 530 | 630 | B | B |
| Example 17 | A-1 | C-9 | 1 | B-1 | 530 | 630 | A | A |
| Example 18 | A-2 | C-2 | 1 | B-1 | 530 | 630 | A | A |
| Example 19 | A-3 | C-2 | 1 | B-1 | 527 | 630 | A | A |
| Example 20 | A-1 | C-2 | 1 | B-2 | 530 | 632 | A | A |
| Example 21 | A-1 | C-2 | 1 | B-3 | 530 | 639 | B | A |
| Example 22 | A-4 | C-5 | 1 | B-4 | 527 | 630 | A | A |
| Comparative Example 1 | A-1 | — | — | B-1 | 530 | 630 | D | A |

TABLE 26

| | Coating liquid used for forming first color conversion layer | Coating liquid used for forming interlayer | Thickness of interlayer (μm) | Coating liquid used for forming second color conversion layer | Peak wavelength of green light (nm) | Peak wavelength of red light (nm) | Evaluation of color reproducibility | Evaluation of adhesiveness |
|---|---|---|---|---|---|---|---|---|
| Example 23 | B-1 | C-1 | 13 | A-1 | 530 | 630 | A | D |
| Example 24 | B-1 | C-1 | 10 | A-1 | 530 | 630 | A | C |
| Example 25 | B-1 | C-1 | 5 | A-1 | 530 | 630 | A | B |
| Example 26 | B-1 | C-1 | 1 | A-1 | 530 | 630 | A | B |
| Example 27 | B-1 | C-1 | 0.5 | A-1 | 530 | 630 | B | B |
| Example 28 | B-1 | C-1 | 0.25 | A-1 | 530 | 630 | C | C |
| Example 29 | B-1 | C-2 | 10 | A-1 | 530 | 630 | A | B |

TABLE 26-continued

| | Coating liquid used for forming first color conversion layer | Coating liquid used for forming interlayer | Thickness of interlayer (μm) | Coating liquid used for forming second color conversion layer | Peak wavelength of green light (nm) | Peak wavelength of red light (nm) | Evaluation of color reproducibility | Evaluation of adhesiveness |
|---|---|---|---|---|---|---|---|---|
| Example 30 | B-1 | C-2 | 1 | A-1 | 530 | 630 | A | A |
| Example 31 | B-1 | C-3 | 10 | A-1 | 530 | 630 | A | A |
| Example 32 | B-1 | C-3 | 1 | A-1 | 530 | 630 | A | A |
| Example 33 | B-1 | C-4 | 10 | A-1 | 530 | 630 | B | A |
| Example 34 | B-1 | C-4 | 1 | A-1 | 530 | 630 | C | A |
| Example 35 | B-1 | C-5 | 1 | A-1 | 530 | 630 | A | B |
| Example 36 | B-1 | C-6 | 1 | A-1 | 530 | 630 | A | A |
| Example 37 | B-1 | C-7 | 1 | A-1 | 530 | 630 | B | B |
| Example 38 | B-1 | C-8 | 1 | A-1 | 530 | 630 | B | B |
| Example 39 | B-1 | C-9 | 1 | A-1 | 530 | 630 | A | A |
| Example 40 | B-1 | C-2 | 1 | A-2 | 530 | 630 | A | A |
| Example 41 | B-1 | C-2 | 1 | A-3 | 527 | 630 | A | A |
| Example 42 | B-2 | C-2 | 1 | A-1 | 530 | 632 | A | A |
| Example 43 | B-3 | C-2 | 1 | A-1 | 530 | 639 | B | A |
| Example 44 | B-4 | C-5 | 1 | A-4 | 527 | 630 | A | A |
| Comparative Example 2 | B-1 | — | — | A-1 | 530 | 630 | D | A |

From the results of Examples described above, it was found that the color conversion film according to the embodiment of the present disclosure had excellent color reproducibility.

The disclosure of JP2020-210835 filed on Dec. 18, 2020 is incorporated in the present specification by reference. All documents, patent applications, and technical standards described in the present specification are herein incorporated by reference to the same extent that each individual document, patent application, or technical standard was specifically and individually indicated to be incorporated by reference.

What is claimed is:

1. A color conversion film comprising, in the following order:
    a support;
    a first color conversion layer containing an organic light-emitting material which emits, by an excitation light having a wavelength of 400 nm or more and less than 500 nm, light observed in a region having a peak wavelength of 500 nm or more and less than 580 nm;
    an interlayer; and
    a second color conversion layer containing an organic light-emitting material which emits, by at least one of the excitation light having a wavelength of 400 nm or more and less than 500 nm or the light emitted from the organic light-emitting material, light observed in a region having a peak wavelength of 580 nm or more and less than 750 nm, wherein;
    the interlayer contains a polyvinylpyrrolidone resin and a polyvinyl alcohol resin, and a ratio of a content of the polyvinylpyrrolidone resin to a content of the polyvinyl alcohol resin in the interlayer is 1/99 to 75/25 on a mass basis; or
    the interlayer contains a polyvinylpyrrolidone resin, a modified polyvinyl alcohol resin having a crosslinkable group, and an unmodified polyvinyl alcohol resin, and a ratio of a content of the modified polyvinyl alcohol resin having a crosslinkable group to a content of the unmodified polyvinyl alcohol resin in the interlayer is 1/99 to 30/70 on a mass basis.

2. The color conversion film according to claim 1, wherein at least one of the organic light-emitting material contained in the first color conversion layer or the organic light-emitting material contained in the second color conversion layer is represented by General Formula (1),

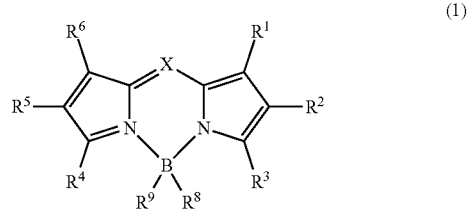

in General Formula (1), X represents C—$R^7$ or N, and $R^1$ to $R^9$ are each independently selected from a hydrogen atom, an alkyl group, a cycloalkyl group, a heterocyclic group, an alkenyl group, a cycloalkenyl group, an alkynyl group, a hydroxyl group, a thiol group, an alkoxy group, an alkylthio group, an arylether group, an arylthioether group, an aryl group, a heteroaryl group, halogen, a cyano group, an aldehyde group, a carbonyl group, a carboxyl group, an oxycarbonyl group, a carbamoyl group, an amino group, a nitro group, a silyl group, a siloxanyl group, a boryl group, or a phosphine oxide group, where adjacent groups of $R^1$ to $R^9$ may form a fused ring.

3. A color conversion film comprising, in the following order:
    a support;
    a first color conversion layer containing an organic light-emitting material which emits, by at least one of an excitation light having a wavelength of 400 nm or more and less than 500 nm or light emitted from an organic light-emitting material contained in a second color conversion layer, light observed in a region having a peak wavelength of 580 nm or more and less than 750 nm;

an interlayer; and a second color conversion layer containing the organic light-emitting material which emits, by the excitation light having a wavelength of 400 nm or more and less than 500 nm, light observed in a region having a peak wavelength of 500 nm or more and less than 580 nm, wherein:

the interlayer contains a polyvinylpyrrolidone resin and a polyvinyl alcohol resin, and a ratio of a content of the polyvinylpyrrolidone resin to a content of the polyvinyl alcohol resin in the interlayer is 1/99 to 75/25 on a mass basis; or the interlayer contains a polyvinylpyrrolidone resin, a modified polyvinyl alcohol resin having a crosslinkable group, and an unmodified polyvinyl alcohol resin, and a ratio of a content of the modified polyvinyl alcohol resin having a crosslinkable group to a content of the unmodified polyvinyl alcohol resin in the interlayer is 1/99 to 30/70 on a mass basis.

4. The color conversion film according to claim 1, wherein the first color conversion layer and the interlayer are in direct contact with each other.

5. The color conversion film according to claim 1, wherein the second color conversion layer and the interlayer are in direct contact with each other.

6. The color conversion film according to claim 1, wherein a thickness of the interlayer is 0.1 μm to 20 μm.

7. The color conversion film according to claim 1, further comprising:

a protective layer on a side of the second color conversion layer opposite to the first color conversion layer.

8. A backlight unit comprising:

a light source; and the color conversion film according to claim 1.

9. A liquid crystal display device comprising:

the backlight unit according to claim 8; and a liquid crystal cell unit.

10. The color conversion film according to claim 1, wherein the crosslinkable group is an ethylenically unsaturated polymerizable group.

11. The color conversion film according to claim 1, wherein the interlayer further contains a polymerized substance of a polyvinyl alcohol resin and a crosslinking agent.

12. The color conversion film according to claim 3, wherein at least one of the organic light-emitting material contained in the first color conversion layer or the organic light-emitting material contained in the second color conversion layer is represented by General Formula (1),

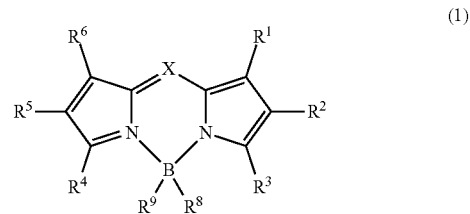

(1)

in General Formula (1), X represents C—$R^7$ or N, and $R^1$ to $R^9$ are each independently selected from a hydrogen atom, an alkyl group, a cycloalkyl group, a heterocyclic group, an alkenyl group, a cycloalkenyl group, an alkynyl group, a hydroxyl group, a thiol group, an alkoxy group, an alkylthio group, an arylether group, an arylthioether group, an aryl group, a heteroaryl group, halogen, a cyano group, an aldehyde group, a carbonyl group, a carboxyl group, an oxycarbonyl group, a carbamoyl group, an amino group, a nitro group, a silyl group, a siloxanyl group, a boryl group, or a phosphine oxide group, where adjacent groups of $R^1$ to $R^9$ may form a fused ring.

* * * * *